United States Patent [19]
Hattori et al.

[11] Patent Number: 5,032,913
[45] Date of Patent: Jul. 16, 1991

[54] ELECTRONIC ENDOSCOPE SYSTEM EQUIPPED WITH COLOR SMEAR REDUCING MEANS

[75] Inventors: Shinichiro Hattori, Akishima; Kazunari Nakamura, Hachioji; Akira Watanabe, Hachioji; Akira Kusumoto, Hachioji, all of Japan

[73] Assignee: Olympus Optical Co., Ltd., Tokyo, Japan

[21] Appl. No.: 485,908

[22] Filed: Feb. 27, 1990

[30] Foreign Application Priority Data

| Feb. 28, 1989 | [JP] | Japan | 1-49042 |
| Oct. 4, 1989 | [JP] | Japan | 1-260728 |
| Oct. 5, 1989 | [JP] | Japan | 1-260841 |
| Feb. 5, 1990 | [JP] | Japan | 2-27842 |

[51] Int. Cl.$^5$ ............................ A61B 1/04; A61B 1/06
[52] U.S. Cl. .............................. 358/98; 128/6; 358/26; 358/105
[58] Field of Search ............... 358/98, 105, 26; 128/6

[56] References Cited

U.S. PATENT DOCUMENTS

| 4,640,124 | 2/1987 | Diener et al. | 350/96.26 |
| 4,901,143 | 2/1990 | Uehara | 358/98 |
| 4,959,710 | 9/1990 | Uehara | 358/98 |
| 4,974,076 | 11/1990 | Nakamura | 358/98 |

FOREIGN PATENT DOCUMENTS

| 61-33637 | 2/1986 | Japan . |
| 61-71790 | 4/1986 | Japan . |
| 61-71791 | 4/1986 | Japan . |
| 63-276676 | 11/1988 | Japan . |

Primary Examiner—Howard W. Britton
Attorney, Agent, or Firm—Armstrong, Nikaido, Marmelstein, Kubovcik & Murray

[57] ABSTRACT

An object being frame-sequentially illuminated by beams of illumination light in different wavelength ranges is imaged by an imaging element of an electronic endoscope. A time-serial image signal is subjected to signal processing to display a color picture on a monitor screen. A relative movement between the object and the imaging element is detected by a movement detecting circuit to reduce color smear produced by the relative movement in a motion picture of the object displayed on the monitor screen.

155 Claims, 46 Drawing Sheets

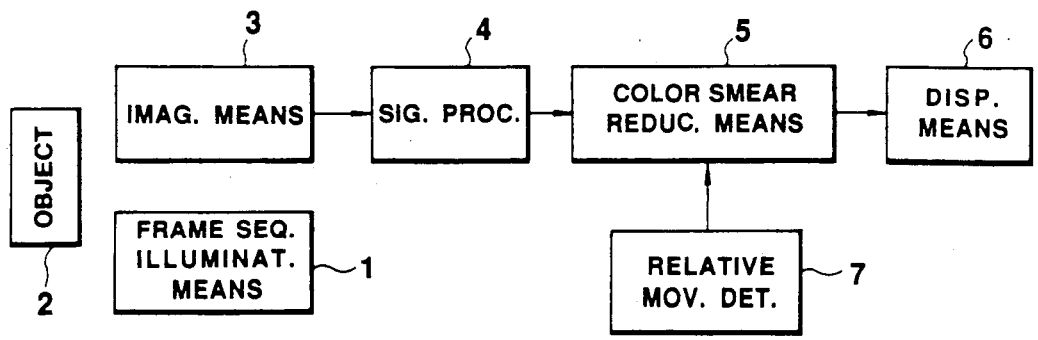
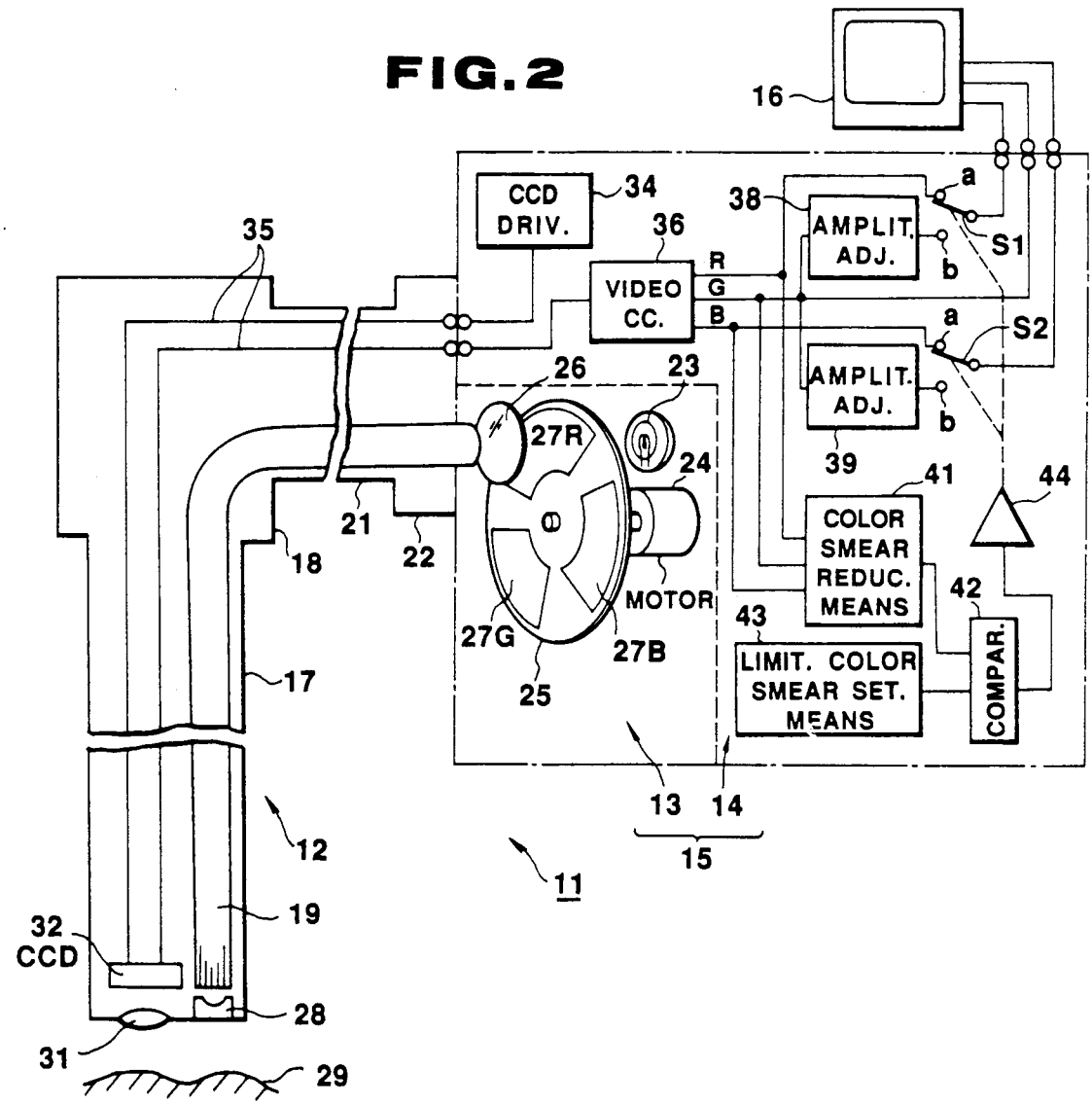

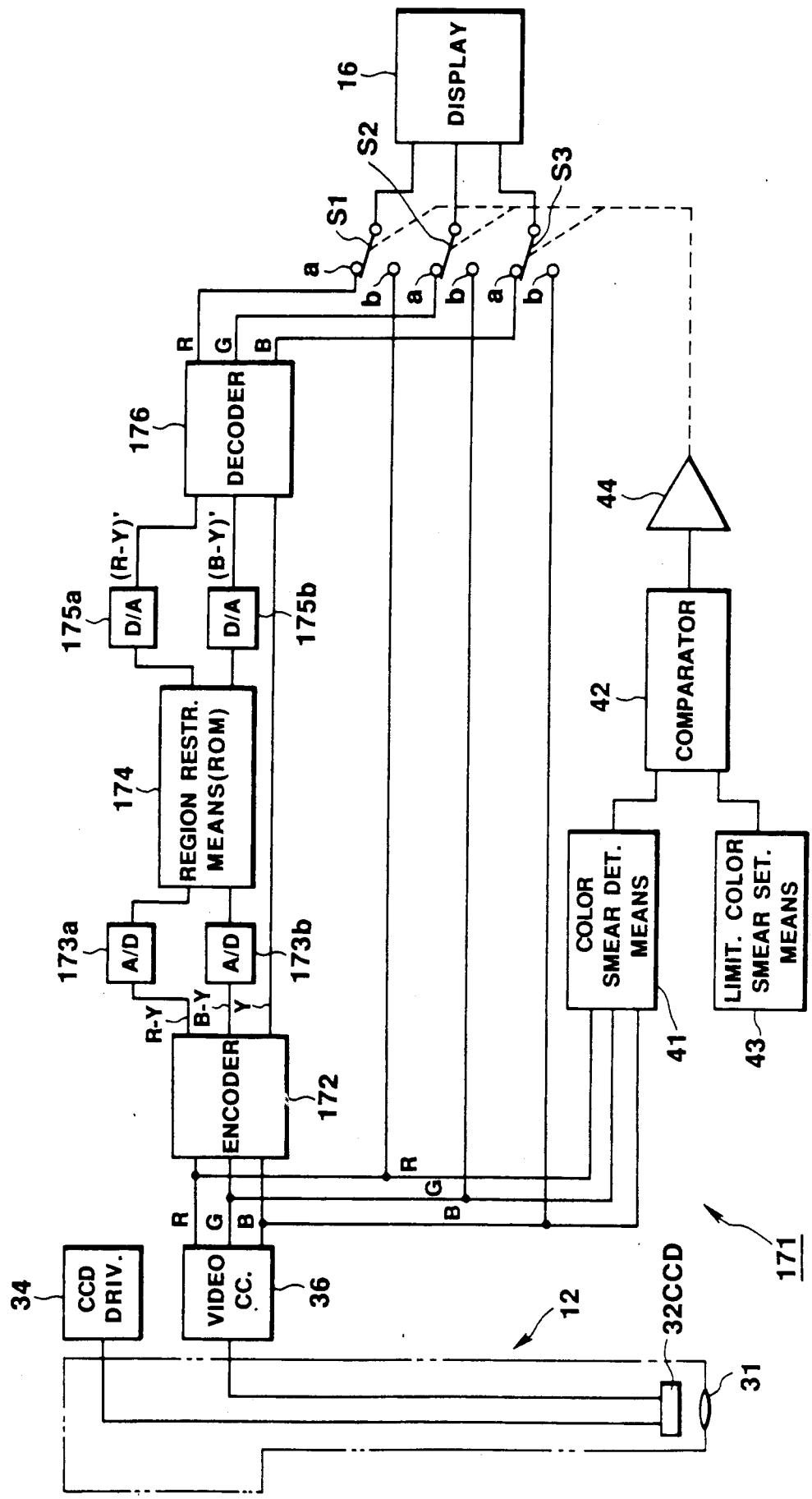

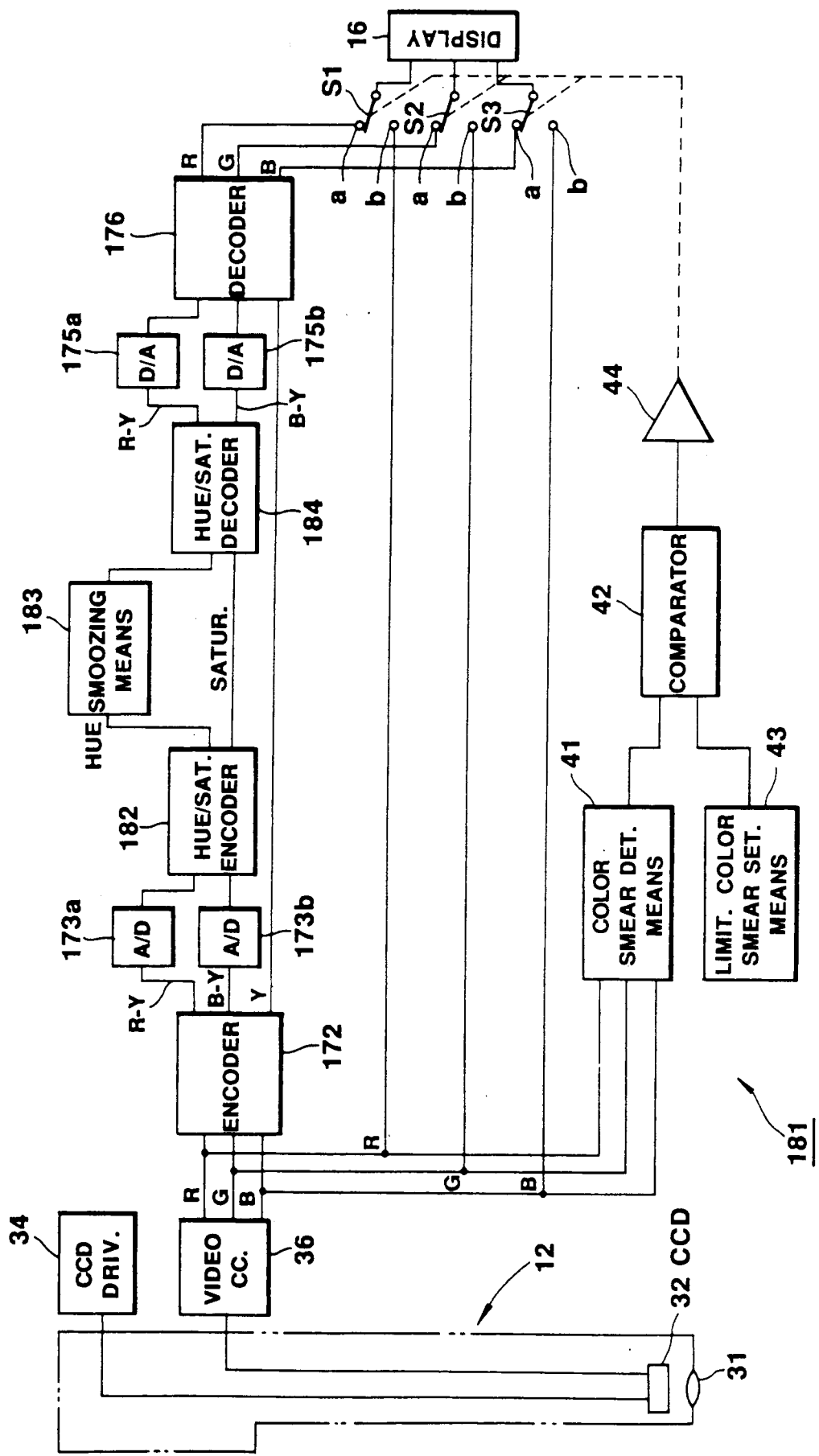

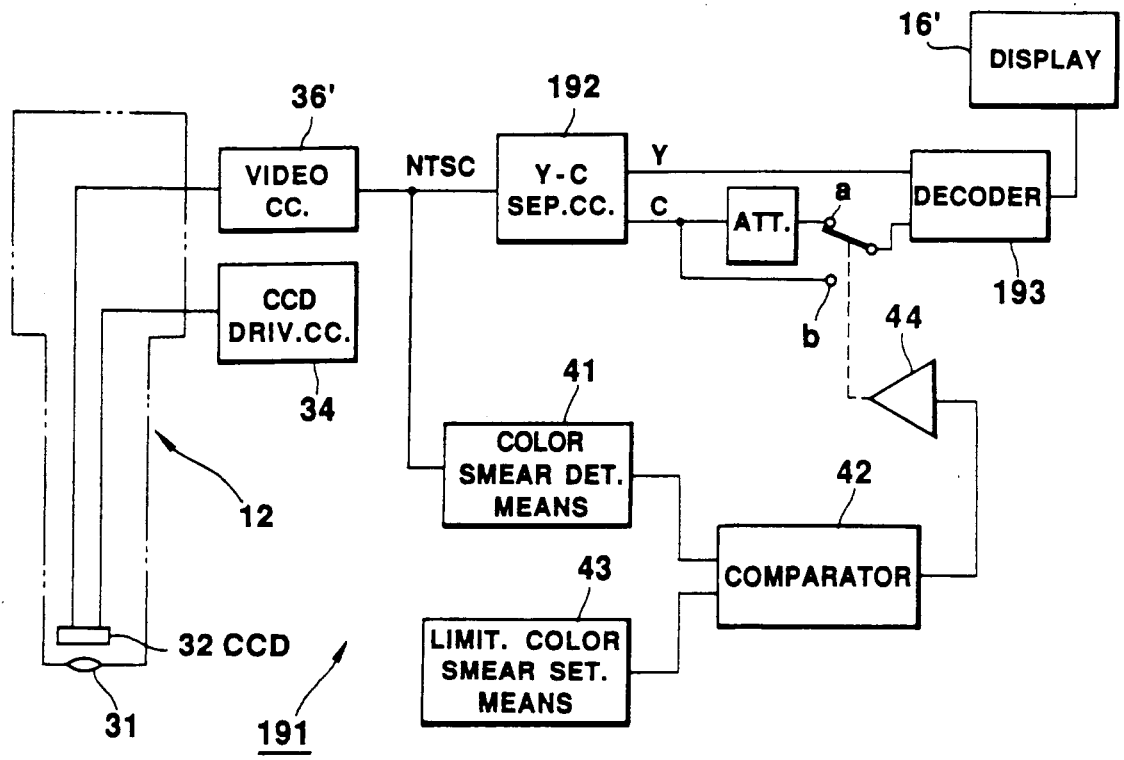
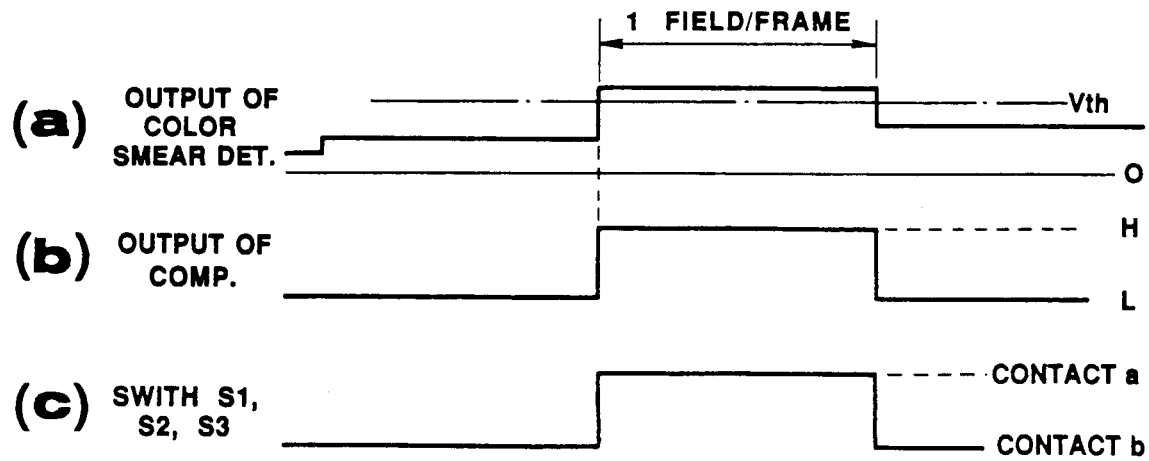

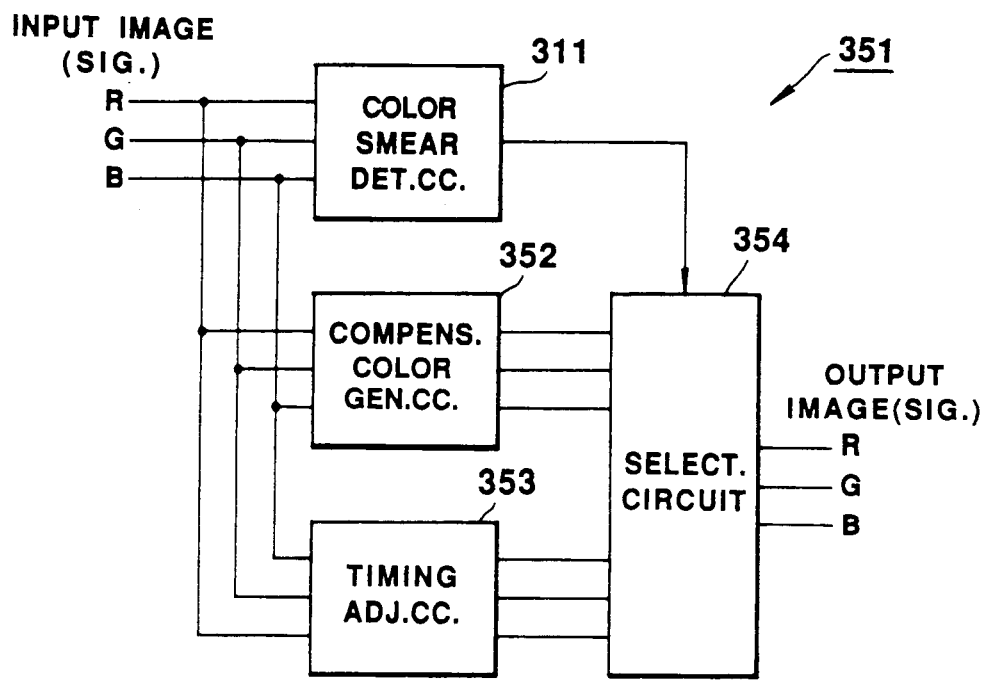
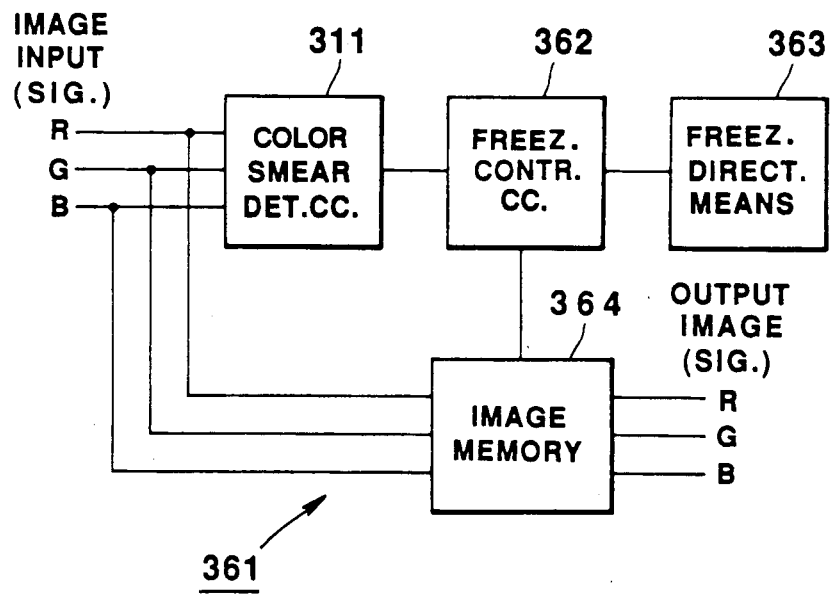

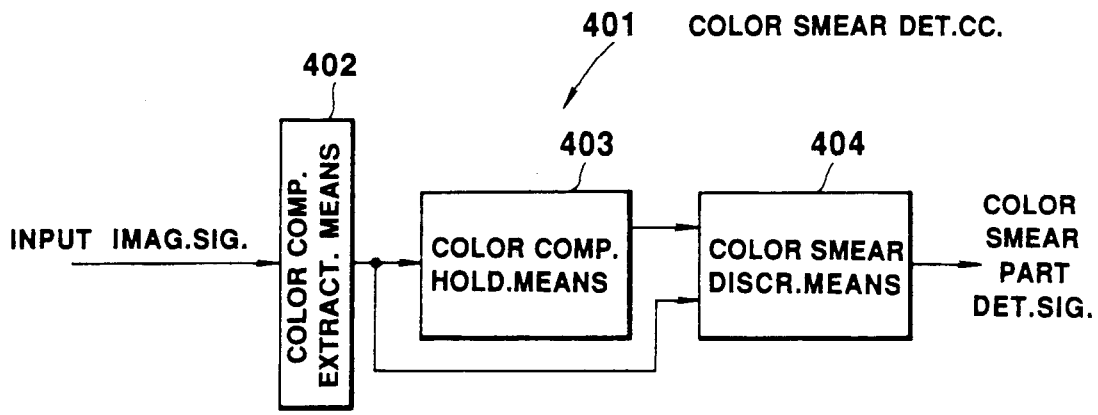
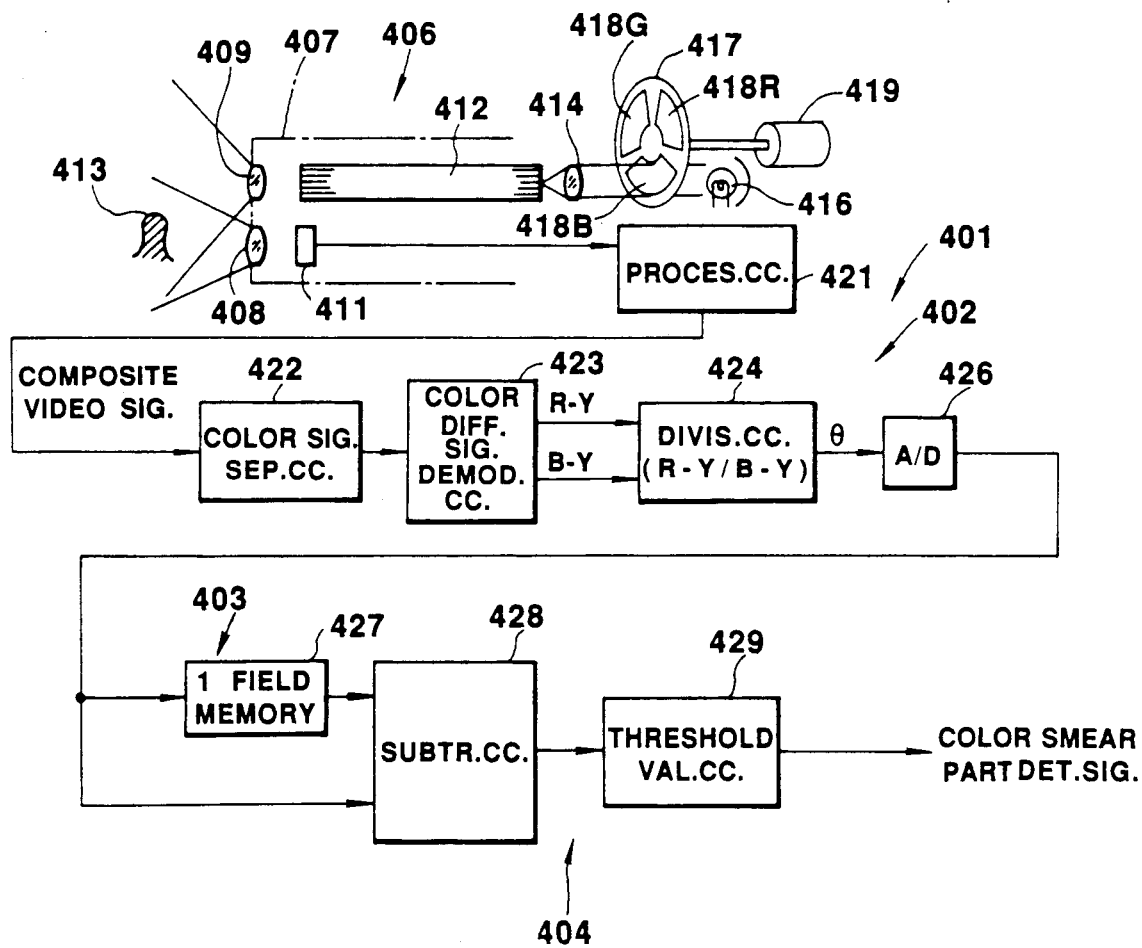

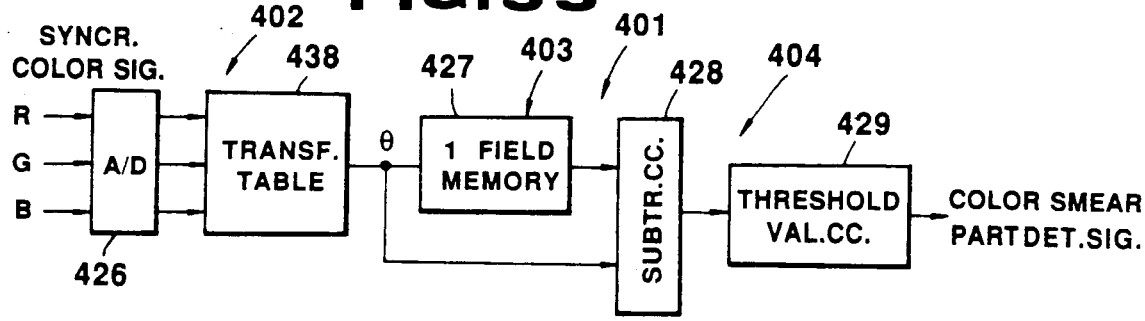
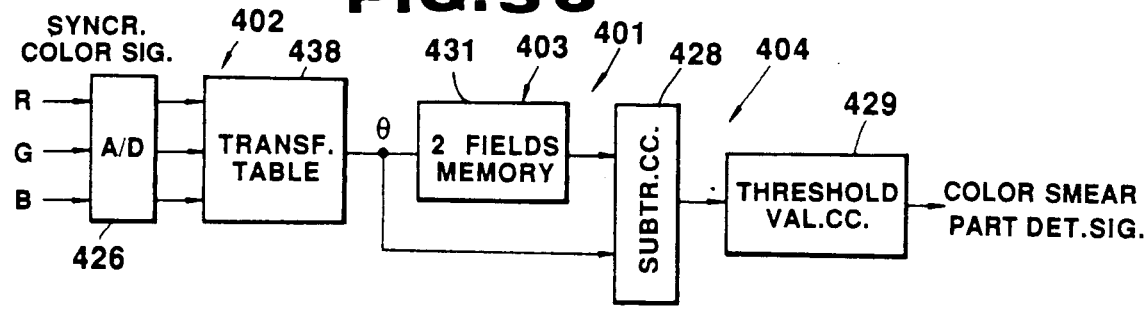
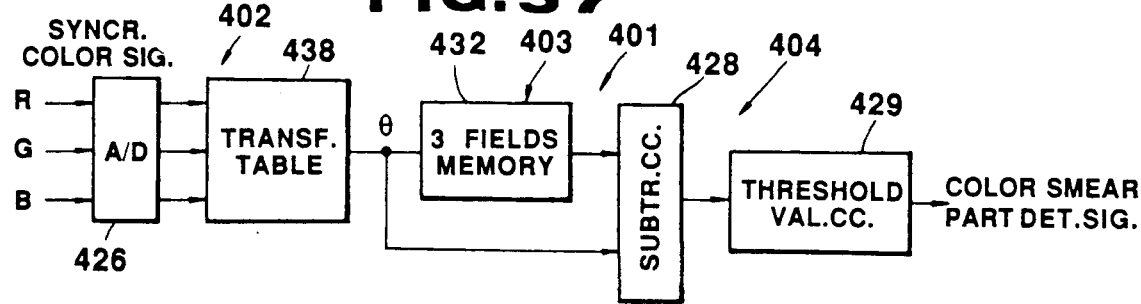

ELECTRONIC ENDOSCOPE SYSTEM EQUIPPED WITH COLOR SMEAR REDUCING MEANS

BACKGROUND OF THE INVENTION

Field of the Invention and Description of the Related Art

The present invention relates to an electronic endoscope system equipped with a color smear reducing means for reducing or suppressing a degree of color smear.

Recently, there have widely been used endoscopes of which long and narrow insert portions can be each inserted into a living body or the like for observing an object such as the diseased part.

Meanwhile, electronic endoscopes have lately been put into practice using solid imaging devices, e.g., CCD's, as imaging means.

Known as one of such electronic endoscopes is a frame sequential type that an object is illuminated by beams of illumination light different in wavelength from one another, such as red, green and blue beams, and images picked up under illumination of light beams of respective wavelengths, i.e., component images, are synthesized to produce a color picture.

With the above type electronic endoscope, component images taken at different time points are synthesized to produce one frame of color picture. Therefore, the synthesized color picture tends to cause color smear, if the object is moving or if there is a relative movement between an imaging means and the object.

As one prior art aiming at prevention of such color smear, Japanese Patent Laid-Open No. 61-71790 has proposed to detect a movement of an object and change an imaging speed dependent on the detected movement speed, thereby preventing the occurrence of color smear.

In order to change the imaging speed, the above prior art makes control for varying a rotational speed of a rotatable color film which constitutes a frame sequentially illuminating means. However, the rotational speed of the rotatable color filter is generally quite low in response to its change. This makes it difficult to follow the movement of the object.

Accordingly, the above prior art is disadvantageous in that the control is less adaptable for the object which develops a movement in a very short time, or changes an amount of movement over time, for example.

Another prior art of Japanese Patent Laid-Open No. 61-71791 has disclosed an endoscope apparatus which comprises an imaging means of the frame sequential type, a color smear detecting means for detecting color smear of a picture based on a difference between images picked up by the imaging means at different time points, and a color smear correcting means for making color smear correction on a still picture or freeze-picture, which is output from the imaging means and undergoes color smear, by allowing a user to specify the direction and value of the color smear, when the presence of color smear is determined by the color smear detecting means.

The above prior art is problematic in that when color smear is detected, the user must input correction values to eliminate the color smear and hence the disclosed apparatus cannot be adapted for a motion picture. The prior art endoscope apparatus cannot also reduce the color smear in real time.

Furthermore, the prior art of Japanese Patent Laid-Open No. 63-276676 discloses a corresponding area detection device for detecting corresponding areas in plural images by the use of an arithmetic means for correlation. Owing to use of the arithmetic means for correlation, this prior art is difficult to determine the corresponding areas in real time. Therefore, the disclosed device has also a problem that it cannot be adapted for a motion picture.

If the above prior art is employed to reduce color smear, the device necessary for reducing color smear would be large in scale and the cost would be increased.

OBJECT AND SUMMARY OF THE INVENTION

An object of the present invention is to provide an electronic endoscope system which can reduce color smear in a motion picture with the simple construction.

Another object of the preset invention is to provide an electronic endoscope system which can reduce color smear in real time with the simple construction.

As shown in a fundamental view of FIG. 1, an object 2 under illumination by a frame sequentially illuminating means 1 is picked up by an imaging means 3 and then subjected to signal processing by a signal processor 4. An output signal of the signal processor 4 is applied via a color smear reducing means 5 to a display means 6 for color display of a motion picture.

When a relative movement detecting means 7 determines that a degree of color smear is large, the color smear reducing means 5 is controlled to operate in real time.

Thus, only when a degree of color smear is large, the color smear reducing means 5 is operated so that color smear of the picture displayed on the display means is made unobtrusive or suppressed.

BRIEF DESCRIPTION OF THE DRAWINGS

FIG. 1 is a conceptual view showing the fundamental configuration of the present invention;

FIGS. 2 through 5 are concerned with a first embodiment of the present invention in which;

FIG. 2 is a diagrammatic view showing the configuration of an imaging apparatus for an endoscope of the first embodiment, FIG. 3 is a block diagram showing the configuration of a video circuit, FIG. 5 is a block diagram showing the configuration of a color smear detecting means;

FIG. 15 is a diagrammatic view showing the configuration of an imaging apparatus for an endoscope of an eighth embodiment;

FIG. 17 is a diagrammatic view showing the configuration of an imaging apparatus for an endoscope of a ninth embodiment;

FIG. 18 is a diagrammatic view showing the configuration of an imaging apparatus for an endoscope of a tenth embodiment;

FIG. 20 is an explanatory view for operation of the eleventh embodiment;

FIGS. 26 through 28 are concerned with the fourteenth embodiment of the present invention in which;

FIG. 26 is a diagrammatic view showing the configuration of a color smear detecting circuit in the fourteenth embodiment;

FIG. 37 is a diagrammatic view showing the configuration of a color smear reducing device to which the color smear detecting circuit is applied;

FIG. 38 is a diagrammatic view showing the configuration of an image freezing device to which the color smear detecting circuit is applied;

FIG. 39 is a conceptual view of a color smear detecting circuit in twentieth through twenty-fifth:

FIGS. 40 through 48 are concerned with the twentieth embodiment of the present invention in which;

FIGS. 40 through 42 illustrate the case of applying a composite video signal; FIG. 40 is a block diagram of a color smear portion detecting circuit with one-field memory, FIG. 41 is a block diagram of a color smear portion detecting circuit with two-field memory, and FIG. 42 is a block diagram of a color smear portion detecting circuit with three-field memory, FIG. 43 is an explanatory view of image signals when a rotatable color filter has a switching period of 60 Hz, FIG. 44 is an explanatory view for image signals when the rotatable color filter has a switching period of 30 Hz, FIG. 45 is an explanatory view for image signals when a rotatable color filter has a switching period of 20 Hz, and FIGS. 46 through 48 illustrate the case of applying a color plane synchronizing signal; FIG. 46 is a block diagram of a color smear portion detecting circuit with one-field memory, FIG. 47 is a block diagram of a color smear portion detecting circuit with two-field memory, and FIG. 48 is a block diagram of a color smear portion detecting circuit with three-field memory;

FIGS. 49 through 54 are concerned with a twenty-first embodiment in which;

FIGS. 49 through 51 illustrate the case of applying a composite video signal; FIG. 49 is a block diagram of a color smear portion detecting circuit with one-field memory, FIG. 50 is a block diagram of a color smear portion detecting circuit with two-field memory, and FIG. 51 is a block diagram of a color smear portion detecting circuit with three-field memory, and FIGS. 52 through 54 illustrate the case of applying a color plane synchronizing signal; FIG. 52 is a block diagram of a color smear portion detecting circuit with one-field memory, FIG. 53 is a block diagram of a color smear portion detecting circuit with two-field memory, and FIG. 54 is a block diagram of a color smear portion detecting circuit with three-field memory;

FIGS. 55 through 57 are concerned with a twenty-second embodiment in which;

FIG. 55 is a block diagram of a color smear portion detecting circuit with one-field memory, FIG. 56 is a block diagram of a color smear portion detecting circuit with two-field memory, and FIG. 57 is a block diagram of a color smear portion detecting circuit with three-field memory;

FIGS. 58 through 60 are concerned with a twenty-third embodiment in which;

FIG. 58 is a block diagram of a color smear portion detecting circuit with one-field memory, FIG. 59 is a block diagram of a color smear portion detecting circuit with two-field memory, and FIG. 60 is a block diagram of a color smear portion detecting circuit with three-field memory;

FIG. 61 is concerned with a twenty-fourth embodiment of the present invention, showing a block diagram of a color smear reducing device;

FIGS. 63 through 72 are concerned with a twenty-sixth embodiment of the present invention in which;

FIG. 63 is a diagrammatic view showing the entire configuration of the twenty-sixth embodiment, FIG. 64 is a block diagram showing the configuration of a water-feed detecting means, FIG. 65 is a circuit diagram showing a practical example of a change rate detecting circuit, FIG. 67 is an explanatory view showing the hue distribution of an image under no feeding of water, FIG. 68 is an explanatory view showing counted values of counters in the case of FIG. 67, FIGS. 69a–69c are explanatory views showing counted values of the counters in three fields under no feeding of water;

FIG. 72 is an explanatory view showing the hue distribution of an image under application of dyeing;

DETAILED DESCRIPTION OF THE PREFERRED EMBODIMENTS

Figure 3:
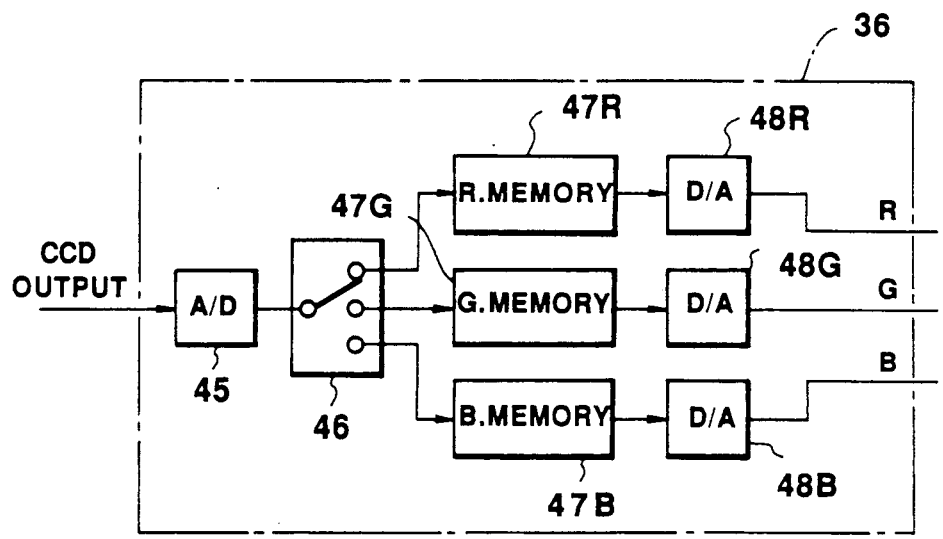

As shown in FIG. 2, an imaging apparatus 11 for an endoscope of a first embodiment comprises an electronic scope 12 of the frame sequential type, a video processor 15 incorporating both a light source 13 of the frame sequential type for supplying beams of frame sequentially illuminating light to the electronic scope 12 and an image processor (signal processor) 14, and a display 16 for displaying video signals issued from the video processor 15 in color.

The electronic scope 12 has a long and narrow insert portion 17 which is formed at its rear end with a fat and wide control portion 18.

A light guide 19 for transmitting the illumination light is provided to penetrate through the insert portion 17 and then a universal cord 21 extended from the control portion 18. A connector 22 at the end of the universal cord 21 can be fitted to the video processor 15.

Tight fitting of the connector 22 allows the illumination light from the light source 13 to be supplied to the incident end face of the light guide 19.

Specifically, a beam of white light from a lamp 23 passes through a rotatable color filter 25 rotated by a motor 24, and is then irradiated to the incident end face of the light guide 19 through a condenser lens 26.

The rotatable color filter 25 has three sector-like openings spaced from each other circumferentially and provided with color transmission filters 27R, 27G, 27B in red, green and blue, respectively. Accordingly, three beams of different wavelengths, i.e., red, green and blue beams of the illumination light, are sequentially supplied to the light guide 19. Then, the illumination light is transmitted through the light guide 19 and emitted from the emergent end face of the light guide 19 toward a front object 29 through an illumination lens 28 attached to the distal end of the insert portion 17. An image of the object 29 irradiated by the illumination light through the illumination lens 28 is formed on a CCD 32 by an object lens 31 attached to the distal end of the insert portion 17, the CCD 32 being disposed in the focal plane of the objective lens 31. The optical image is stored in the CCD 32 in the form of electric charges after photoelectric conversion.

A drive signal output from a CCD driver circuit 34 in the video processor 15 is applied to the CCD 32 via a signal line 35 for reading out the stored image. The read-out image via another signal line 35 to a video circuit 36 in the video processor 15, where it is subjected to signal processing to produce a standard video signal, e.g., three primary color signals R, G, B. The video circuit 36 issues the primary color signals R, G, B from its output terminals.

Of the above three primary color signals R, G, B, the signal G, for example, is directly applied to the display 16, while the signals R, B are respectively applied to one contacts a of switches S1, S2 operated in interlock relation. Applied to the other contacts b of the switches S1, S2 are modified ones of the signal G having passed through amplitude adjusters 38, 39, repsectively. Note that the switches S1, S2 are formed of semiconductor video switches, for example.

The above three primary color signals R, G, B are also applied to a color smear detecting means 41 as a means for detecting a relative movement between the imaging means and the object 29. A degree of color smear is detected from the input signals R, G, B and then applied to one input terminal of a comparator 42. Applied to the other input terminal of a comparator 42 is a reference voltage value which corresponds to a limit degree of color smear and is issued from a limit color smear setting means 43. When the degree of color smear issued from the color smear detecting means 41 exceeds the reference voltage value, the comparator 42 outputs a discrimination signal (which assumes a level of "H", for example) indicating the presence of color smear larger than a limit value. The output of the comparator 42 is applied to switching control terminals of the switches S1, S2 via a switch driver 44. When the comparator 42 determines the presence of color smear larger than a limit value, the switches S1, S2 are changed over from the positions of selecting the contacts a as shown in FIG. 2 to the positions of selecting the contacts b.

When the switches S1, S2 are positioned to select (or conduct) the contacts a as shown in FIG. 2, the three primary color signals R, G, B produced from the video circuit 36 are input to the display 16 for normal color display.

On the other hand, when the contacts b are selected, the modified signals G having passed through the amplitude adjusters 38, 39 which constitute the color smear reducing means, are applied to input terminals for the R, B signals of the display 16.

In other words, color component signals are produced using the monochromatic signal C in a simulated manner so as to display an image of the object on the display 16. In this case, since the object image is displayed using only one color component, e.g., the monochromatic signal G, color smear will be prevented from occurring in the displayed image of the object.

The configuration of the video circuit 36 is shown in FIG. 3.

The signal read out of the CCD 32 is converted to a digital signal by an A/D converter 45 and then sequentially written into R, G, B (frame/field) memories 47R, 47G, 47B via a multiplexer 46. For instance, the image picked up under the red beam of the illumination light is written into the R memory 47R.

The image data written into those R, G, B memories 47R, 47G, 47B are concurrently read out as image data synchronized to one another, followed by being converted to analog three primary color signals R, G, B through D/A converters 48R, 48G, 48B, respectively, and then output from the video circuit 36.

The aforesaid amplitude adjusters 38, 39 are of the same construction and each comprises an amplifier or attenuator, for example. The displayed color is determined dependent on respective degrees of gain or attenuation of the amplitude adjusters 38, 39.

Incidentally, the limit color smear setting means 43 can be constituted by a reference voltage source (and resistors), for example.

Figure 4A:
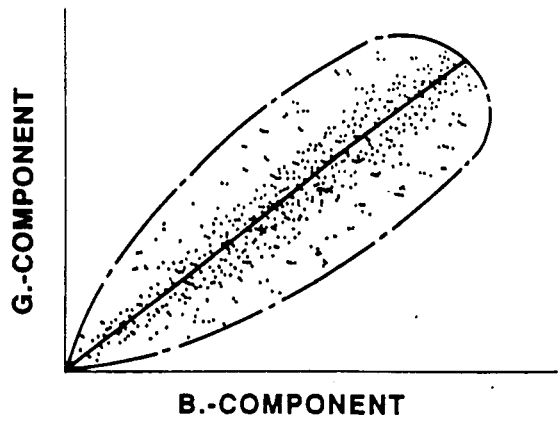
FIGS. 4a and 4b are explanatory views for showing the presence of correlation between different color signal components.

Meanwhile, the result of examining the relationship between the green (G) component and the blue (B) component of a normal endoscope image is shown in FIG. 4a. From the plots of FIG. 4a, it will be found that both the G component and the B component of respective pixels constituting the endoscope image are scattered within a limited zone about a line represented by some linear function. Although the scattering or dispersion is dependent on objects, many of the pixels are present near the linear line at the center in any case. Therefore, it can be considered that the ratio of the G component to the B component of many pixels of the normal endoscope image is substantially constant.

Figure 4B:
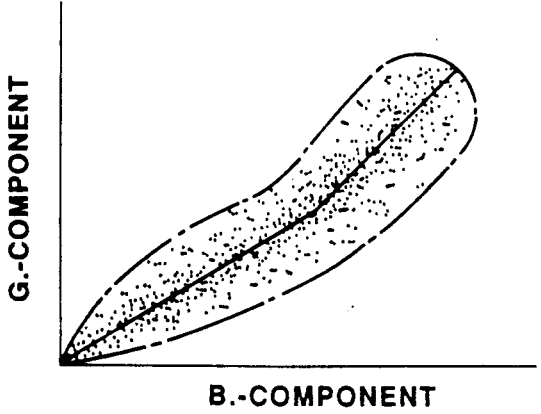

For some objects, it is also found that the G component and the B component are distributed around a bent linear line as shown in FIG. 4b. However, the bent linear line has a simple shape. Thus, by dividing the plotted zone into sub-zones dependent on the magnitude of the pixel data, the ratio of the G component to the B component can be regarded to be substantially constant. Note that the substantially similar relationship is found for the other R component as well.

Figure 5:
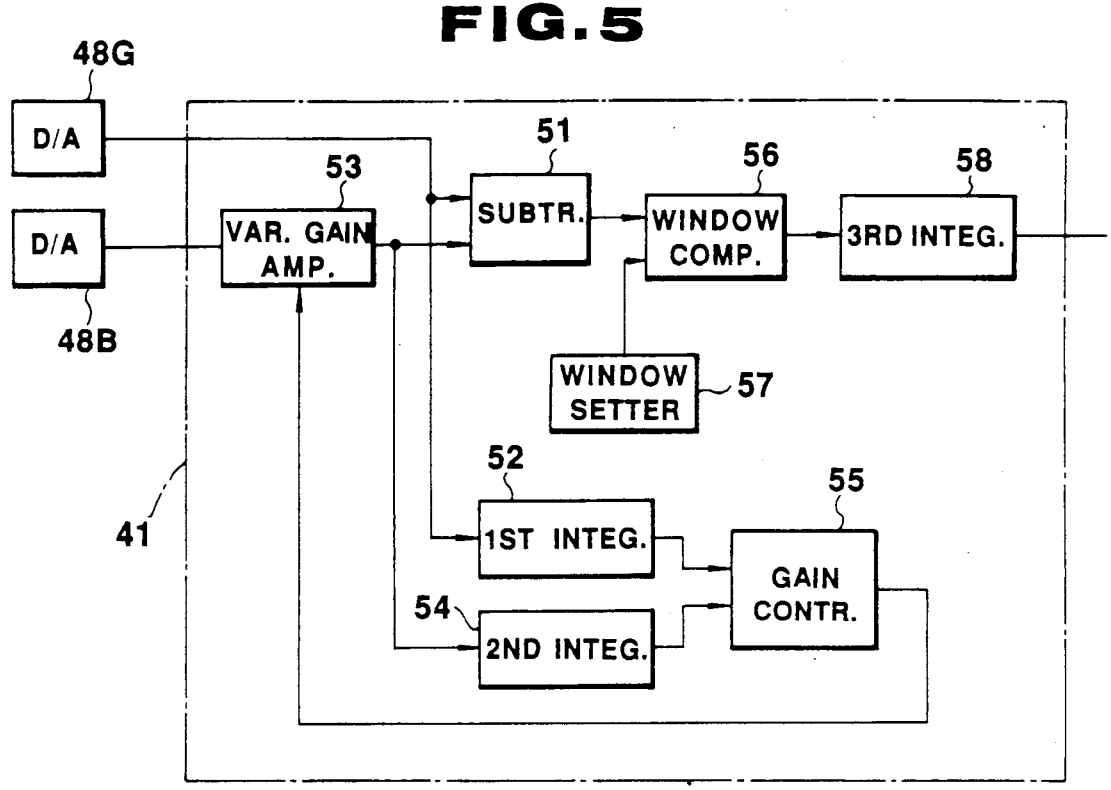

In view of the above fact, the color smear detecting means 41 is constructed as shown in FIG. 5 by way of example. The color smear detecting means 41 shown in FIG. 5 is designed to detect image smear (movement) from the green and blue time-serial image signals, thereby determining color smear.

More specifically, the output of the D/A converter 48G is applied to one input terminal of a subtracter 51 and also to a first integrator 52. On the other hand, the output of the D/A converter 48B is applied to the other input terminal of the subtracter 51 via a variable gain amplifier 53 and also to a second integrator 54. Respective outputs of the first integrator 52 and the second integrator 54 are then applied to a gain controller 55 for controlling gain of the variable gain amplifier 53. Thus, an output terminal of the gain controller 55 is connected to a gain control input terminal of the variable gain amplifier 53.

An output terminal of the subtracter 51 is connected to a window comparator 56, and a window setter 57 for setting a window is also connected to the window comparator 56. An output terminal of the window comparator 56 is connected to the third integrator 58 of which output is applied as the output of the color smear detecting means 41 to the aforesaid comparator 42.

As to the first embodiment constructed as mentioned above, operation of the color smear detecting means 41 will first be described below. The output of the D/A converter 48G is integrated by the first integrator 52 over a period of one field or one frame. In the meanwhile, the output of the D/A converter 48G is amplified by the variable gain amplifier 53 and then integrated by the second integrator 54 over a period of one field or one frame. The respective outputs of the first integrator 52 and the second integrator 54 are compared with each other in the gain controller 55. The output of the gain controller 55 is used to control gain of the variable gain amplifier 53 so that the outputs of both the integrators 52, 54 become equal to each other.

As a result, although the G component has a higher level than the B component in the normal endoscope image, the G component and the B component of the image signals applied to the subtracter have their integrated values over a period of one field or frame equal to each other. The subtracter 51 issues a difference between the output of the D/A converter 48G and the signal output from the variable gain amplifier 53. When no color smear occurs, there are many pixels which make the output of the subtracter 51 substantially zero, i.e., those pixels which have the G component and the product of the B component multiplied by the gain of the variable gain amplifier 53 equal to each other in value. To the contrary, when color smear occurs, there are less pixels, which make the output of the subtracter 51 substantially zero, than the above case where no color smear occurs.

The window comparator 56 extracts only those image signals which make the output of the subtracter 51 substantially zero, and the third integrator 58 integrates those image signals over the entire region of the image, thereby providing a degree of color smear for the entire region of the image. Accordingly, the output of the third integrator 58 indicates a degree of color smear. Thus, the output of the color smear detecting means 41 is applied to the comparator 42 to judge the presence or absence of color smear by determining whether or not the detected degree of color smear exceeds a limit value.

Operation for reducing color smear will be described below.

The output signals R, G, B of the video circuit 36 are applied to the color smear detecting means 41. When color smear occurs, the presence thereof is detected by the color smear detecting means 41 which issues a signal dependent on a detected degree of color smear.

That output of the color smear detecting means 41 is compared with a preset limit degree of color smear in the comparator 42. When the detected color smear exceeds a preset limit value, the comparator 42 drives the switch driver 44 for changing over the switches S1, S2 to the side of the terminals b.

As a result, applied to the R and B inputs of the display 16 are signals obtained by adjusting the amplitude of the G signal through the amplitude adjusters 38, 39, respectively. Use of the amplitude adjusters 38, 39 allows the image of the object, i.e., the endoscope image, to be displayed in certain color.

The image in certain monochromatic color is easier to see and makes human eyes less fatigued than the image affected with color smear. That certain color may be set to one near a tone of the normal endoscope image, for example.

Figure 22:
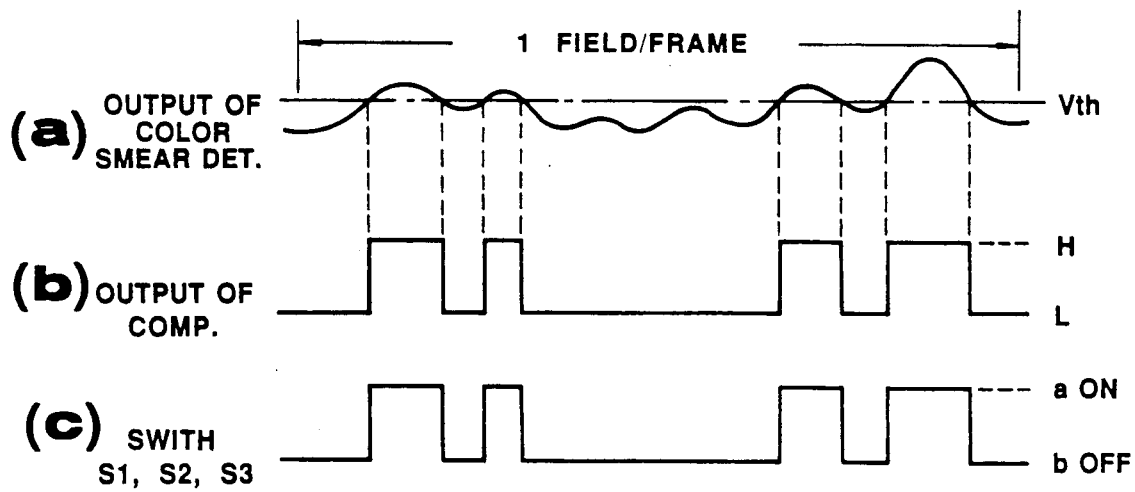
FIG. 22 is an explanatory view for operation of the case of using the color smear detecting means of FIG. 21.

It is to be noted that when color smear is detected, the color smear may be reduced over a period ranging from the current to next fields/frames (described later in detail in connection with FIG. 20), or over a period of only the current field/frame in which the color smear is detected (see FIG. 22).

With the above first embodiment, detection as to the presence or absence of color smear is performed for each field/frame and, if color smear is detected, the color smear can be reduced in the next field/frame. This make it possible to provide the system adaptable for a motion picture as well, and to reduce the color smear in real time. In addition, the color can be reduced with the relatively simple construction.

Figure 6:
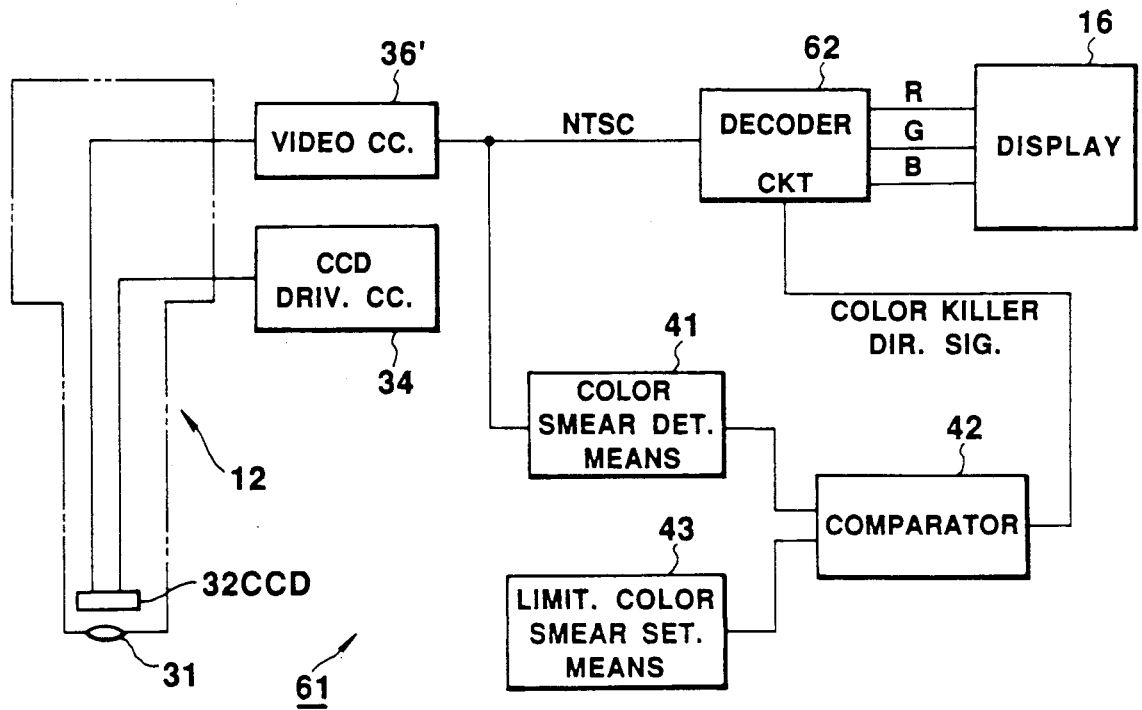
FIG. 6 is a diagrammatic view showing the configuration of an imaging apparatus for a endoscope of a second embodiment.

FIG. 6 shows the configuration of a main part of an imaging apparatus 61 for an endoscope according to a second embodiment of the present invention.

While in the above-mentioned first embodiment, the image is displayed in certain preset color when color smear is detected, a black-and-white image is displayed in this embodiment.

Note that the same elements as those in the first embodiment are designated by the same reference numerals. Though the light source and the light guide are omitted here in FIG. 6, they have the same construction as that shown in FIG. 2.

In the second embodiment, the output signal of the CCD 32 is applied to a video circuit 36' (constituted by providing an NTSC encoder at the output terminal of the video circuit 36 in FIG. 2) which produces a composite video signal in conformity with NTSC codes. The composite video signal is input to a decoder 62 for conversion to three primary color signals R, G, B which are then input to a display 16.

The output of the video circuit 36' is also applied to a color smear detecting means 41 of which output is applied to one input terminal of a comparator 42.

Applied to the other input terminal of the comparator 42 is a reference voltage value which corresponds to a limit degree of color smear and is issued from a limit color smear setting means 43. An output of the comparator 42 serves as a color killer directing signal applied to a color killer terminal CKT of the decoder 62. When the comparator 42 determines the presence of color smear exceeding a preset limit value, the color killer function is effected upon an output based on the determination. In this case, the signals output from the decoder 62 are given in the form of only luminance (brightness) signals.

The remaining part is similar to that in the foregoing first embodiment.

Operation of the second embodiment will be described below.

When color smear occurs in the output signal of the video circuit 36', the color smear detecting means 41 detects a degree of the color smear and a detection signal is sent to the comparator. The comparator 42 compares the detection signal with a preset limit value of color smear. When the detected degree of color smear exceeds a predetermined level, the color killer directing signal is output to the color killer terminal CKT of the decoder 62. Upon receiving the color killer directing signal, the decoder 62 drives an internal color killer circuit (not shown) so that only the luminance signals are decoded and output to the display 16. As a result, when there occurs color smear larger than a predetermined level, the image is displayed as a black-and-white one on the display 16 rather than a three primary color image affected with color smear, thereby allowing the eyes of a viewer to be less fatigued. Note that the color smear detecting means 41 in this embodiment can be so arranged as to detect the presence of color smear for the NTSC composite video signal ranging over two successive fields/frames.

Figure 7:
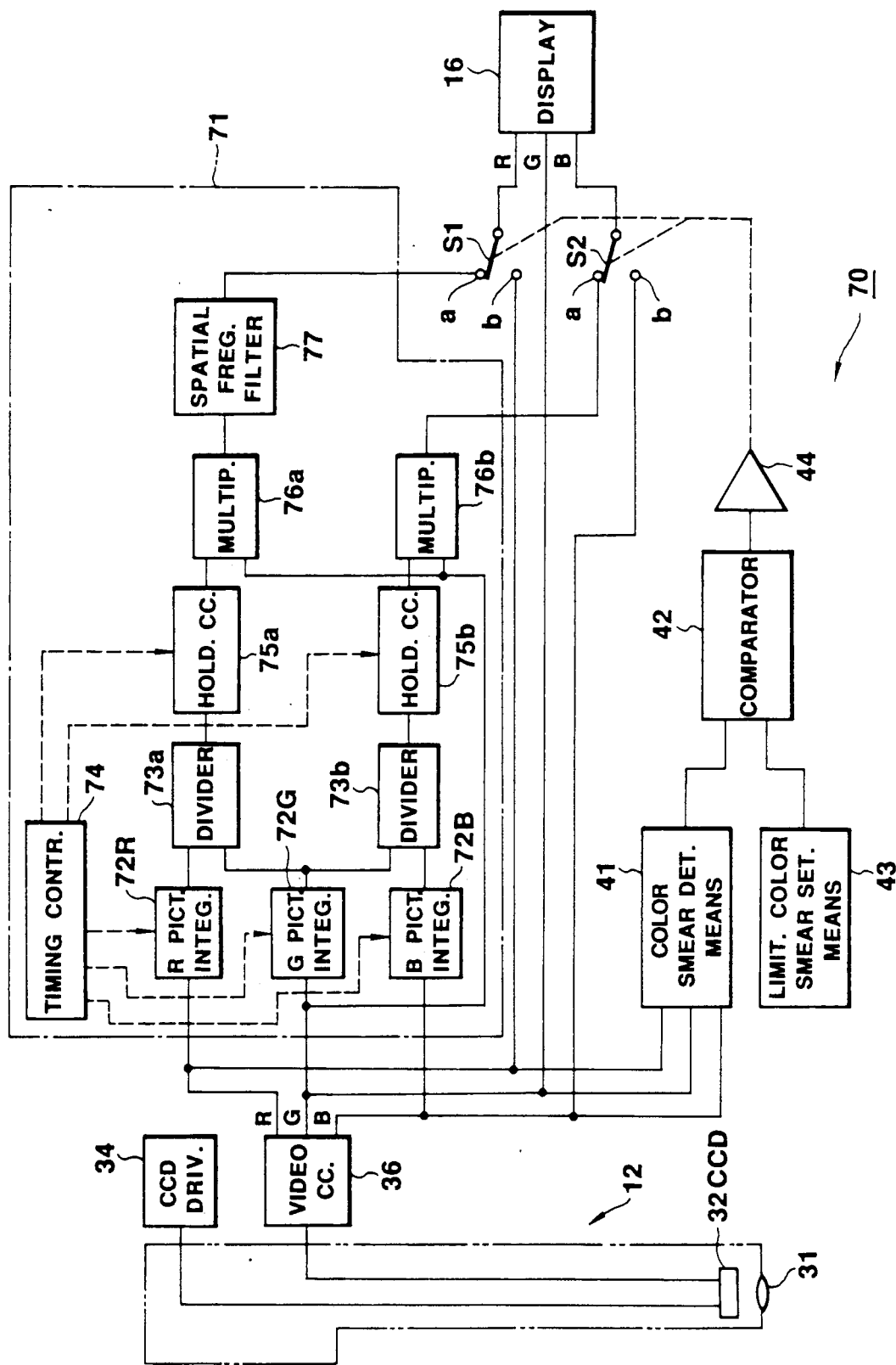
FIG. 7 is a diagrammatic view showing the configuration of an imaging apparatus for an endoscope of a third embodiment.

FIG. 7 shows an imaging apparatus 70 for an endoscope according to a third embodiment of the present invention.

This embodiment includes a pseudo-color signal component producing means 71 which is designed to create other color components from a particular color component in a simulated manner. When color smear occurs, the means 71 is operated to display a color image free of color smear.

Output signals R, G, B of a video circuit 36 are applied to an R image integrator 72R, a G image integrator 72G, and a B image integrator 72B, respectively, as well as to a color smear detecting means 41. Also, the output signal G is directly issued to the display 16, while the output signals R, B are issued to the display 16 via contacts b of switches S1, S2, respectively.

The output signals R, G, B are integrated by the R, G, B image integrators 72R, 72G, 72B over a period of one frame or one field to become averaged integral signals $<R>$, $<G>$, $<B>$, respectively, which are applied to two dividers 73a, 73b as illustrated.

Incidentally, the R, G, B image integrators 72R, 72G, 72B are controlled in timing of their integrating operations by a timing controller 74 which comprises a microprocessor or the like.

The dividers 73a, 73b each comprise an analog divider or the like. The integral signals $<R>$, $<B>$ of the R, B image integrators 72R, 72B are applied to dividend input terminals of the dividers 73a, 73b, respectively, and the integral signal $<G>$ of the G image integrator 72G is applied to both of divisor input terminals of the dividers 73a, 73b.

The dividers 73a, 73b perform division operations during a blanking period, and the processed results are held in hold circuits 75a, 75b, respectively, each comprising a sample/hold circuit or the like. Upon application of a hold pulse output from the timing controller 74 after the above division operations and within the blanking period in which the division operations have been performed, the hold circuits 75a, 75b hold the respective quotients, i.e., $<R>/<G>$ and $<B>/<G>$, over a period of next one field/frame.

The values held in the hold circuits 75a, 75b are applied to multipliers 76a, 76b where they are multiplied by the output signal G of the video circuit 36 to issue product signals $G<R>/<G>$, $G<B>/<G>$, respectively.

The output signal $G<R>/<G>$ of the multiplier 76a is applied to a spatial frequency filter 77 for transmitting the low frequency component of the spatial frequency therethrough, i.e., a low-pass filter, so as to produce a pseudo-R signal (referred to also as a pseudo-color signal R') which is then applied to a contact a of the switch S1. Likewise, the output signal $G<B>/<G>$ of the multiplier 76b, i.e., a pseudo-B signal (referred to also as a pseudo-color signal B') is applied to a contact a of the switch S2.

The above low-pass filter is provided in view of the fact that the signal R generally has the spatial frequency component limited to a lower frequency region as compared with the signal G in the endoscope image. Thus, the low-pass filter is intended to make the pseudo-R signal (before passing through the low-pass filter) produced using the signal G, i.e., $G<R>/<G>$, more approximate to the actual red signal R with the step of passing it through the low-pass filter.

On the other hand, an output of the color smear detecting means 41 is applied to a comparator 42 where it is compared with an output value of a limit color smear setting means 43. An output of the comparator 42 issued dependent on the result of comparative determination controls via a switch driver 44 changing-over of the switches S1, S2 which are operated in interlock relation.

Operation of this third embodiment will be described below.

The output signal R of the video circuit 36 is applied to the R image integrator 72R where it is integrated over a period of one frame or one field to produce the averaged integral signal $<R>$.

Then, the divider 73a performs division operation during a blanking period to output $<R>/<G>$, and this result is held in the hold circuit 75a.

Likewise, the output signal B of the video circuit 36 is integrated by the B image integrator 72B over a period of one frame or one field to produce the averaged integral signal $<R>$. Then, $<B>/<G>$ is output from the divider 73b during a blanking period, and this result is held in the hold circuit 75a.

Upon start of the next field/frame, the timing controller 74 sends s reset signal to the R, G, B image integrators 72R, 72G, 72B so that they are reset to begin the similar integrating operation for the next field/frame. At this time, the hold circuits 75a, 75b are not reset and keep holding the respective values in the preceding last field/frame, i.e., the values one field/frame before the current time.

Thus, the multiplier 76a multiplies the G signal in the new field/frame by the output of the hold circuit 75a, thereby issuing $G<R>/<G>$.

As mentioned above, the signals R, G, B of the endoscope image have strong correlation therebetween.

Accordingly, multiplication of the signal G by the coefficient of $<R>/<G>$ can produce a signal close to the original red signal R. However, taking into account the fact that the signal R generally has the spatial frequency component limited to a lower frequency region as compared with the signal G in the endoscope image, the output of the multiplier 76a is applied to the spatial frequency filter 77 for transmitting the lower frequency component to produce the pseudo-R signal more approximate to the actual red signal R.

On the other hand, the signal B is similarly processed to produce $G<B>/<G>$ using the signal G, thereby creating the pseudo-B signal instead of the original blue signal B.

It is to be noted that since the signal G and the signal B have their spatial frequency components within a nearly equal range of bands in the endoscope image, the spatial frequency filter 77 provided for the pseudo-R signal is not necessary for the pseudo-B signal.

Meanwhile, the color smear detecting means 41 detects a degree of color smear based on the output signals R, G, B from the video circuit 36, and the detected degree of color smear is applied to the comparator 42.

The comparator 42 monitors whether or not the degree of color smear is equal to or larger than a limit value preset by the limit color smear setting means. When it becomes equal to or larger than the preset value, the switch driver 44 is driven to change over the switches S1, S2 to the side of the contacts a. When the degree of color smear is reduced down below the preset value, the switches S1, S2 are returned to the side of the contacts b for normal color display.

In other words, if the degree of color smear is smaller than the preset value, the original three primary color signals R, G, B are applied to the display 16 for normal display of a color motion picture. If the degree of color smear becomes equal to or larger than the preset value, the color signal G and the two pseudo-color signals R', B' both produced using the color signal G are applied to the display 16, whereby a pseudo-color motion picture is displayed using those three signals R', G, B'.

Thus third embodiment has the features as follows.

In the case of the presence of color smear, if the image is displayed in colors directly without any correction, the outline portions (or the boundary portions) would be displayed by the respective color signals R, G, B affected with color smear. In the third embodiment, however, the color display is performed using the green color signal G (i.e., one of the three color signals R, G, B) and the psuedo-color signals R', B' (i.e., $G<R>/<G>$, $G<B>/<G>$) produced from the color signal G). Therefore, the outline portions become free of color smear. Also, because the psuedo-color signals R', B' are set to average values of the R and B images in the preceding last field/frame, respectively, the color display can be performed with a tone little different from the one as produced in the case of undergoing no color smear (in a degree not less than the preset value).

Accordingly, the color motion picture displayed with this embodiment is much easier to see than that displayed by the three primary color signals R, G, B left affected with color smear. Furthermore, although the display mode is switched between the case in the absence of color smear and the case in the presence of color smear, changes in a tone upon switching of the display mode is so small to prevent the viewer from having an awkward feeling. The above advantages are particularly more effective in the case of a motion picture.

Figure 8:
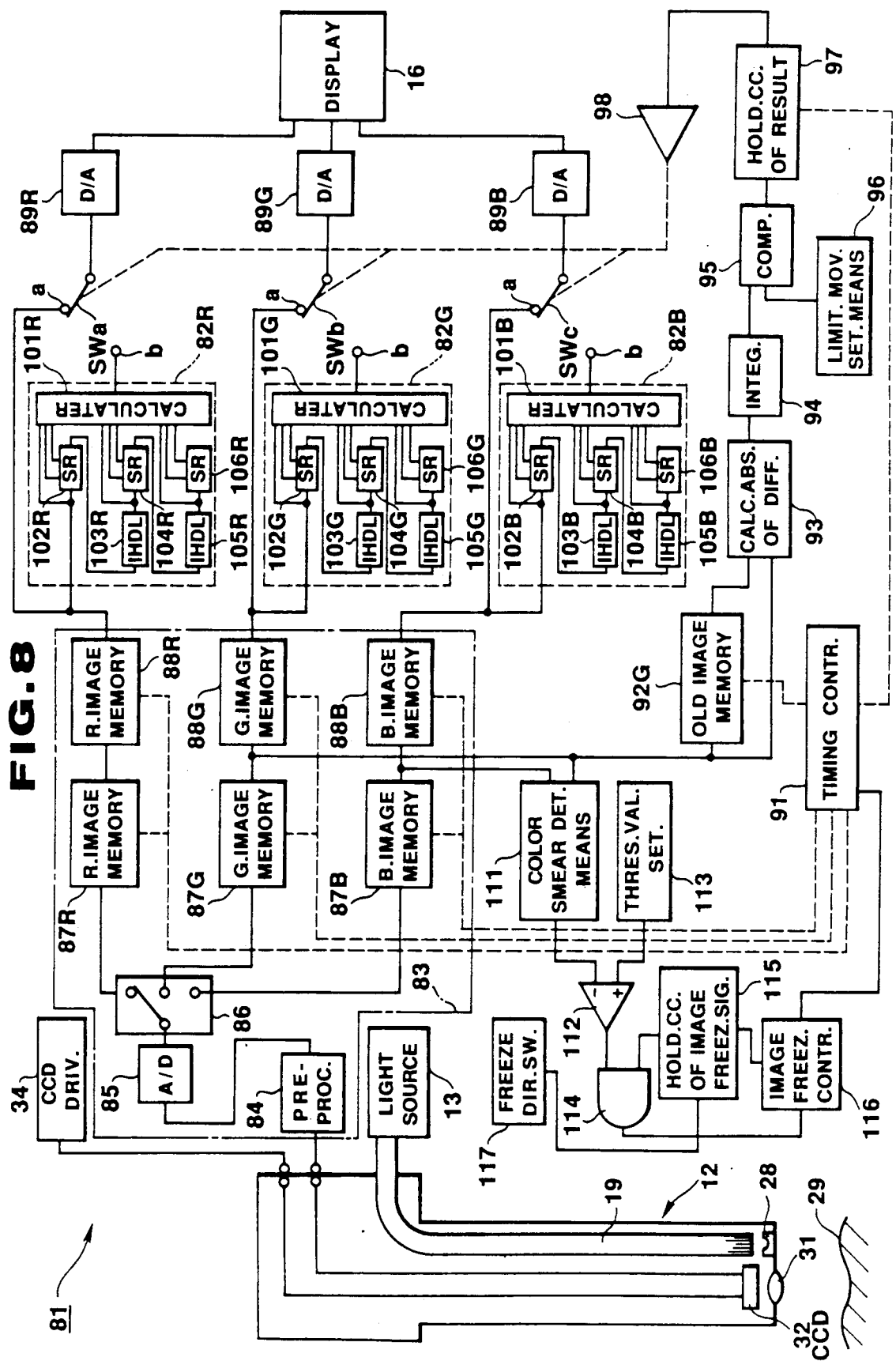
FIG. 8 is a diagrammatic view showing the configuration of an imaging apparatus for an endoscope of a fourth embodiment.

FIG. 8 shows an imaging apparatus 81 for an endoscope of a fourth embodiment of the present invention. In this embodiment, when a relative speed between an object 29 and an electronic scope 12 reaches or exceeds a certain level, the images of respective color components are processed to pass through spatial frequency filters 82R, 82G, 82B.

An output signal of a CCD 32 in the electronic scope 12 is applied to a pre-processor 84 as one component of a video circuit 83 and, after amplification and other processing, is converted to a digital image signal by an A/D converter 85. The digital image signal is sequentially stored in R, G, B image memories 87R, 87G, 87B via s multiplexer (select switch) 86. The image data of respective color components stored in those image memories 87R, 87G, 87B are then applied to freezing R, G, B image memories 88R, 88G, 88B of the next stage. In a normal mode, the image data in the previous stage are input to those freezing image memories 88R, 88G, 88B which in turn issue the input image data sequentially. In a freeze-display mode, they issue the freeze-image data.

Outputs of the freezing R, G, B image memories 88R, 88G, 88B are input to the R, G, B spatial frequency filters 82R, 82G, 82B and also applied to one contacts a of change-over switches SWa, SWb, SWc operated in interlock relation, respectively. Outputs of the R, G, B spatial frequency filters 82R, 82G, 82B are the other contacts b of the switches SWa, SWb, SWc, respectively.

Signals having passed through the switches SWa, SWb, SWc are applied to D/A converters 89R, 89G, 89B, respectively, for conversion to analog signals which are then applied to display 16. Writing and reading of the image data into and from the image memories 87R, 87G, 87B and 88R, 88G, 88B are controlled by a timing controller 91.

On the other hand, the output of the G image memory 87G is also applied to an absolute-of-difference calculator 93 directly and via an old (previous) image storing memory 92G.

The old image storing memory 92G is a memory for storing the G component image in the preceding last field/frame and comprises a semiconductor memory or the like.

The image data in the preceding last field/frame from the old image storing memory 92G and the image data in the current one field/frame from the G image memory 87G are input to the absolute-of-difference calculator 93 which in turn issues an absolute value of the difference between those two input image data. The absolute-value-of-difference calculator 93 comprises a ROM table or the like, and an output of this calculator 93 is integrated by an integrator 94 over one field/frame. The integrator 94 comprises a digital adder, a register or the like. An output of the integrator 94 is applied to a comparator 95 for comparison with an output of a limit movement setting means 9.6 which comprises a variable resistor or the like. An output of the comparator 95 is applied to a result holding circuit 97 which comprises a flip-flop or the like. Dependent on the held value, this circuit 97 drives the switches SWa, SWb, SWc via a switch driver 98.

Meanwhile, the R, G, B spatial frequency filters 82R, 82G, 82B are each of the same construction and arranged into a matrix filter of 3×3, for example.

The output data of the R image memory 88R is applied to a calculator 101R and a first shift register 102R, followed by entering the calculator 101R again via a first 1H delay line 103R. Further, an output of the first 1H delay line 103 is applied to a second shift register 104R, and then to the calculator 101R and a third shift register 106R via a second 1H delay line 105R.

The 1H delay lines 103R, 105R are each to delay the image data by a period of one horizontal scan period, and comprises a large-scaled shift register or the like.

The shift registers 102R, 104R, 106R are each to delay the input image data in synchronism with a clock, thereby to provide the image data shifted by one and two pixels in the horizontal direction. The resulting shifted image data are applied to the calculator 101R along with the image data before shifting.

Figure 9:
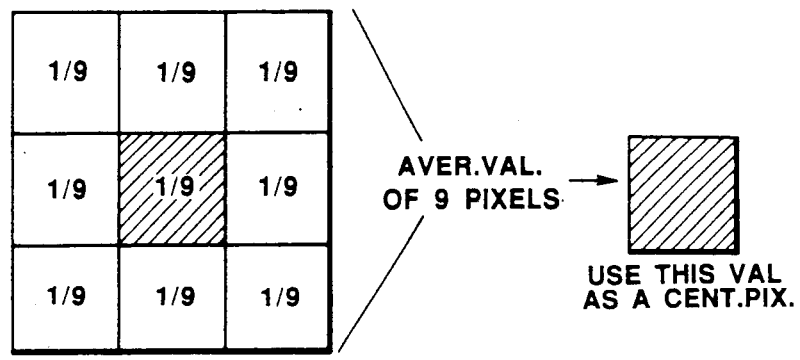
FIG. 9 is an explanatory view showing the arithmetic processing operation of a spatial frequency filter in the fourth embodiment.

Specifically, the calculator 101R receives the image data over three lines which data include three pixels shifted by one pixel for each line, and performs integrating and summing operations the image data corresponding to the pixels of 3×3. The integrating and summing operations are carried out, as shown in FIG. 9, such that an average value of the nine pixels is calculated by weighting to respective pixel data the reciprocal of the number of pixels subjected to the integrating and summing operations, i.e., the reciprocal of nine (1/9), and this calculated average value is output as the image data of the central pixel (in other words, the calculator 101R outputs a signal to the contact b of the switch SWa at the timing of the central pixel).

The other G, B spatial frequency filters 82G, 82B have the same construction as the R spatial frequency filter 82R. Therefore, the components of those filters 82G, 82B are designated by using "G", "B" in place of "R" suffixed to the reference numerals representing the components of the spatial frequency filter 82R, and not explained here.

In addition, this embodiment further includes a means for displaying a freeze-image less affected with color smear.

The outputs of the image memories 87G, 87B are applied to a color smear detecting means 111 of which output is in turn applied to a comparator 112 for comparison with a reference value from a threshold value setting means 113. When an output value of the color smear detecting means 113 becomes equal to or smaller than the reference value, the comparator 112 issues an output signal of "H" to one of two input terminals of an AND circuit 114. Applied to the other input terminal of the AND circuit 114 is output from an image freezing signal hold circuit 115. Thus, during the time when the hold signal assumes a level of "H", the AND circuit 114 applied an output signal of the comparator 112 to an image freezing controller 116.

The image freezing signal hold circuit 115 outputs a hold signal for a certain period in response to a freeze directing signal which is issued upon actuation of a freeze directing switch 117. During an output period of the above hold signal, a true value signal of the comparator 112 is applied to the image freezing controller 116 via the AND circuit 114, whereupon the image freezing controller 116 outputs a signal to inhibit writing of the new image data into the image memories 88R, 88G, 88B immediately after application of the above true value signal. On this occasion, the timing controller 91 also resets the data in the result hold circuit 97 to forcibly select the contacts a of the switches SWa, SWb, SWc.

Thus, when the image data of the image memories 88R, 88G, 88B are given by freeze-images upon change in the mode (i.e., when updating of the images is stopped), the freeze-images in the image memories 88R, 88G, 88B are displayed on the display 16.

In this connection, when the freeze directing switch 117 is actuated again while the freeze-images are being displayed, this actuation signal is applied to the image freezing controller 116 via the image freezing signal hold circuit 115, whereupon the controller 116 sends a control signal to the timing controller 91 for returning to a motion picture mode.

Operation of the fourth embodiment arranged as mentioned above will be described below.

First, the function of reducing color smear in a motion picture mode will be explained.

An absolute value of the difference between the current G component image, i.e., the image data in the G image memory 87G, and the G component image in the preceding last field/frame, i.e., the image data in the old image storing memory 92G, is calculated by the absolute-value-of-difference calculator 93 and the calculated result is integrated by the integrator 94 over one field/frame.

The comparator 95 makes comparison to determine whether or not the integrated result is equal to or larger than the reference value preset by the limit movement setting means 96. During a blanking period, the compared result is sent to the result hold circuit 97.

The result hold circuit 97 keeps holding the integrated result for the next filed/frame.

For example, when the integrated result exceeds the present value, i.e., when the relative movement is large, the switch driver 98 is driven by the output of the result holder circuit 97 so that the switches SWa, SWb, SWc are changed over to turn on at their contacts b.

On the other hand, when the integrated result falls below the present value, the switches SWa, Swb, SWc are changed over to turn on at their contacts a as shown in FIG. 8. Accordingly, the image to be displayed on the display 16 via the D/A converters 89R, 89G, 89B are given as follows;

(a) When the relative movement is equal to or smaller than a predetermined value: original images, (b) When the relative movement exceeds the predetermined value: images obtained by passing the original images through the spatial frequency filters 82R, 82G, 82B (i.e., images blurred or not clear in their portions affected with color smear).

If the original images are displayed directly in the case of the relative movement exceeding the predetermined value, the color smear would get to become non-negligible or conspicuous in the displayed picture. With this embodiment, however, the images are displayed through the spatial frequency filters 82R, 82G, 82B using the values averaged including adjacent pixels, thereby to make the picture blurred. As a result, the color smear is reduced and becomes not conspicuous in the outline portions of the displayed picture.

In the case of a motion picture, particularly, the color smear of the picture under observation can further be reduced with the combined effect of an afterimage function of the human eyes.

In this connection, the timing controller 91 makes control in such a manner that the calculation of an absolute value of the difference between the image data in the old image storing memory 92G and the current image data is performed concurrently with transfer of the data from the image memory 87G to the image memory 88G, and transfer of the data from the image memory 88G to the old image storing memory 92G is performed after completion of the above data transfer between the two memories.

The timing controller 91 also controls the timing to hold the output of the comparator 95 in the result hold circuit 97 during a blanking period.

Meanwhile, when the freeze directing switch 117 is depressed during the above motion picture mode, the image-freeze directing signal is sent to the image freezing signal hold circuit 115. Even after the freeze directing switch 117 has been released from its depressed state, the image freezing signal hold circuit 115 keeps holding the image-freeze directing signal.

On the other hand, the respective outputs of the G, B image memories 87G, 87B are applied to the color smear detecting means 111 which functions to detect a degree of color smear for each field/frame. The thus-detected degree of color smear is compared with a certain value present by the threshold value setting means 113. When the degree of color smear becomes equal to or smaller than the preset certain value, the comparator 112 issues one input terminal of and AND circuit 114. Applied to the other input terminal of the AND circuit 114 is the output of the image freezing signal hold circuit 115. Therefore, only when both of the comparator 112 and the image freezing signal hold circuit 115 output signals of a true value, the AND circuit 114 sends a control signal to the image freezing controller 116.

In response to the above control signal, the image freezing controller 116 outputs a signal to the timing controller 91 for instruction of image-freeze. This causes the timing controller 91 output a signal to inhibit writing of the image data into the image memories 88R, 88G, 88B after a next blanking period. The image memories 88R, 88G, 88B are forced to stop updating of the images and hold the freeze-images. At the same time, the timing controller 91 resets the result hold circuit 97 to fix the switches SWa, SWb, SWc into the positions where their contacts a are selected. Consequently, the display 16 displays a still (freeze-) picture less affected color smear.

Note that by depressing the freeze directing switch 117 again, the apparatus is returned from the still picture mode to the motion picture mode.

With this fourth embodiment, therefore, the color image less affected with smear color can be displayed in any case of presenting a motion picture and a still picture.

Figure 10:
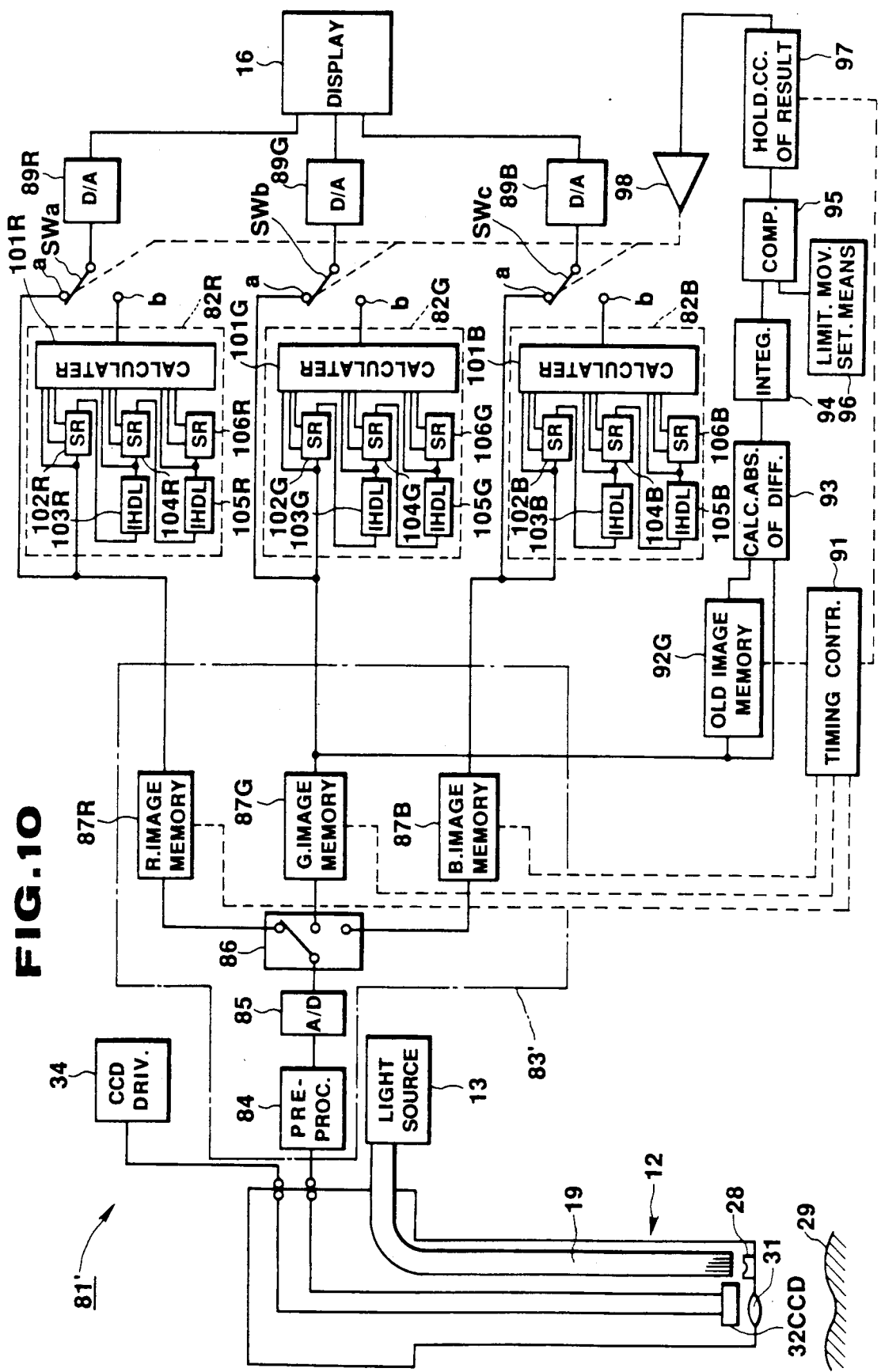
FIG. 10 is a diagrammatic view showing the configuration of an imaging apparatus for an endoscope according to a modification of the fourth embodiment.

Although the above fourth embodiment is arranged to include a still picture mode, the imaging apparatus for an endoscope may be arranged to include only a motion picture mode like an apparatus 81' according to a modification shown in FIG. 10.

In FIG. 10, the video circuit 83 in FIG. 8 is replaced with a video circuit 83' which does not include the image memories 88R, 88G, 88B. In this modification, the image memories 87R, 87G, 87B each comprise a dual-port memory which allows the image data to be written into and read out of the memory independently, or a pair of memories provided in parallel to allow independent writing and reading through switching between the paired memories.

Further, this modification does not include a series of components from the color smear detecting means designated by 111 to the freeze directing switch 117 designated by 117, and the remaining part is constructed in a like manner to that shown in FIG. 8.

Operation and effect of this modification are the same as those in the case of a motion picture mode in the above fourth embodiment.

In the above fourth embodiment and the modification thereof, the color signals R, G, B are all subjected to the process of spatial frequency filtering. But, such the filtering process may be applied to only the G, B components. Alternatively, the apparatus may be constructed like another modification shown in FIG. 11, for example. In an apparatus 120 of another modification, a matrix circuit 121 is disposed on the output side of the video circuit 83' in FIG. 10 (or possibly the video circuit 83 in FIG. 8) to produce a luminance signal Y and color difference signals R - Y, B - Y. For example, the color difference signals R - Y, B - Y are passed to spatial frequency filters 82a, 82b (which have the same construction as that of the aforesaid spatial frequency filter 82) and applied to contacts b of switches Sa, Sb, while they are also directly applied to contacts a of the switches Sa, Sb, respectively. Then, the color difference signals R - Y, B - Y having passed through the switches Sa, Sb and the luminance signal Y are converted to analog signals through D/A converters 122a, 122b, 122c, respectively. These analog signals are input to an NTSC encoder 123 to produce a composite video signal which is issued to the display.

Figure 11:
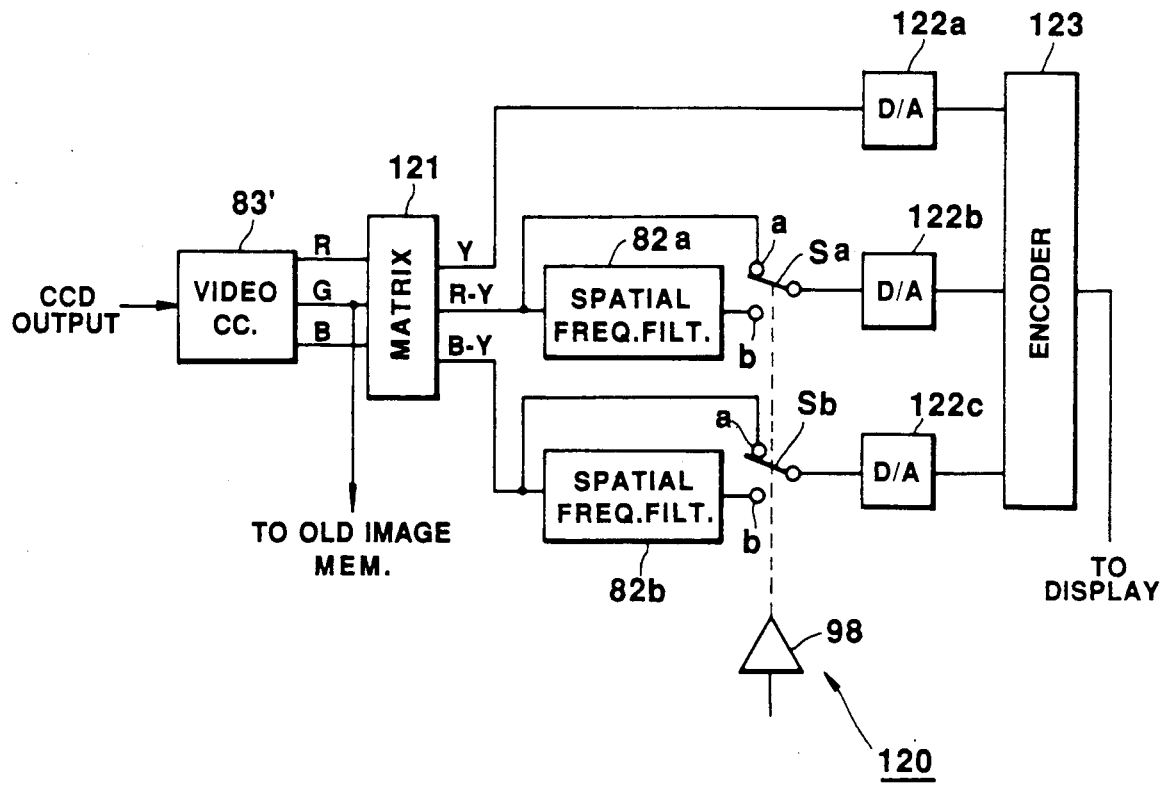
FIG. 11 is a block diagram showing a main part of another modification of the fourth embodiment.

The remaining part of the apparatus 120 is the same as that shown in FIG. 10 and hence not shown in FIG. 11. Thus, in the apparatus 120, the color difference signals R - Y, B - Y are passed to the spatial frequency filters 82a, 82b when color smear occurs.

Operation and effect of the apparatus 120 are substantially similar to those in the modification of FIG. 10.

In the apparatus of FIGS. 8 and 10, the color components are all subjected to the process of spatial frequency filtering under the same conditions. However, it is also possible to apply different weights to the matrix, or to change the matrix in size to be larger or smaller than the matrix of 3×3, dependent on the color components.

Furthermore, since a part of the data becomes zero in peripheral portions of the picture, it is preferable to execute the process of changing the size or coefficient of the matrix only in the peripheral portions.

In addition, the original images may directly be displayed in the peripheral portions without passing them through the process of spatial frequency filtering.

Figure 12:
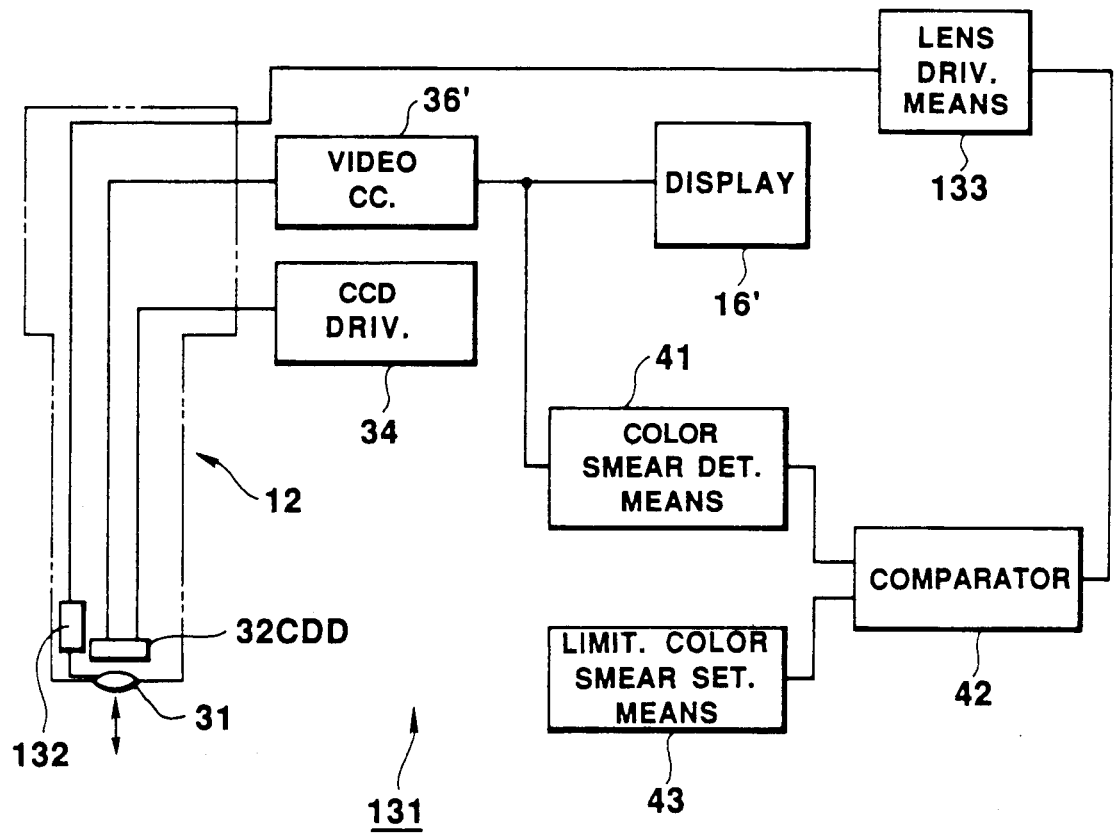
FIG. 12 is a diagrammatic view showing the configuration of an imaging apparatus for an endoscope of a fifth embodiment.

FIG. 12 shows a main part of an imaging apparatus 13 according to a fifth embodiment of the present invention.

This fifth embodiment is intended to reduce color smear by moving an object lens 31 in direction of its optical axis defocusing, for example, when color smear occurs.

The object lens 31 is mounted in such a manner as able to move in the direction of its optical axis by employing a piezoelectric element 132. The piezoelectric element 132 is connected to a lens driving means 133 via a signal line 134 so that a drive signal for moving the object lens 31 can be supplied to the piezoelectric element 132. The lens driving means 133 is designed to control issuance of the drive signal dependent on the output of a comparator 42.

A CCD 32 is read out upon a drive signal from a CCD driver circuit 34, and an output signal of the CCD 32 is applied to a display 16' via a video circuit 36' and also to a color smear detecting means 41. Outputs of the color smear detecting means 41 and a limit color smear setting means 43 are applied to a comparator 42.

In place of implementing color killer dependent on the output of the comparator 42 in the second embodiment shown in FIG. 6, this fifth embodiment is directed to reduce color smear by moving the object lens 31 through the lens driving means 133 and the piezoelectric element 132.

The arrangement of other not-shown components such as a light source are the same as that in the first embodiment.

Operation of the fifth embodiment will be described below.

The color detecting means 41 detects a degree of color smear in the output of the video circuit 36'. The detected degree of color smear is compared with a certain value preset by the limit color smear setting means 43. When the degree of color smear is equal to or larger than the certain value, the lens driving means 133 is driven by the output of the comparator 42 so that the piezoelectric element 132 shifts the object lens 31 in the direction of its optical axis. As a result, an image of the object picked up by the CCD 32 is so defocused or blurred as to provide the effect equivalent to that obtainable in the case of the fourth embodiment using the spatial frequency low-pass filter 82R and the like.

It should be understood that although the fifth embodiment has been described as reducing color smear by moving the object lens 31 in the directions of its optical axis, the CCD 32 may instead by moved in the direction of the optical axis. As an alternative, the CCD 32 may be oscillated in the direction perpendicular to the optical axis.

Figure 13:
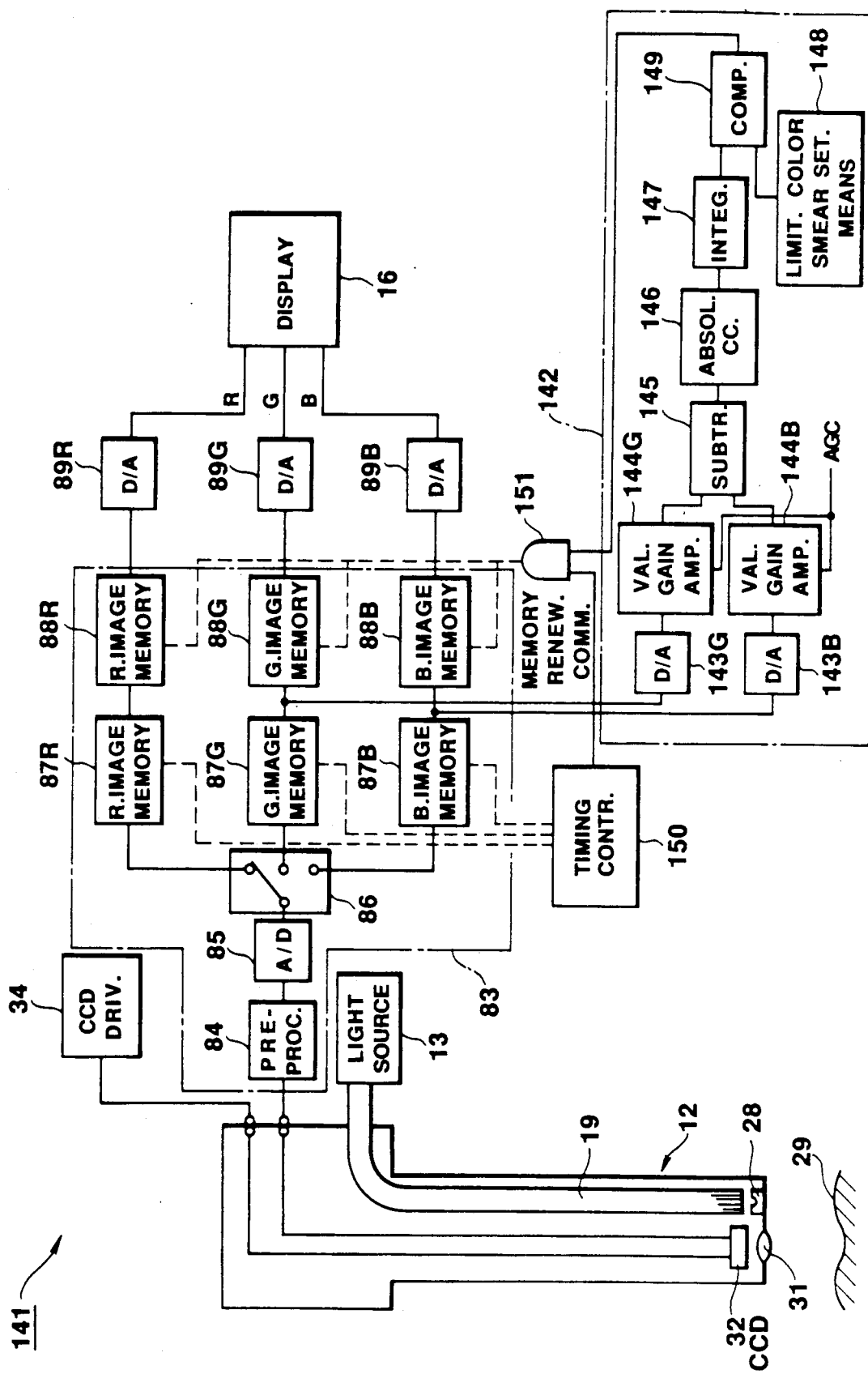
FIG. 13 is a diagrammatic view showing the configuration of an imaging apparatus for an endoscope of a sixth embodiment.

FIG. 13 shows the configuration of an imaging apparatus 13 according to a sixth embodiment of the present invention.

This sixth embodiment is intended to freeze a picture immediately before the occurrence of color smear, when it occurs, and then display the freeze-picture for a period in which the color smear continues to occur.

Comparing with the imaging apparatus 81 of FIG. 8, outputs of image memories 88R, 88G, 88B are, in this sixth embodiment, converted to analog color signals R, G, B through D/A converters 89R, 89G, 82B without entering the spatial frequency filters 82R, 82G, 82B, respectively, those analog color signals being then output to a display 16.

Further, the image data of G and B image memories 87G, 87B are also applied to D/A converters 143G, 143B which constitute components of an image display inhibit signal producing section 142, for conversion to analog color signals G, B, respectively. The analog color signals G, B are applied via variable gain amplifiers 144G, 144B to a subtracter 145 which comprises an operational amplifier or the like. The same AGC voltage is impressed to both gain control terminals of the variable gain amplifiers 144G, 144B so that the output signals of the image memories 87G, 87B are matched with each other in their amplitude.

A subtracted output of the subtractor 145 is applied to an absolute-value circuit 146, which comprises an operational amplifier or the like, for conversion to an absolute value. This absolute value is then applied to an integrator 147, which also comprises an operational amplifier or the like, to be integrated for one field/frame. An output of the integrator 147 is applied to a comparator 149 along with an output of a limit color smear setting means 148 for comparison of those two output values.

A signal output from the comparator 149 is applied to and AND circuit 151 along with a memory renewing (updating) command signal output from a timing controller 150.

The signal output from the comparator 149 functions as a gate signal to control issuance of the memory renewing command signal. When a level of the signal output from the integrator 147 exceeds a certain value preset by the limit color smear setting means 148, the comparator 149 outputs the signal, allowing the memory renewing command signal to be output to the image memories 88R, 88G, 88B. The remaining part is constructed similarly to that of the above fourth embodiment shown in FIG. 8.

Operation of this sixth embodiment will be described below.

At the timing when the image memories 87G, 87B are not selected by the multiplexer 86 (e.g., in the state shown in FIG. 13), namely, under the condition where the contents of the image memories 88G, 88B are not changed, the image data in the image memories 87G, 87B are read out and input to the D/A converters 143G, 143B, respectively.

The input image data are converted by the D/A converters 143G, 143B to the analog color signals G, B which are applied to the variable gain amplifiers 144G, 144B, respectively. The variable gain amplifiers 144G, 144B adjust the amplitudes of the analog color signals, G, B so that their integrated values over one field/frame become equal to each other.

In a normal endoscope image, the color signals G and B have so high correlation therebetween, as mentioned above, that both the outputs of the variable gain amplifiers 144G, 144B will become equal to each other if there occurs no color smear. Accordingly, in the absence of color smear, the output of the subtracter 145 has a small value. To the contrary, in the presence of color smear, the output of the subtracter 145 becomes considerably large because of the correlation being lost. Consequently, the output of the subtracter 145 is given by a signal corresponding to a degree of color smear. Since the output of the subtracter 145 may become either a positive or negative value, it is converted to an absolute valued by the absolute-value circuit 146 and then integrated by the integrator 147 all over the image. Thus, the output of the integrator 147 represent a degree of color smear occurred over the entire image. The output of the integrator 147 is compared in the comparator 149 with the certain value preset by the limit color smear setting means 148 for on/off control of the memory renewing command signal dependent on the result of the comparison. More specifically, when the degree of color smear over the entire image is equal to or larger than the certain value, the memory renewing command signal is turned off so that renewing of the contents of the image memories 88R, 88G, 88B is inhibited to freeze the images therein immediately before the occurrence of color smear.

Therefore, during the time when color smear continues to occur, the display 16 keeps displaying a still picture corresponding to the freeze-images. When the degree of color smear is reduced below the certain value, the memory renewing command signal is turned on to release the respective image memories from a freeze-state, allowing the viewer to observe a motion picture.

With this sixth embodiment, when color smear occurs, the immediately preceding picture not affected with color smear is displaced during the occurrence of color smear. This permits to avoid the viewer from observing the picture made hard or awkward to see with the color smear.

Figure 14:
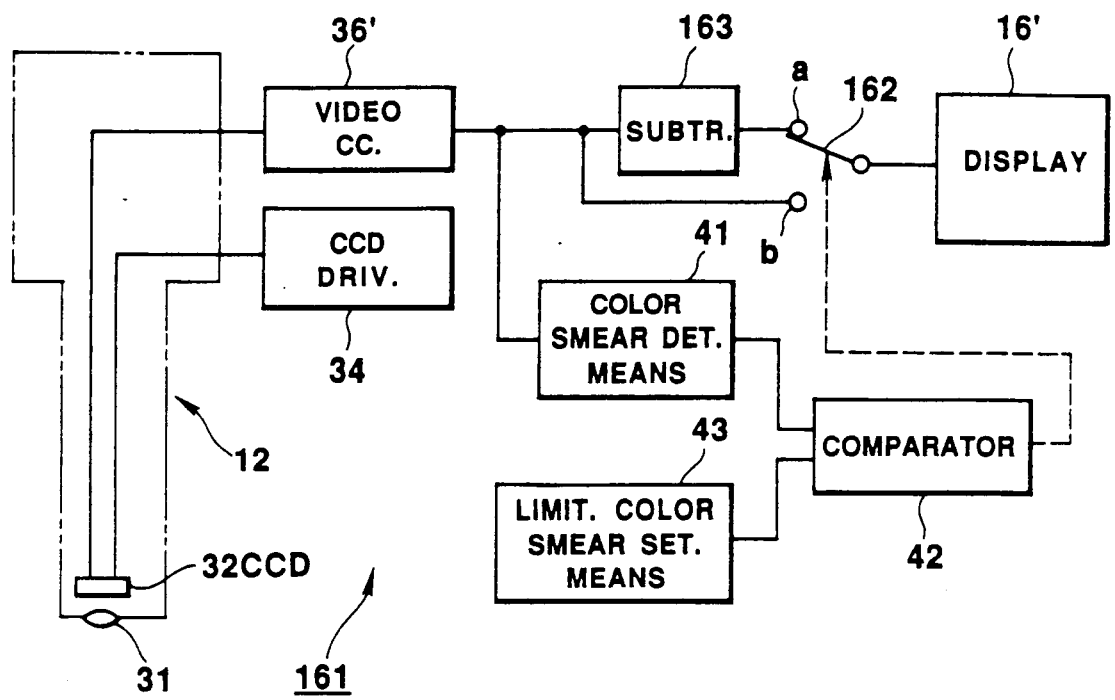
FIG. 14 is a diagrammatic view showing the configuration of an imaging apparatus for an endoscope of a seventh embodiment.

FIG. 14 shows as imaging apparatus 161 of a seventh embodiment of the present invention.

This embodiment is intended to reduce color smear by darkening the displayed picture during the occurrence of color smear, when color smear occurs.

Comparing with the second embodiment shown in FIG. 6, an output of a video circuit 36' is, in this seventh embodiment, applied to one contact b of a switch 162 directly and also to the other contact a of the switch 162 via an attenuator 163. The signal having passed through the switch 162 is input to a display 16'. A changing-over control signal for the switch 162 is given by an output of a comparator 42.

The remaining part is constructed similarly to that of the above second embodiment shown in FIG. 6.

Operation of the seventh embodiment will be described below.

When the output of the color smear detecting means 41 exceeds a certain value, the switch 162 is changed over to the side of the contact a by the output of the comparator 42, so that the picture on the display 16' is darkened. As a result, the primary color components of the picture affected with color smear are suppressed from stimulating the observer's eyes, whereby the adverse effect of color smear is alleviated. When the degree of color smear is reduced below the certain value, the switch 162 is turned to the sice of the contact b, allowing the observer to see a normal bright picture.

In this way, it becomes possible to keep the observer from seeing the picture affected with color smear exceeding the certain value.

The seventh embodiment has been described as darkening a picture displayed on the display 16' by the use of the attenuator 163, when color smear occurs. As an alternative, it is also possible to electrically or optically reduce sensitivity of the CCD 32 or make the illumination light darker.

Although the displayed picture is darkened in the above seventh embodiment, the video signal may instead be attenuated.

FIG. 15 shows an imaging apparatus 17 of an eighth embodiment of the present invention. In this embodiment, when color smear occurs, the color presence region on the color difference plane is restricted during the occurrence of color smear to reduce color smear of a picture affected with the color smear.

Output signals of a video circuit 36, as issued in a like manner to the first embodiment shown in FIG. 2, are converted by an encoder (matrix circuit) 172 to a luminance signal Y and color difference signals R-Y, B-Y. The color difference signals R-Y, B-Y are converted by A/D converters 172a, 173b to digital signals, respectively, which are then input to a region restricting means 174. The region restricting means 174 comprises a ROM or the like, for example, and is set to have characteristics that the relationship between address inputs and output data is restricted to fall within a region including no slant lines (referred to as a non-hatched region hereinafter) as shown in FIG. 16.

Figure 16:
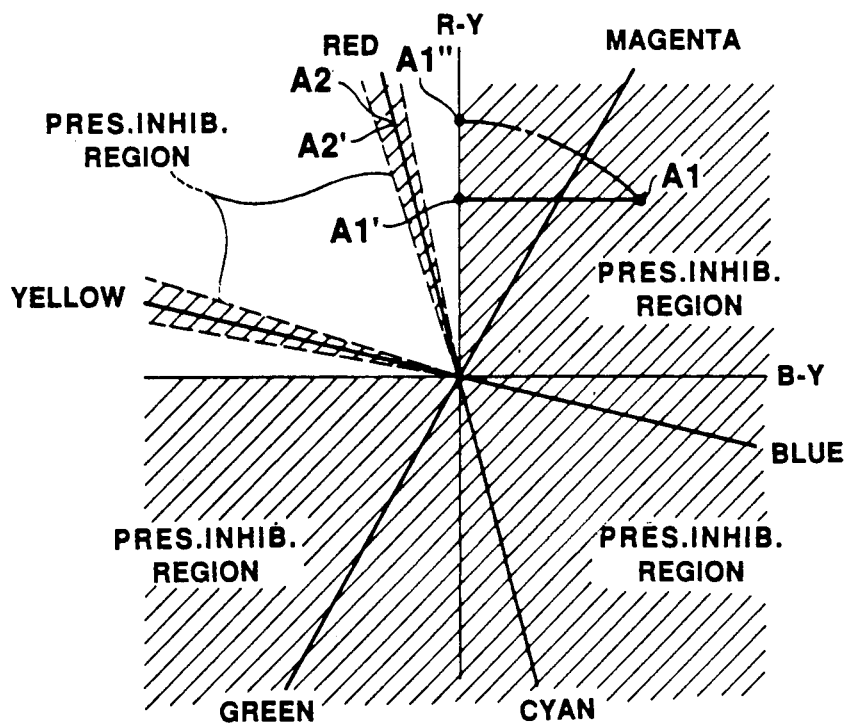
FIG. 16 is an explanatory view for operation of the eighth embodiment.

More specifically, the region restricting means 174 is designed to generally process the color difference signals R-Y, B-Y ranging over the first though fourth quadrants so that they are replaced with color difference signals in the second quadrant as shown in FIG. 16. In this process, the color difference signals in the hatched region are replaced with those belonging to the non-hatched region nearest to that hatched region.

For example, when the color difference signals R-Y, B-Y are given by a point A1 in FIG. 16, they are replaced with color difference signals representing a point A1' on the R-Y axis (alternatively, they may be replaced with a point A1" on the same arc).

Further, the color difference signals representing any primary color in the second quadrant, e.g., red or yellow, are replaced with those signals belonging to the nearby non-hatched region. For example, the color difference signals given by a point A2 are replaced with those signals representing a point A2'.

Output signals of the region restricting means 174 are converted by D/A converters 175a, 175b to analog color difference signals (R-Y)', (B-Y)', respectively, which are then input to a decoder 176 along with the luminance signal Y.

The decoder 176 converts the input signals to three primary color signals R, G, B which are applied to one contacts a of switches S1, S2, S3, respectively.

Applied to the other contacts b of the switches S1, S2, S3 are directly the output signals R, G, B, of the video circuit 36, respectively. Thus, the signals passing through those contacts selected by the switches, S1, S2, S3 are output to a display 16.

The output signals r, G, B, of the video circuit 36 are also applied to a color smear detecting means 41 of which output is in turn applied to a comparator 42 along with an output of a limit color smear setting means 43 comprising a variable resistor or the like. An output of the comparator 42 controls changing-over of the switches S1, S2, S3 via a switch driver 44.

The remaining part is constructed similarly to that of the above first embodiment.

Operation of the eighth embodiment will be described below. It has been found from the actual measurement that most colors of the endoscope image are generally present in the second quadrant on the color difference plane. It has also been found that those portions in which color smear occurs are colored in red, blue, green, magnets, cyan, yellow and thereabout.

Accordingly, color smear is so reduced as to be not conspicuous by preventing reproduction of colors such as red, blue, green, magenta, cyan, yellow and thereabout during the occurrence of color smear. More specifically the output signals of the video circuit 36 are encoded by the encoder 172 to the luminance signal Y and the color difference signals R-Y, B-Y. These color difference signals R-Y, B-Y are converted by the A/D converters 172a, 173b to the digital signals, respectively, which are then input to the region restricting means 174.

The region restricting means 174 comprises a ROM or the like, and employs the digital signals of the color difference signals R-Y, B-Y as addresses for accessing the ROM.

The region restricting means 174 is designed or set so that corresponding to the address signals R-Y, B-Y input in the hatched region, the read-out data fall in the non-hatched region nearest to that hatched region, as shown in FIG. 16.

In other words, those colors in the hatched regions are all replaced with colors belonging to the second quadrant (including the coordinate axes).

The thus-replaced data are returned by the D/A converters 175a, 175b to the analog signals which are then decoded by the decoder 176 to the three primary color signals R, G, B.

On the other hand, the color smear detecting means 41 monitors the output signals R, G, B of the video circuit 36 and sends a degree of color smear to the comparator 42. When the degree of color smear becomes equal to or larger than a certain value preset by the limit color smear setting means 43, the comparator 42 changes over the switches S1, S2, S3 to the side of the contacts a. When the degree of color smear is reduced below the certain value, the switches S1, S2, S3 are changed over to the side of the contacts b. As a result, a picture is displayed on the display 16 using the original images when the degree of color smear is small, and using the images restricted in their display colors when the degree of color smear becomes equal to or larger than a certain value.

With the eighth embodiment, when color smear occurs, reproduction of those colors responsible for or occasioning the color smear is suppressed to restrict the reproduced colors in the regions of display colors for the endoscope images which are usually observed.

Note that it is also possible for dyed images to adopt a method of killing the primary color portions, too, in primary color images.

FIG. 17 shows an imaging apparatus 181 of a ninth embodiment of the present invention. This embodiment is intended to make slower a color change rate in the regions and thereabout where color smear occurs, thereby reducing the color smear.

Comparing with the eighth embodiment shown in FIG. 15, output signals of A/D converters 173a, 173b are, in this ninth embodiment, input to a hue/saturation encoder 182 for conversion to a hue signal and a saturation signal.

The hue signal is input to a smoothing means 183 comprising a movement average calculator, an integrating circuit or the like which converts an abruptly changing signal to a slowly changing signal, or comprising a low-pass filter or the like which outputs only a slowly changing signal. The aforesaid saturation signal and the hue signal having passed through the smoothing means 183 are input to a hue/saturation decoder 184 for being decoded to the color difference signals R-Y, B-Y again. These color difference signals R-Y, B-Y are input to D/A converters 175a, 175b for conversion to respective analog signals. These analog signals and the luminance signal Y from the encoder 172 are converted by a decoder 176 to three primary color signals R, G, B, which are then applied to one contacts a of switches, S1, S2, S3, respectively.

As with the eighth embodiment shown in FIG. 15, the output signals R, G, B of the video circuit 36 are applied directly to the other contacts b of the switches S1, S2 S3, respectively, and also to a color smear detecting means 41. An output of the color smear detecting means 41 is applied to a comparator 42 along with an output of a limit color smear setting means 43. An output of the comparator 42 drives the switches S1, S2, S3 via a switch driver 44.

The remaining part is constructed similarly to that of the foregoing eighth embodiment.

Operation of the ninth embodiment will be described below. The color difference signals R-Y, B-Y are subjected to A/D conversion and then replaced with the hue and saturation signals by the hue/saturation encoders 182. The hue signal is processed by the smoothing means 183 to become a signal which is suppressed in its change rate. The hue signal having passed through the smoothing means 183 and the saturation signal are decoded by the hue/saturation decoder 184 to the color difference signals again. These color difference signals and the luminance signal Y from the encoder 172 are decoded by the decoder 176 to the three primary color signals R, G, B. Operation of the switches S1, S2, S3, the color smear detecting means 41 and other components are the same as those in the eighth embodiment.

With the above operation of the imaging apparatus, abrupt changes in color are suppressed in the portions where color smear occurs, thereby rendering the color smear less conspicuous.

In addition, the signals input to the encoder 172 may be delayed by delay means, for example, so that the operation in the side of the color smear detecting means 41 is carried out at the relatively earlier timing. This permits to operate the above-mentioned color reducing means immediately before the occurrence of color smear, thereby reducing color smear more effectively. Furthermore, by delaying the timing to change over the switches S1, S2, S3 from the contacts a to the contacts b, the color smear reducing means can be halted in operation just after coming into a state where color smear is reduced or eliminated, which also contributes to render the color smear less conspicuous.

FIG. 18 shows an imaging apparatus 191 of a tenth embodiment of the present invention. This embodiment is intended to reduce color smear by lowering a degree of (color) saturation, when color smear occurs. Comparing with the second embodiment shown in FIG. 6, an NTSC output signal of a video circuit 36' is, in this ninth embodiment, input to a Y-C separating circuit 192 which comprises a filter or the like. After separation in the Y-C separating circuit 192, a luminance signal Y is input to a decoder 193, while a color signal C is applied to one contact b of a switch S1 directly or the other contact a of the switch S1 via can attenuator 194. The color signal having passed through the switch S1 is also input to the decoder 193. The input signals are converted by the decoder 193 to an NTSC composite video signal again, which is then applied to a display 16'.

As with the second embodiment shown in FIG. 6, the output of the video circuit 36' is also applied to a color smear detecting means 41 of which output is in turn applied to a comparator 42 along with an output of a limit color smear setting means 43. Then, an output of the comparator 42 controls changing-over of the switch S1 via a switch driver 44.

The remaining part is constructed similarly to that of the above second embodiment shown in FIG. 6.

Operation of the tenth embodiment will be described below. When the occurrence of color smear is detected, the switch S1 is changed over to the side of the contact a by the output of the comparator 42, causing the signal output C of the Y-C separating circuit 192 to be applied to the decoder 193 after attenuation. As a result, the output of the decoder 193 is lowered in its saturation so that the picture is displayed with color smear made less conspicuous.

On the other hand, in the absence of color smear, the switch S1 is changed over to the side of the contact b so that the picture is displayed with saturation not lowered.

With this embodiment, when color smear occurs, the color signal C can be lowered in its saturation to render the smear less conspicuous in the picture displayed on the display 16'.

Figure 19:
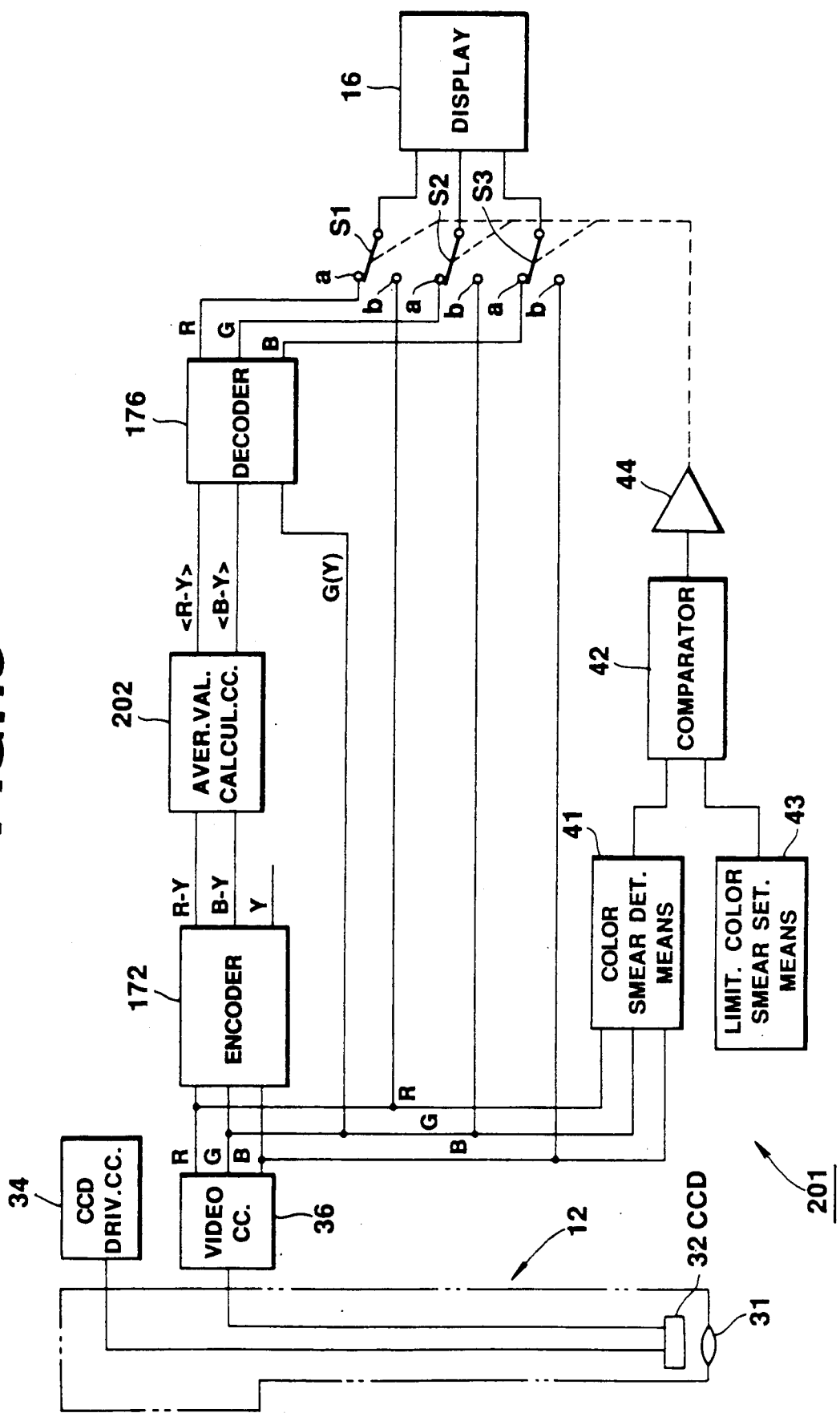
FIG. 19 is a diagrammatic view showing the configuration of an imaging apparatus for an endoscope of an eleventh embodiment.

FIG. 19 shows an imaging apparatus 201 of an eleventh embodiment of the present invention. This embodiment is intended to recolor the color smear portions, when color smear occurs, by employing a color signal G in place of a luminance signal and an average value of the preceding color signal one image before.

Comparing with the eighth embodiment shown in FIG. 15, color difference signals R-Y, B-Y produced from an encoder 172 are, in this eleventh embodiment, input to an average value calculating circuit 202 to calculate and hold average values <R-Y>, <B-Y> of the preceding color difference signals one field/frame before.

The output signals <R-Y>, <B-Y> of the average value calculating circuit 202 are applied to a decoder 176 along with a color signal G from a video circuit 36. The decoder 176 produces three primary color signals R, G, B which are applied to one contacts a of switches S1, S2, S3, respectively. Incidentally, the color signal G applied to the decoder 176 is applied as a luminance signal Y to a luminance signal input terminal thereof.

The remaining part is constructed similarly to that of the above eighth embodiment shown in FIG. 6.

Operation of the eleventh embodiment will be described below. When color smear occurs, the switches S1, S2, S3 are changed over to the side of the contacts a so that the average values <R-Y>, <B-Y> of the color difference signals in the preceding last field/frame and the color signal G in place of the luminance signal are employed as image signals for displaying a picture. Stated otherwise, instead of using the luminance signal Y produced by mixing the three primary color signals R, G, B (affected with color smear) at a predetermined ratio, the single color signal G is employed to represent the outline signal by the single color signal alone. This permits to prevent the outline portions from becoming blurred in the displayed picture.

Besides, in the case where a color smear detecting means 41 of this embodiment is arranged as shown in FIG. 5, for example, the color smear detecting means 41 outputs a signal of a level corresponding to the detected degree of color smear over a period of one field/frame, as shown in FIG. 20(a). When that level exceeds a threshold value Vth preset by a limit color smear setting means 43, a comparator 42 outputs a color smear determination signal as shown in FIG. 20(b), thereby changing over the switches S1, S2, S3 to turn on their contacts a via a switch driver 44 as shown in FIG. 20(c).

When color smear occurs, therefore, the color smear reducing means functions to display a picture based on the average values <R-Y>, <B-Y> of the color difference signals in the preceding last field/frame, while employing the color signal G as the luminance signal Y, throughout a period of one field/frame. Thus, upon the occurrence of color smear, the color smear reducing means is brought to function over the entire picture.

On the other hand, rather than functioning the color smear reducing means over the entire picture, the means may be caused to function over only the picture portions where color smear occurs as follows.

Figure 21:
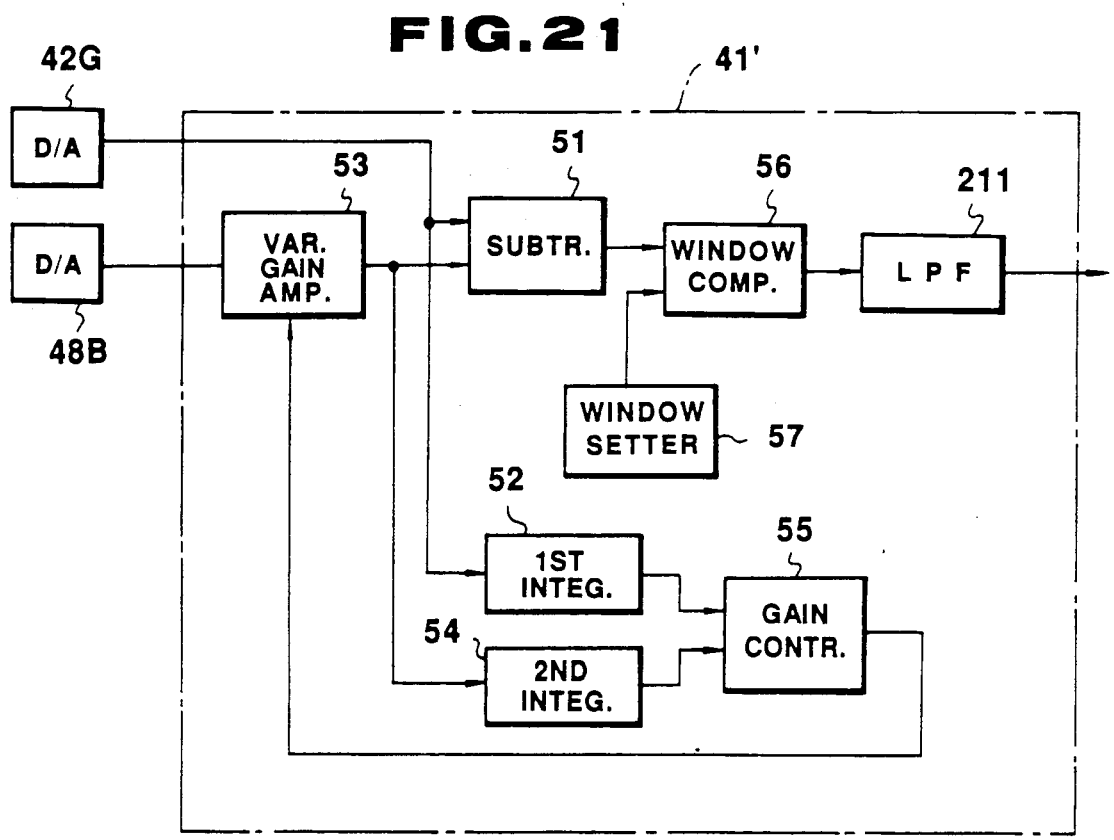
FIG. 21 is a block diagram showing another example of the configuration of a color smear detecting means.

More specifically, the color smear detecting means 41 is arranged as shown in FIG. 21 in this case, for example. This color smear detecting means (designated by reference numeral 41') employs a low-pass filter 211 replaced with the third integrator 58 in FIG. 5 (note that the low-pass filter 211 may be omitted).

In this case, the color smear detecting means 41' outputs a signal of which level is changed dependent on the detected degree of color smear during a period of one field/frame (e.g., as shown in FIG. 22(a).

In this case, therefore, during periods when the above signal level exceeds a threshold value Vth, the switches S1, S2, S3 are changed over to the side of the contacts a as shown in FIG. 22(b). Thus, the color smear reducing means is brought to function for only the portions in which there has occurred color smear exceeding the predetermined level.

It should be understood that the color smear reducing means may be designed to selectively function over the entire picture or for only parts of the picture in other embodiments as well.

Figure 23:
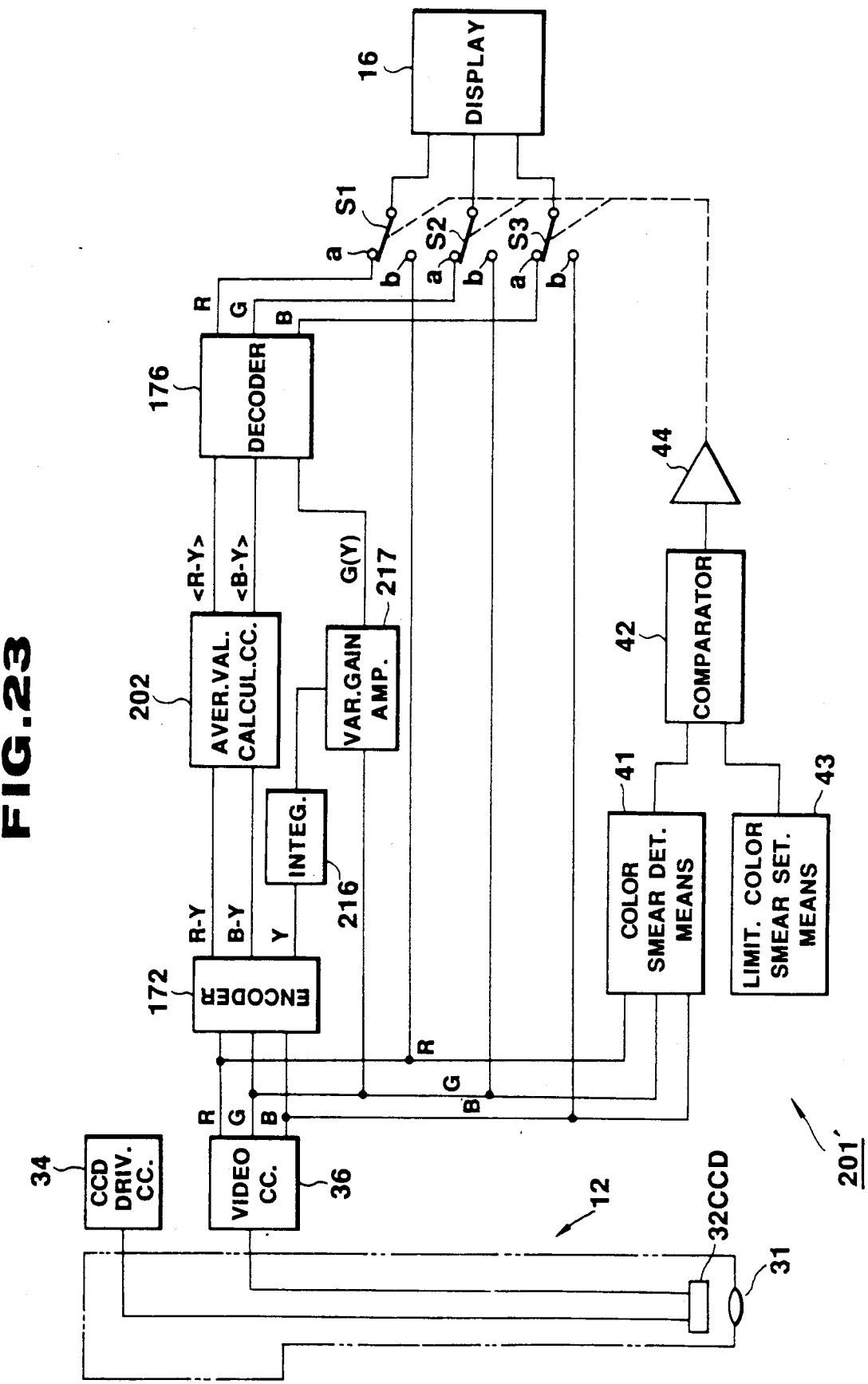
FIG. 23 is a diagrammatic view showing the configuration of an imaging apparatus for an endoscope of a twelfth embodiment.

FIG. 23 shows an imaging apparatus 201' for an endoscope of a twelfth embodiment of the present invention.

Comparing with the imaging apparatus 201 shown in FIG. 19, a luminance signal Y produced from an encoder 172 is, in this imaging apparatus 201', input to an integrator 216 to produce a luminance signal $<Y>$ averaged over one field/frame. This luminance signal $<Y>$ is applied to a gain control terminal of a variable gain amplifier 217 for variably controlling the gain with which a color signal G from a video circuit 36 is to be amplified (or possibly attenuated).

The remaining part is the same as that of the imaging apparatus shown in FIG. 19.

This twelfth embodiment has the advantageous effect in operation similar to that of the eleventh embodiment of FIG. 19. While when color smear occurs, the eleventh embodiment of FIG. 19 employs the average values $<R-Y>$, $<B-Y>$ of the color difference signals in the preceding last field/frame and also employs the current color signal G directly as the luminance signal for display of this case, the twelfth embodiment is featured in that the level (amplitude) of the color signal G used as the luminance signal is controlled to be approximated by an average value in the preceding last field/frame. Accordingly, even when there occurs a change in the luminance along with a relative movement, for example, this twelfth embodiment makes it possible to reduce color smear with discrepancy between the color components and the luminance component in the preceding last field/frame.

Figure 24:
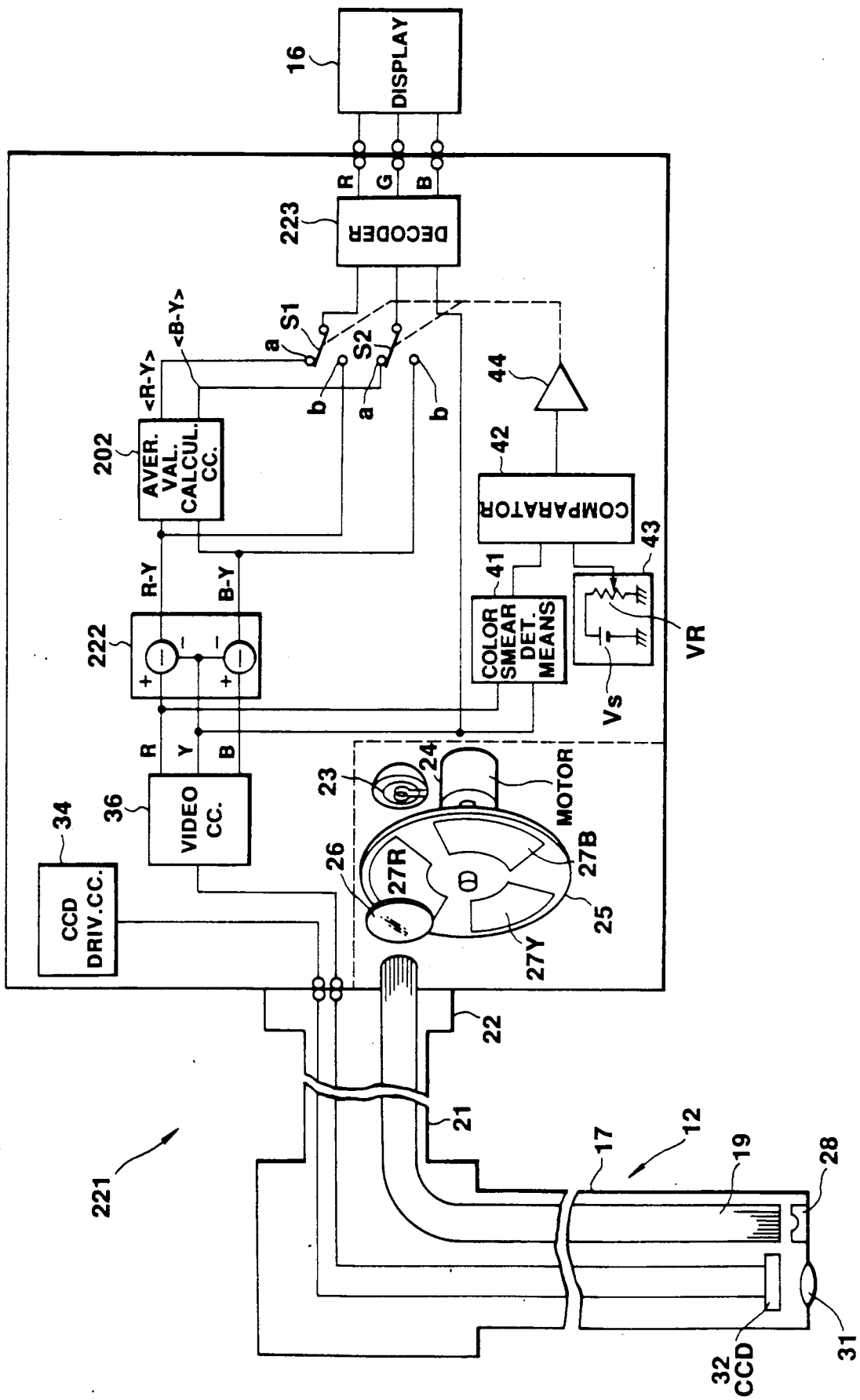
FIG. 24 is a diagrammatic view showing the configuration of an imaging apparatus for an endoscope of a thirteenth embodiment.

FIG. 24 shows an imaging apparatus 221 of a thirteenth embodiment of the present invention.

In this embodiment, the illuminating means is partially modified in the eleventh embodiment shown in FIG. 19, for example. Thus, the illuminating means omitted in FIG. 19 is similar to that shown in FIG. 2. On the other hand, the illuminating means of this thirteenth embodiment employs a luminance filter 27Y in place of the green color transmission filter 27G of the rotatable color filter 25 in FIG. 2. The luminance filter 27Y is set to a rate of light transmissivities of 0.30:0.59:0.11 for respective wavelengths of red, green, blue. Accordingly, color signals R, B and a luminance signal Y are obtained as the signals having passed through a video circuit 36. These signals R, Y, B are input to a subtracter 222 where the luminance signal Y is subtracted from each of the color signals R, B to produce respective color difference signals R - Y, B - Y. These color difference signals R - Y, B - Y are input to an average value calculating circuit 202 and also applied to contacts b of switches S1, S2.

The color difference signals $<R-Y>$, $<B-Y>$ averaged by the average value calculating circuit 202 are applied to contacts a of the switches S1, S2, respectively. Signals having passed through the switches S1, S2 and the luminance signal Y output from the video signal 36 are applied to a decoder (inverted matrix circuit) 223 for conversion to three primary color signals R, G, B which are then output to a display 16.

Furthermore, the output signals R, Y of the video signal 36, for example, are applied to a color smear detecting means 41 (or 41') so as to detect a degree of color smear. The detected degree of color smear is applied to a comparator 42 along with an output of a limit color smear setting means 43. An output of the comparator 42 controls changing-over of the switches S1, S2 via a switch driver 44.

Incidentally, the limit color smear setting means 43 comprises a reference voltage source Vs and a variable resistor VR, for example.

While the color signal G is used to function as the luminance signal Y in the eleventh embodiment shown in FIG. 19, the luminance signal Y is used in itself in this thirteenth embodiment to represent the luminance of the displayed picture, even when color smear occurs. Therefore, the picture can be expressed in a more natural sense even in the presence of color smear.

Further, since the color smear detecting means 41 is arranged to detect a degree of color smear using the signals which include the same color component, the detection of color smear can be performed by determining the correlation therebetween more reliably than the case of using the signals which do not include the same color component.

In addition, the color smear detecting means 41 is not limited to means for detecting a degree of color smear for each period of one field/frame. Alternatively, the degree of color smear may be detected within shorter periods of time during one field/frame.

The average value calculating circuit 202 can be arranged, for example, to hold the average value for each line and, when color smear occurs, to output the color differential signals $<R-Y>$, $<B-Y>$ based on the average values for the respective lines.

It is also to be noted that the twelfth embodiment shown in FIG. 23 can be arranged in a like manner to this embodiment of FIG. 24.

The illuminating means of the frame sequential type is not limited to the above-mentioned one and may employ color filters in complementary colors, for example. Instead of using the rotatable color filter, three light sources may be provided to sequentially emit beams of illumination light at different wavelengths, for example.

In the respective embodiments mentioned above, not only the object but also the imaging means may happen to move. The present invention can widely be applied to any cases where there occurs a relative movement between the object and the imaging means.

Moreover, the imaging means is not limited to the electronic scope and may alternatively be arranged by fitting a TV camera at the eyepiece portion of the fiber scope.

With the foregoing embodiments, as described above, when the movement detecting means for detecting a relative movement between the imaging means and the object shows the movement exceeding a certain value, image smear such as color smear in a motion picture displayed on the display means can be reduced with simple construction. Therefore, even under the presence of color smear, the picture can be prevented from being made hard or awkward to see with the color smear.

Next, color smear detecting means of fourteenth through nineteenth embodiments adapted to detect color smear by the use of color component extracting means will be described below. The fundamental configuration of the respective color smear detecting means is shown in FIG. 25.

Figure 25:
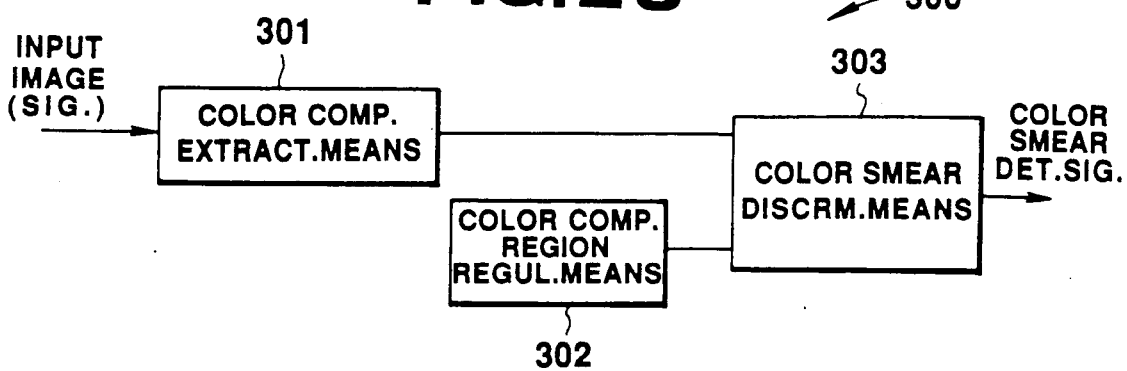
FIG. 25 is a conceptual view showing the fundamental configuration of in fourteenth through nineteenth embodiments of the present invention.

Referring to FIG. 25, a color smear detecting means 300 comprises a color component extracting means 301 for extracting at least one color component from an input image picked up by an imaging device (means) of the frame sequential type, a color component region specifying means 302 for specifying a color component region corresponding to the image affected with color smear, and a color smear discriminating means 303 to which are applied an output signal of the color component extracting means 301 and an output signal of the color component region specifying means 302. The color smear discriminating means 303 discriminates the presence or absence of color smear by determining whether or not the color component extracted by the color component extracting means 301 locates in the color component region specified by the color component region specifying means 302.

Figure 26:
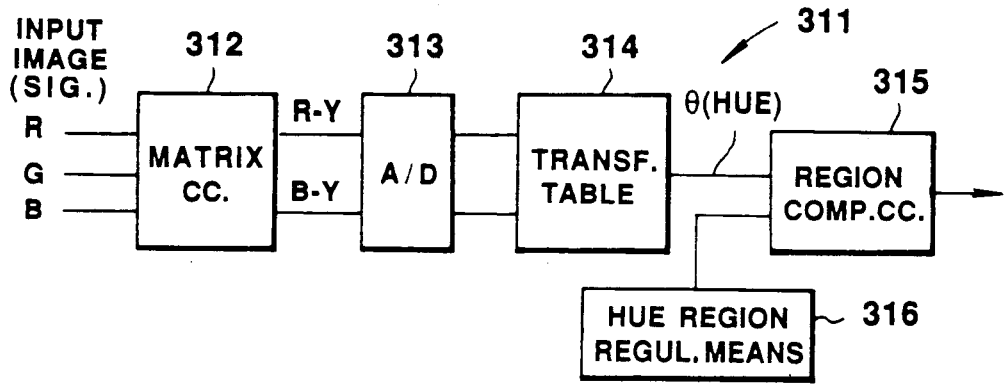

As shown in FIG. 26, in a color smear detecting circuit 311 of the fourteenth embodiment using the color component extracting means, color frame synchronized signals R, C, B (referred to simply as color signals R, G, B hereinafter) issued as input images in synchronism relation from an imaging device of the frame sequential type (not shown) are applied to a matrix circuit 312 for conversion to color difference signals R - Y, B - Y which are then output therefrom.

Those color difference signals R - Y, B - Y are input to an A/D converter 313 for conversion to digital color difference signals which are in turn input to a conversion table 314. The conversion table 314 converts the digital color difference signals to color component information, e.g., hue $\theta$. This hue $\theta$ is input to a region comparing circuit 315 for comparison with the hue specifying region specified by a hue region specifying means 316 as a hue region where color smear appears when it occurs. If the hue $\theta$ falls in the hue specifying region, the region comparing circuit 315 outputs a color smear detection signal upon determining that color smear is present.

Figure 27A:
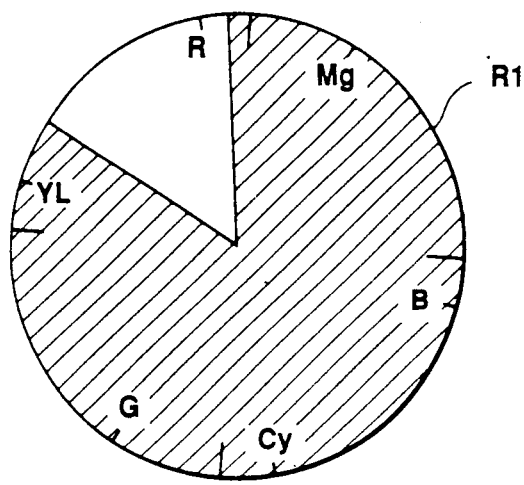
FIGS. 27a through 27c are explanatory views respectively showing concrete examples of color component specifying regions specified by a hue area specifying means.
Figure 27B:
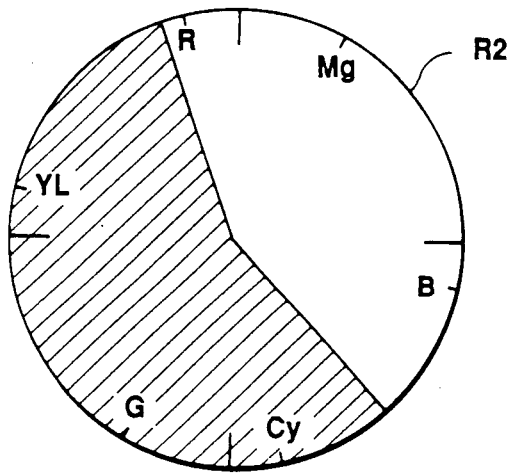
Figure 27C:
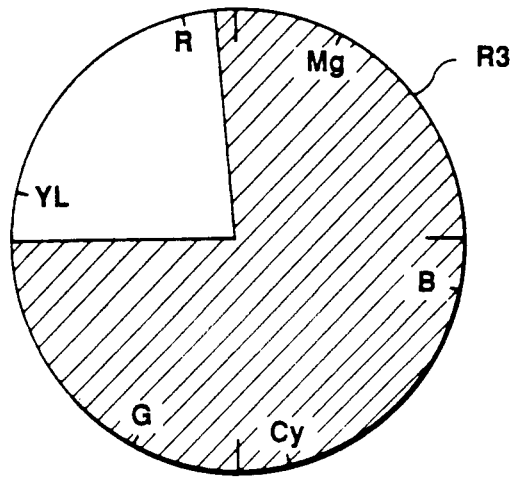
Figure 28A:
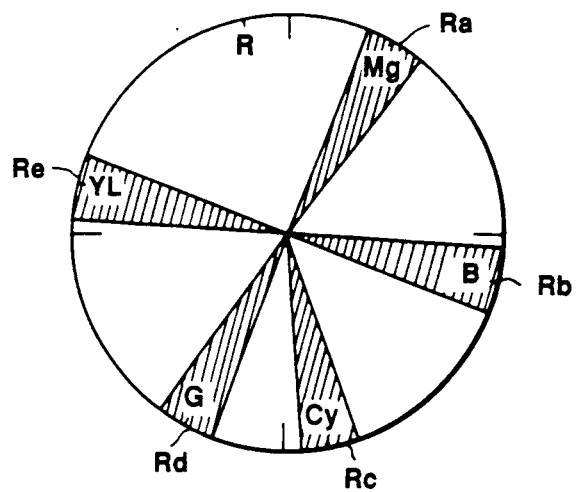
FIGS. 28a through 28d are explanatory views respectively showing concrete examples of color component specifying regions specified at plural locations for each case.
Figure 28B:
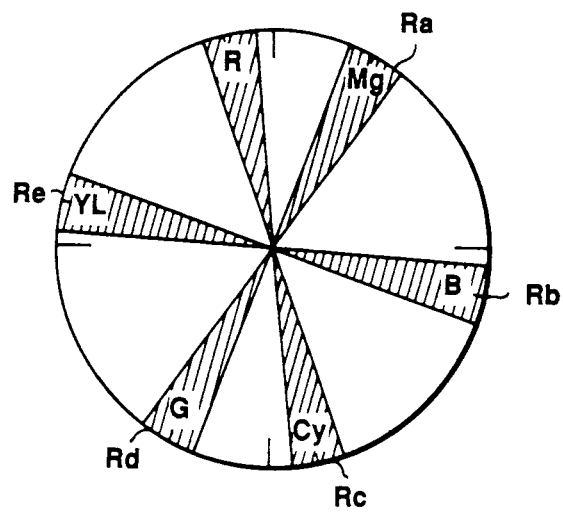
Figure 28C:
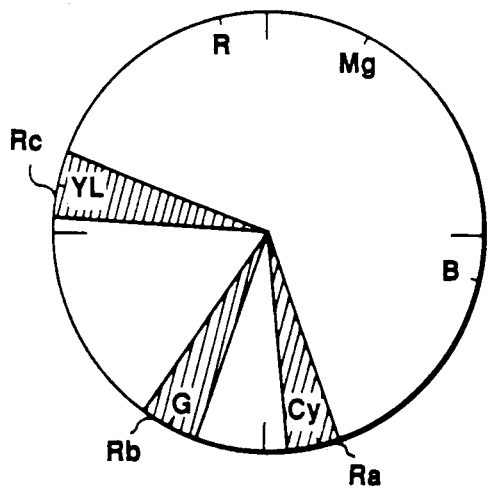
Figure 28D:
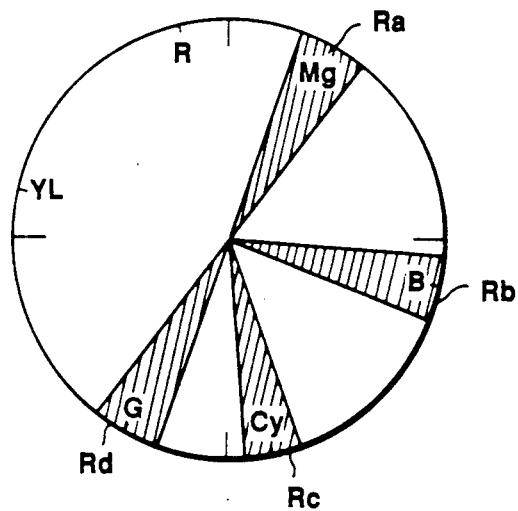

The hue specifying region specified by the hue region specifying means 316 can be given as follows. As shown in FIGS. 27a through 27c, for example, the color smear detecting region is specified in the color difference plane by an angular region R1, R2 or R3 hatched or marked with slant lines. Alternatively, the color smear detecting region (corresponding to R1, R2 or R3 in FIGS. 27a through 27c) may be given by a plurality of hatched angular regions Ra, Rb, ... as shown in each of FIGS. 28a, 28b, 28c and 28d. In FIG. 28a, for example, five areas including hues of Mg, B, Cy, G, Yl are specified as hue regions used for detecting color smear.

In an endoscope image for observing internal organs and the like, the hue distribution is mostly concentrated on the hue of red. When color smear occurs, there appear one or more hues corresponding to a single or combined wavelength ranges of the illumination light irradiated in a frame sequential manner. For the reason, the areas including such hues are specified as hue regions used for detecting color smear.

Note that in FIGS. 27a through 28d, the circumferential angle represents hues of Mg, B, Cy, ... and the radial direction represents saturation. However, this fourteenth embodiment has no relation to saturation.

With the color smear detecting circuit 31 according to the fourteenth embodiment, the presence of absence of color smear can be discriminated by judging through comparison whether or not the hue $\theta$ of the input image falls in the hue region(s) specified by the hue region specifying means 316. It is hence possible to detect color smear in any of a motion picture and a still picture with the simple construction.

Figure 29:
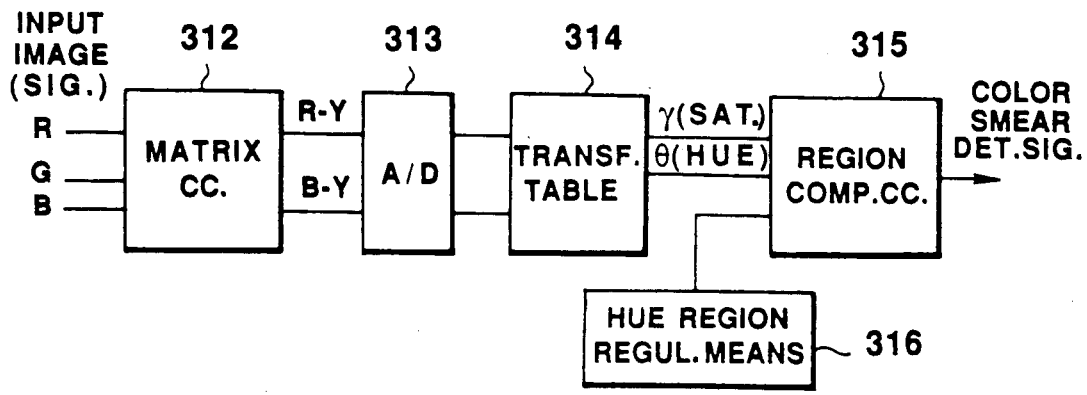
FIG. 29 is a diagrammatic view showing the configuration of a color smear detecting circuit in the fifteenth embodiment of the present invention.

Although only the hue $\theta$ of the input image is extracted in the above fourteenth embodiment, the saturation r as well as the hue $\theta$ are extracted using a conversion table 314' in a fifteenth embodiment shown in FIG. 29.

Figure 30A:
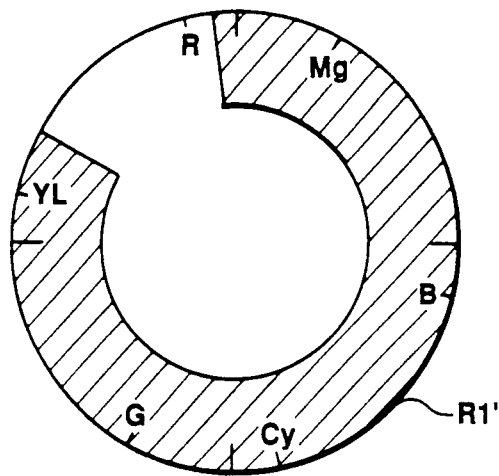
FIGS. 30a through 30c are explanatory view respectively showing concrete examples of color component specifying regions.
Figure 30B:
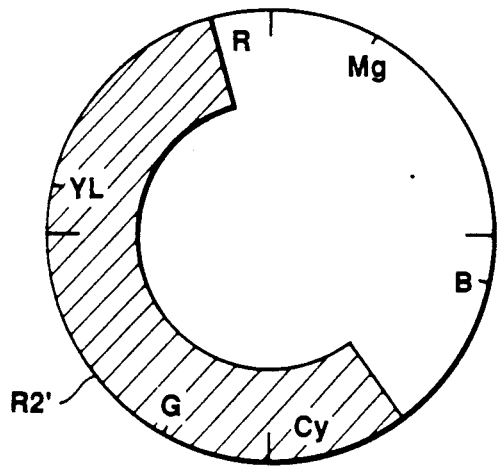
Figure 30C:
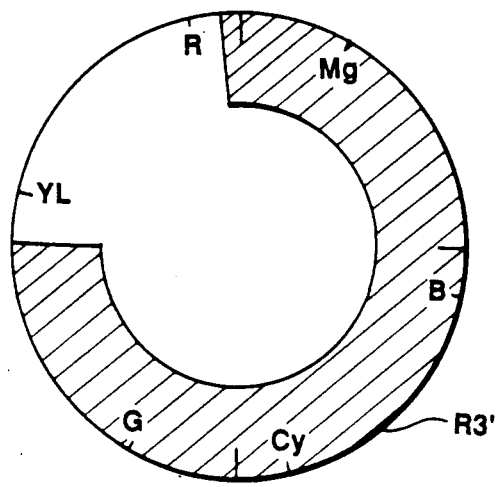
Figure 31A:
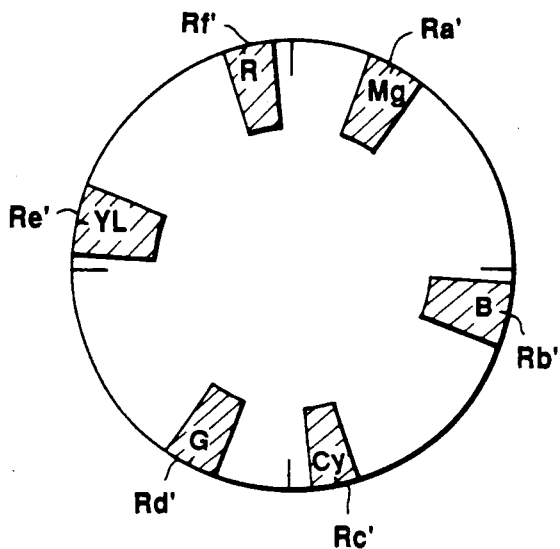
FIGS. 31a through 31d are explanatory views respectively showing concrete examples of color component specifying regions specified at plural locations for each case.
Figure 31B:
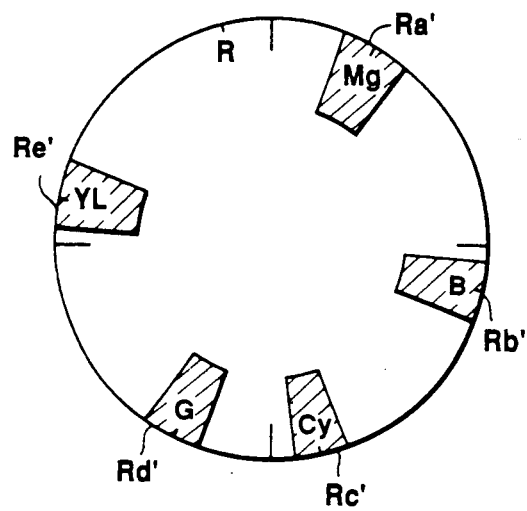
Figure 31C:
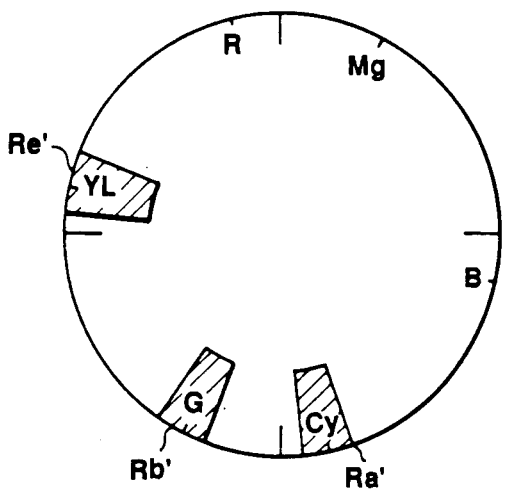
Figure 31D:
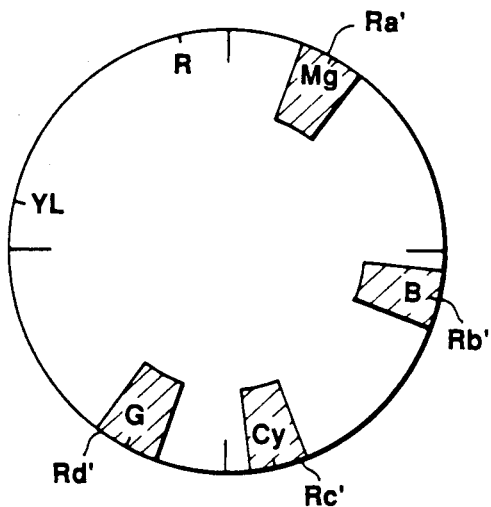

Accordingly, a color component region specifying means 316 in this embodiment specifies not only a hue region in the angular (circumferential) direction but also a saturation region in the radial direction, e.g., a hatched portion R1', R2', R3' shown in FIGS. 30a through 30c.

Also, unlike the cases of FIGS. 30a through 30c, a plurality of regions Ra', Rb', ... each specified in both hue and saturation may be set as indicated by hatched portions in each of FIGS. 31a through 31d.

This fifteenth embodiment permits to detect color smear with higher accuracy than the foregoing fourteenth embodiment.

Figure 32:
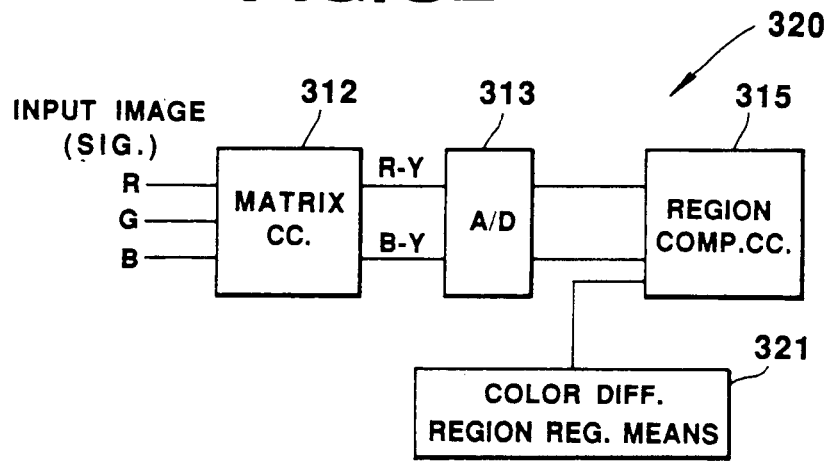
FIG. 32 is a diagrammatic view showing the configuration of a color smear detecting circuit in the sixteenth embodiment of the present invention.

FIG. 32 shows a color smear detecting circuit 320 of a sixteenth embodiment of the present invention.

In this embodiment, digital color difference signals from an A/D converter 313 are directly input to a region comparing circuit 315 which discriminates whether or not those digital color difference signals locate in the color difference region(s) specified by the color difference region specifying means 321. If the above discrimination is positively responded, the region comparing circuit 315 outputs a color smear detection signal.

Figure 33:
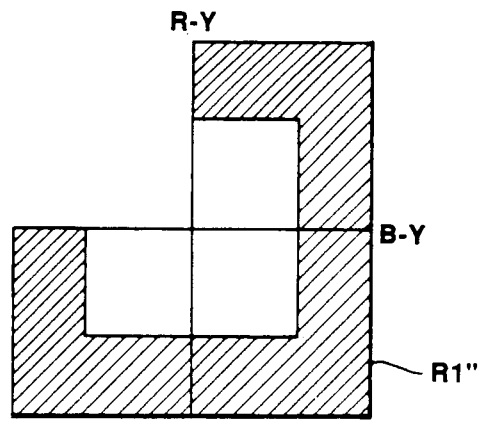
FIG. 33 is an explanatory view showing one example of a color component specifying region in the sixteenth embodiment.

A color difference region specifying means 321 for specifying the color smear detecting region in this embodiment is designed to specify a hatched region R1" in the color difference plane as shown in FIG. 33, for example. The color smear detecting region is not limited to the one shown in FIG. 33 and may be divided into plural regions.

The sixteenth embodiment can provide the similar advantageous effect as that of the foregoing fifteenth embodiment, and also perform detection of color smear with simpler construction.

Figure 34:
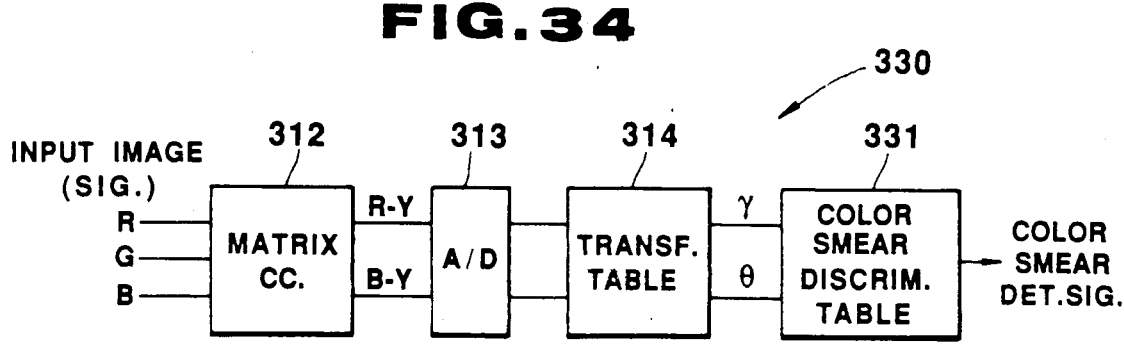
FIG. 34 is a diagrammatic view showing the configuration of a color smear detecting circuit in the seventeenth embodiment of the present invention.

FIG. 34 shows a color smear detecting means 30 of a seventeenth embodiment of the present invention.

In this embodiment, the region comparing means as the hue region specifying means or the color difference region specifying means and the color smear discriminating means in FIGS. 26, 29, 32 is implemented in the form of a color smear discrimination table 331 which comprises a ROM or the like. Assuming that the hatched portion is represented by "1" and the blank portion (i.e., the non-hatched portion) is represented by "$\phi$" for any one of the regions shown in FIGS. 27a-28d, 30a-31d and 33, the hue $\theta$, the saturation r and the digital color difference signals are input as address signals to the ROM for issuing an output of "1" or "$\phi$" dependent on the input address. Thus, the color smear discrimination table 331 can output a color smear detecting signal indicative of the presence or absence of color smear.

Note that if this seventeenth embodiment is applied to the above sixteenth embodiment of FIG. 32, the conversion table 314 in FIG. 34 can be dispensed with.

The seventeenth embodiment can detect color smear with simple construction similarly to the above sixteenth embodiment. Further, the seventeenth embodiment makes it easier to set the hue region(s) for detecting color smear finer than the regions shown in FIGS. 28 and 31, for example.

Figure 35:
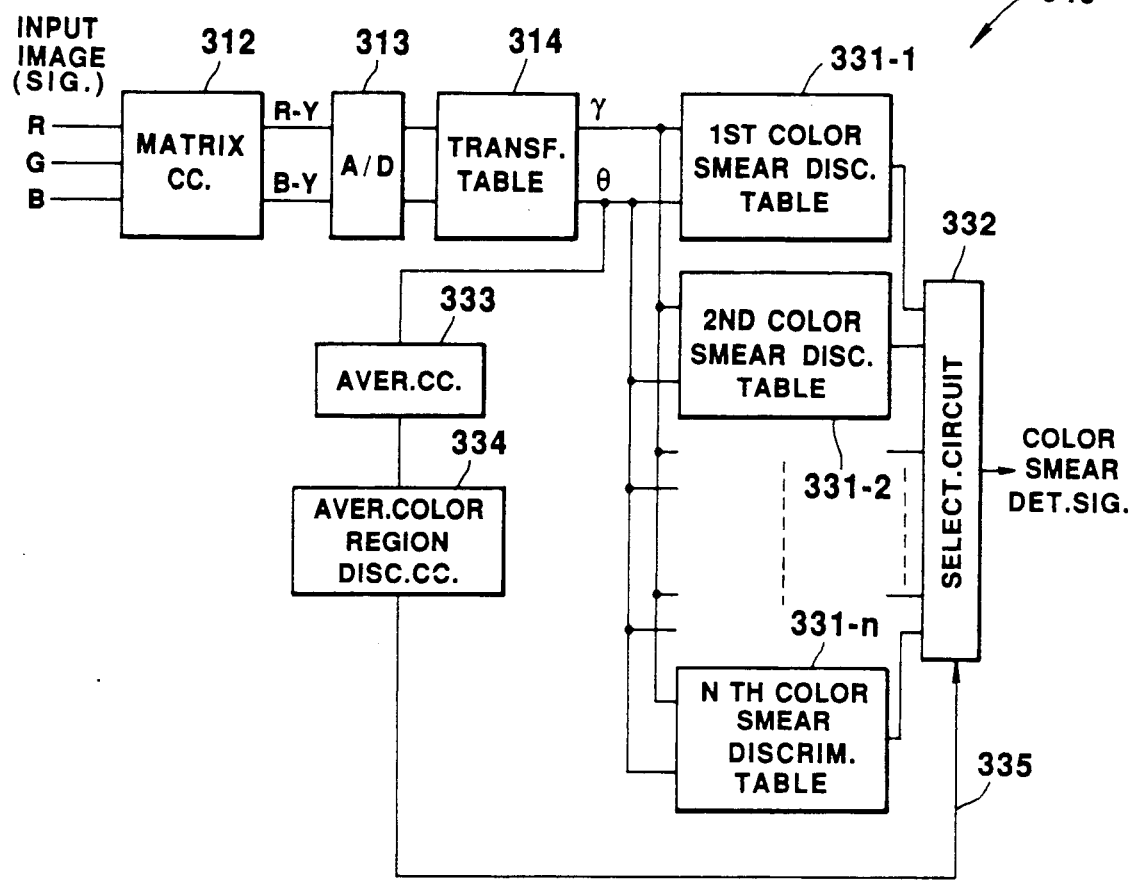
FIG. 35 is a diagrammatic view showing the configuration of a color smear detecting circuit in the eighteenth embodiment of the present invention.

FIG. 35 shows a color smear detecting circuit 340 of an eighteenth embodiment of the present invention.

The foregoing fourteenth and fifteenth embodiments can have only one kind of the hue region specifying region, and hence has a disadvantage that under the condition where the hue specifying region R1 of FIG. 27a is set up, for example, the normal image would be discriminated as an image affected with color smear if such an image as requiring use of the hue specifying region R2 of FIG. 27b. In contrast, a color smear discriminating means is provided plural in number in this eighteenth embodiment so as to overcome the above disadvantage.

As with the above seventeenth embodiment, input images from an imaging device of the frame sequential type are converted by a matrix circuit 312 to color difference signals R - Y, B - Y which are then digitized by an A/D converter 313. The digitized color difference signals are converted to hue $\theta$ and saturation r by a conversion table 314. Both the hue $\theta$ and saturation r are input to each of first color smear discrimination table 331—1, a second color smear discrimination table 331—2, ... , a n-th color smear discrimination table 331—n. Output signals of these first through n-th color smear discrimination table 331—1, ... , 331—n are applied to a select circuit 332.

Further, the hue $\theta$ is also input to an averaging circuit 333 to determine an average value of the hue $\theta$. This average value is input to an average color region discriminating circuit 334. Based on the average value thus input, this average color region discriminating circuit 334 outputs a select signal 335 to the select circuit 332, the select signal 335 determining which one of the first through n-th color smear discrimination tables 331—1, . . . 331—n is to be used.

Supposing that data of the hue specifying regions corresponding to FIGS. 30a through 31d are respectively written into the first through n-th color smear discrimination tables 331—1, ... , 331—n, for example, the average values in hue in the respective blank portions are different from one another. Therefore, by using the average color determined by the averaging circuit 333, the average color region discriminating circuit 334 can discriminate which one of the first through n-th color smear discrimination tables 331—1, . . , 331—n is to be referred. Then, the select signal 335 causes the select circuit 332 to be conducted with one color smear discrimination table 331-i (where i = any of 1 – n) to be used.

In this way, the eighteenth embodiment makes it possible to overcome the disadvantage as mentioned before.

Figure 36:
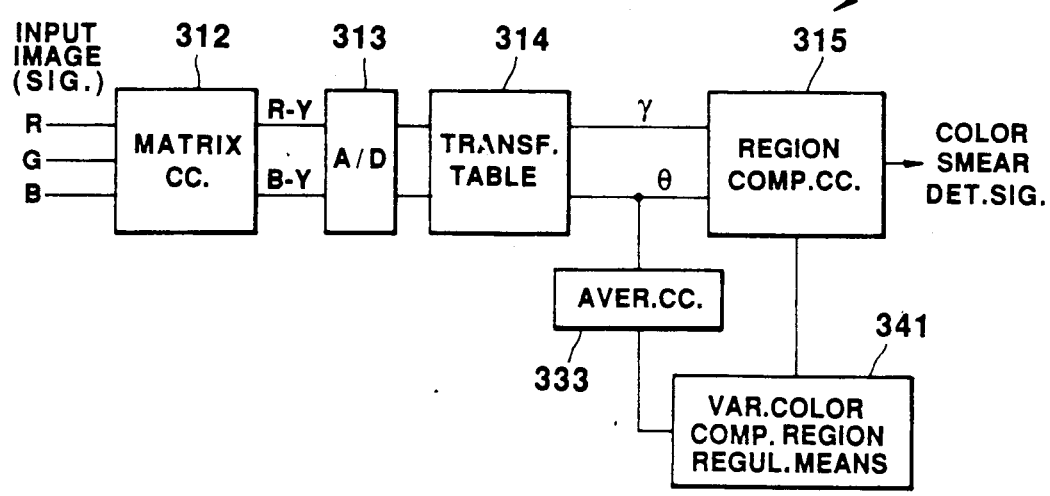
FIG. 36 is a diagrammatic view showing the configuration of a color smear detecting circuit in the nineteenth embodiment of the present invention.

FIG. 36 shows a color smear detecting circuit 350 of a nineteenth embodiment of the present invention.

This nineteenth embodiment is directed to further improve the above eighteenth embodiment, and arranged to apply hue $\theta$ and saturation r to a region comparing circuit 315 as with FIG. 29.

In the nineteenth embodiment, the hue $\theta$ is input to an averaging circuit 333 to determine an average value thereof. This average value is input to a variable color component region specifying means 341 with which the color component region varied dependent the average value is applied to the region comparing circuit 315. The region comparing circuit 315 carries out discrimination of color smear for the hue $\theta$ and the saturation r issued from the conversion table 314, based on the color component region from the variable color component region specifying means 341, thereby outputting a color smear detection signal dependent on the result.

This nineteenth embodiment can achieve the essentially same function as that of the above eighteenth embodiment with more compact circuit configuration, which results in the reduced cost.

FIG. 37 shows a color smear reducing device 351 to which the above-mentioned color smear detecting circuit is applied.

Input images from an imaging device of the frame sequential type, i.e., color signals R, G, B here, are applied to a color smear detecting circuit (which is designated by the same reference numeral 311 in the fourteenth embodiment, for example, but may be arranged as shown in any other embodiments) 311, a corrected color producing circuit 352 for producing corrected color signals R, G, B, and a timing adjustment circuit 353. The color smear detecting circuit 311 detects color smear in a like manner to any of the above fourteenth and other embodiments and outputs a color smear detection signal to a select circuit 354.

The timing adjustment circuit 353 adjusts the timing of the color smear portions of the input images (i.e., the color signals R, G, B) so as to be coincident with the timing of the color smear detection signal, and then outputs the adjusted input images to the select circuit 353 (after delaying them by a period of time necessary for detection of color smear in the color smear detecting circuit 311 by means of delay lines or memories, for example).

In response to the color smear detection signal, the select circuit 354 selectively outputs either one of the corrected color signals and the input images adjusted in timing such that the signals less affected with color smear are output when color smear is detected.

The color smear reducing device 351 of this embodiment permits to alleviate a reduction in quality of the image, which would otherwise be resulted due to color smear if the input images are directly displayed, even in the case of a motion picture. Note that the corrected color producing circuit 352 can be arranged using any one of the above-mentioned embodiments.

FIG. 38 shows an image freezing device 361 to which the foregoing color smear detecting circuit is applied. Input images from an imaging device of the frame sequential type are applied to a color smear detecting circuit 311 (which may be arranged as shown in any of other embodiments than the fourteenth one) for detection of color smear. A color smear detection signal is input to a freeze control circuit 362.

When a freeze instruction is input from a freeze directing means 363, the freeze control circuit 362 applies a freeze signal to a write control terminal of an image memory 364 for write inhibition, when the color smear detection signal is not issued (indicating that color smear is determined to be absent), whereby writing of the input images since then is stopped to hold the images immediately before the write inhibition.

In this case, therefore, the image memory 364 provides freeze-images while repeatedly issuing the same output image.

On the other hand, if the color smear detection signal is present when a freeze instruction is input, the freeze control circuit 362 will wait until such time as the color smear detection signal disappears, and then outputs the freeze signal.

As a consequence, it becomes possible to freeze a picture free of color smear.

Although the above-mentioned embodiments have been described as employing the color signals as input images, they are not limited to use of the color signals and also applicable to the case of inputting a composite video signal by addition of a step of extracting color components therefrom.

Further, although the embodiments have been illustrated in connection with analog inputs, digital signals can also be used through extraction of color components.

The color difference signals, hue and saturation are taken as examples of the color components in the embodiments. It should be however understood that other color components may be used.

Although the extracted color components are directly employed in the embodiments, they may be subjected to arithmetic operation (such as differentiation, coding to binary notation, etc.).

In addition, color smear may be detected by providing a color smear area measuring means and determining the measured result as to whether or not there occurs color smear. This permits to cope with the case where even though color smear occurs, the color smear area is so small as requiring no correction of the color smear.

With the fourteenth through nineteenth embodiments, as explained above, since any of the color smear detecting circuits in these embodiments comprises means for extracting at least one color component from the image signals picked up in a frame sequential manner, means for specifying a region of the color component, and means for discriminating color smear based on the extracted color component and the specified region, color smear can be detected with the simple construction, while properly coping with a motion picture as well.

Next, FIG. 39 shows the fundamental configuration of color smear detecting circuits used in twentieth through twenty-fifth embodiments.

A color smear detecting circuit 401 comprises a color component extracting means 402 for extracting at least one color component from an input image signal, a color component holding means 403 for holding the color component extracted by the color component extracting means 402, and a color smear discriminating means 404 for determining the presence of absence of color smear based on the color component held by the color component holding means 403 and the color component extracted by the color component extracting means 402.

The color component extracting means 402 extracts the color component from the image signal and then outputs it to the color component holding means 403. The color component holding means 403 holds the input color component and then outputs it to the color component discriminating means 404. The color smear discriminating means 404 compares the color component held by the color component holding means 403 with the color component extracted by the color component extracting means 402 to determine the presence or absence of color smear. The means 404 outputs a color smear detection signal in the presence of color smear.

The color detecting circuit 401 will be described below in more detail with reference to FIGS. 40 through 48.

Referring to FIG. 40, a color smear detecting circuit 401 of a twentieth embodiment receives a composite video signal from an endoscope 406.

The endoscope 406 has an insert portion 407 which is inserted into a subject or organ to be inspected. An object lens system 408 and a light directing lens system 409 are provided at the distal end of the insert portion 407. A solid-state imaging element 411 is disposed behind the object system 408 and has its imaging surface coincident with a focused point of the object lens system 408. Furthermore, an emergent end face of a light guide 412 for transmitting beams of illumination light is positioned behind the beam directing lens system 409 so that the illumination light transmitting through the light guide 412 is irradiated to an object 413 through the light directing lens system 409.

In this respect, the illumination light is condensed to the incident end face of the light guide 412 by a condensing lens 414. The illumination light is emitted from a light source lamp 416 and after passing through a rotatable color filter 417, it enters the condensing lens 414 to be properly condensed.

The rotatable color filter 417 is in the form of a disc and has a color filter 418R transmitting a red (R) beam therethrough, a color filter 418G transmitting a green (G) beam therethrough and a color filter 418B transmitting a blue (B) beam therethrough which are arranged in the circumferential direction. The rotatable color filter 417 is driven to be rotated by a motor 419 such that the color filters 418R, 418G, 418B are sequentially inserted into an optical path extending between the light source lamp 416 and the incident end face of the light guide 412. The illumination light becomes one of red (R), green (G) and blue (B) beams in turn after having passed through the color filters 418R, 418G, 418B, and is then irradiated to the object 413 through the light directing lens system 409. Therefore, an image based on the R beam, an image based on the G beam, and an image based on the B beam are sequentially focused on the imaging surface of the solid-state imaging element 411.

The solid-state imaging element 411 performs photoelectric conversion to convert the optical images focused on its imaging surface to electric signals which are then output to a processing circuit 421. The processing circuit 421 processes input electric signals in a predetermined manner so as to output a composite video signal.

The video composite signal is input to a color signal separating circuit 422 of the color smear detecting circuit 401. An output terminal of the color signal separating circuit 422 is connected to a color difference signal demodulating circuit 423 of which output terminal is in turn connected to a division circuit 424. An output terminal of the division circuit 424 is connected to an A/D converter 426 of which output terminal is branched for connection to a one-field memory 427 on one side and a subtraction circuit 428 on the other side. Note that the color signal separating signal 422, the color difference signal demodulating circuit 423, the division circuit 424 and the A/D converter 426 jointly constitute the color component extracting means 402.

An output terminal of the one-field memory 427 as the color component holding means 403 is connected to the subtraction circuit 428. An output terminal of the subtraction circuit 428 is connected to a threshold value circuit 429 which outputs a color smear (portion) detection signal. The subtraction circuit 428 and the threshold value circuit 429 jointly constitute the color smear discriminating means 404.

Operation of the color smear detecting circuit 401 thus arranged will be described below.

The composite video signal output from the processing circuit 421 is input to the color signal separating circuit 422 and then the color difference signal demodulating circuit 423 to produce color difference signals R-Y, B-Y. These color difference signals R-Y, B-Y are output to the division circuit 424 where R-Y is divided by B-Y to determine hue $\theta$. This hue $\theta$ is input to the A/D converter 426 for conversion to a digital signal. The digital signal is branched to two ways such that one is output to the one-field memory 427 and the other is output to the subtraction circuit 428.

Figure 43A:
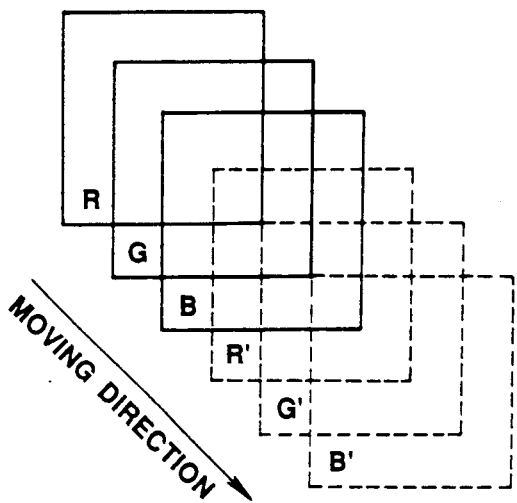
Figure 43B:
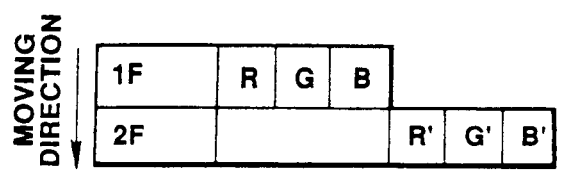

The digitized hue $\theta$ is delayed in the one-field memory 427 by one field and then output to the subtraction circuit 428. Here, as shown in FIG. 43, in the case where the rotatable color filter 417 has a switching period of 60 Hz, all the colors are renewed for each frame and hence the hue $\theta$ is also updated for each field. Accordingly, the color smear portions can all be detected by comparing the current hue $\theta$ not delayed with the hue $\theta$ delayed by one field.

The subtraction circuit 428 subtracts the delayed hue $\theta$ from the not-delayed $\theta$ to determine a difference therebetween which is output to the threshold value circuit 429. The above difference is compared with a preset reference value in the threshold value circuit 429. Dependent on compared result, the color smear detection signal is output from the threshold value circuit 429. By changing the preset reference value, sensitivity of detecting the color smear portions can be varied easily.

Figure 41:
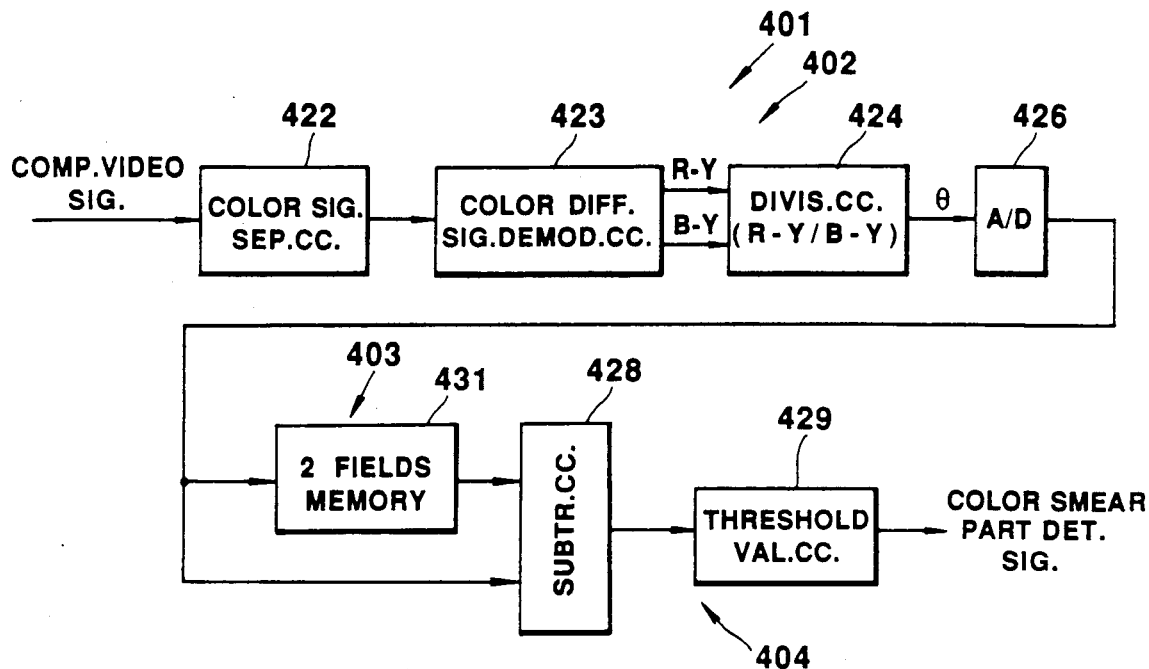
Figure 44:
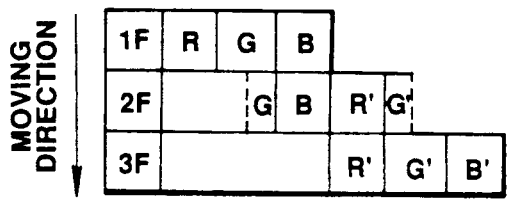

FIG. 41 shows the configuration of a color smear detecting circuit 401 adapted for the case where the rotatable color filter 417 has a switching period of 30 Hz. In this case, since all the colors are renewed for each two fields as shown in FIG. 44, the hue $\theta$ is also updated for each two fields. Therefore, a two-field memory 431 is provided in place of the one-field memory 427 shown in FIG. 40 to delay the hue $\theta$ by two fields. By comparing the hue $\theta$ delayed by two fields with the hue $\theta$ not delayed, the color smear portions can all be detected.

Figure 42:
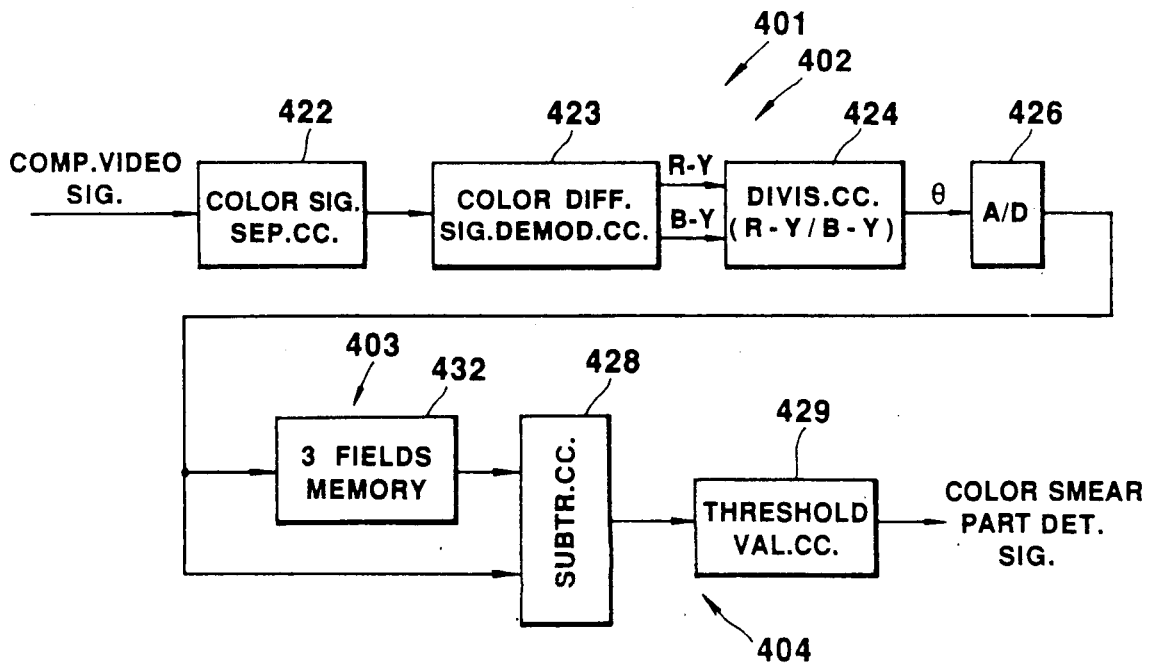
Figure 45:
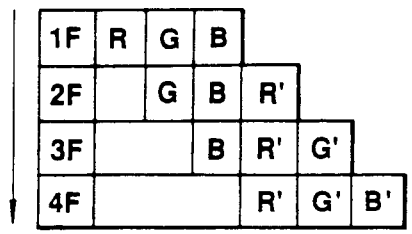

FIG. 42 shows the configuration of a color smear detecting circuit 401 adapted for the case where the rotatable color filter 417 has a switching period of 20 Hz. In this case, since all the colors are renewed for each three fields as shown in FIG. 45, the hue $\theta$ is also updated for each three fields. Therefore, a three-field memory 432 is provided in place of the one-field memory 427 shown in FIG. 40 to delay the hue $\theta$ by three fields. By comparing the hue $\theta$ delayed by three fields with the hue $\theta$ not delayed, the color smear portions can all be detected.

Figure 46:
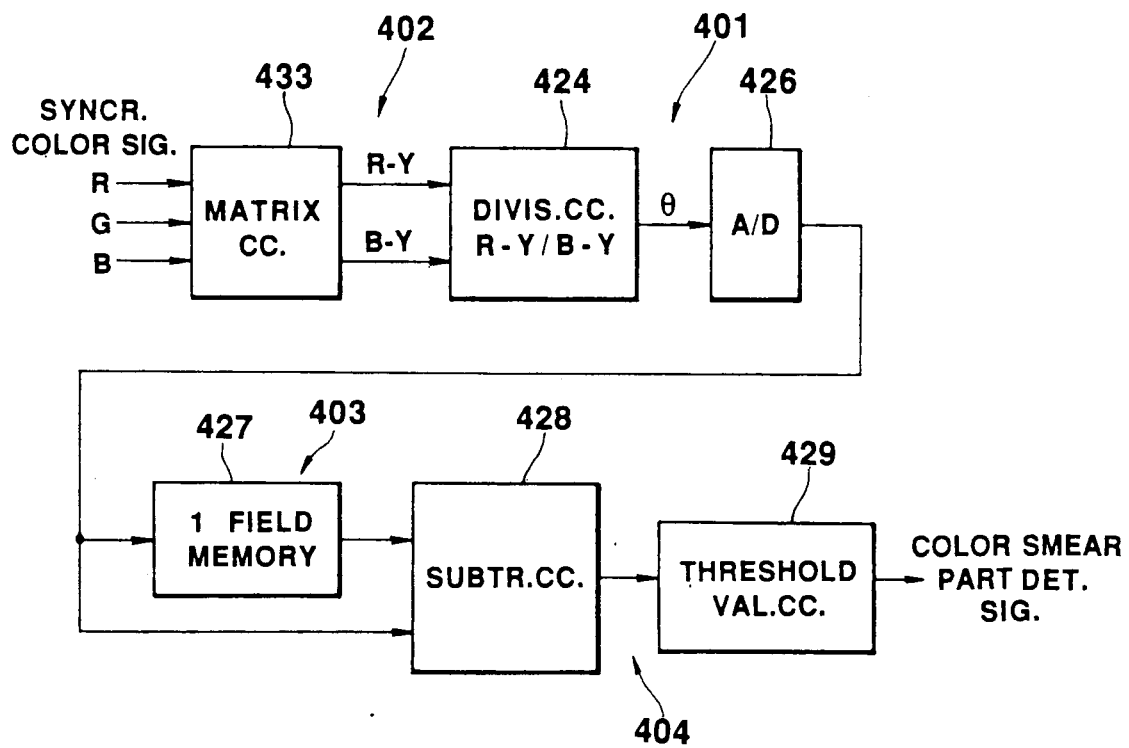
Figure 47:
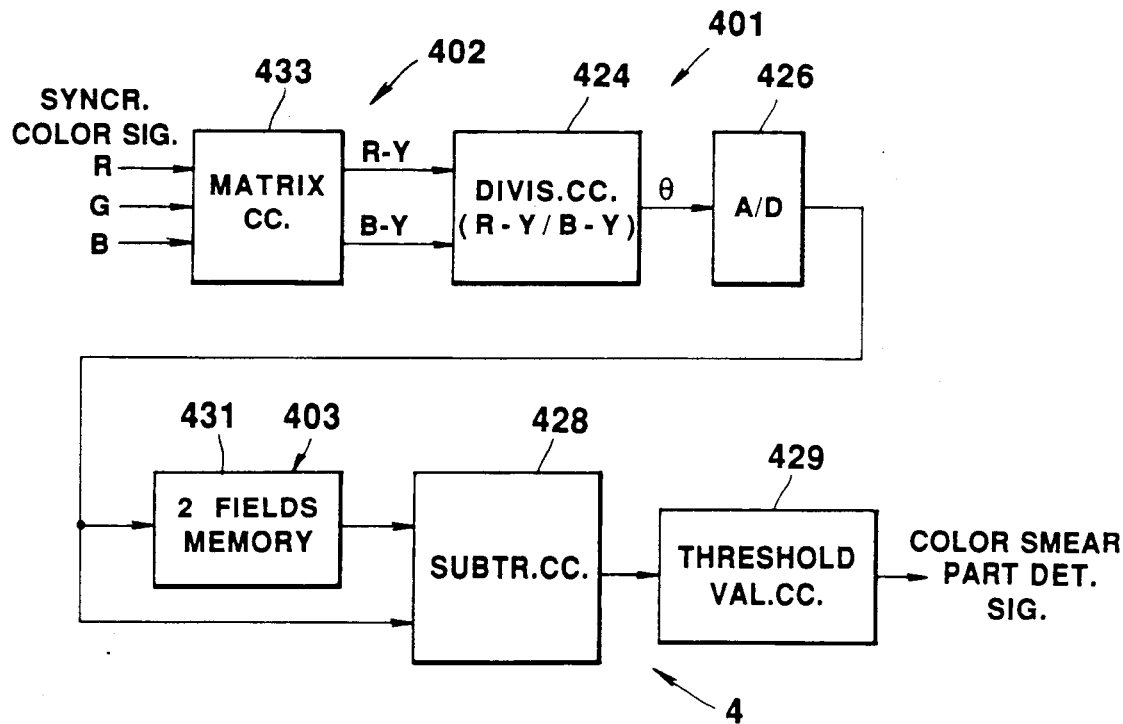
Figure 48:
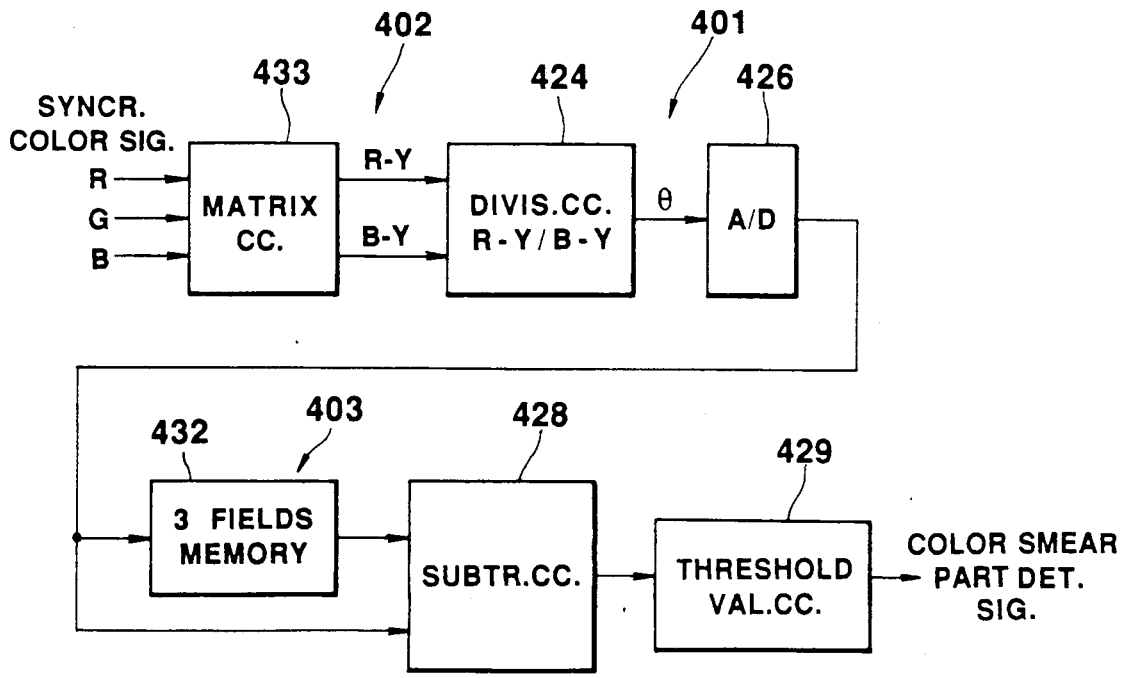

In the cases shown in FIGS. 46 through 48, the video signal from the processing circuit 421 is given by color frame synchronized signals.

FIG. 46 shows the case where the rotatable color filter 417 has a switching period of 60 Hz. In this case, a matrix circuit 433 is provided in place of the color signal separating circuit 422 and the color differential signal demodulating circuit 423 both used in FIG. 40. The matrix circuit 433 produces the color difference signals R-Y, B-Y which are output to the division circuit 424.

FIG. 47 shows the case where the rotatable color filter 417 has a switching period of 30 Hz. In this case, a matrix circuit 433 is provided in place of the color signal separating circuit 422 and the color differential signal demodulating circuit 423 both used in FIG. 41. FIG. 48 shows the case where the rotatable color filter 417 has a switching period of 20 Hz. In this case, a matrix circuit 433 is provided in place of the color signal separating circuit 422 and the color differential signal demodulating circuit 423 both used in FIG. 42. The remaining part and operation of each case of FIGS. 47, 48 and 49 are the same as those of the case of FIG. 40.

Thus, in this twentieth embodiment, the color component is extracted to compare the color component delayed by a certain period of time with the color component not delayed to detect the color smear portions, whereby the portions where color smear occurs can be detected through processing in narrow bands, while just comparing the color components at different time points to each other. This permits to form the color smear detecting circuit with the simple construction.

Next, there will be described a twenty-first embodiment in which a conversion table 436 is provided in place of the division circuit 424 of the color smear detecting circuit 401 used in the above twentieth embodiment.

Figure 49:
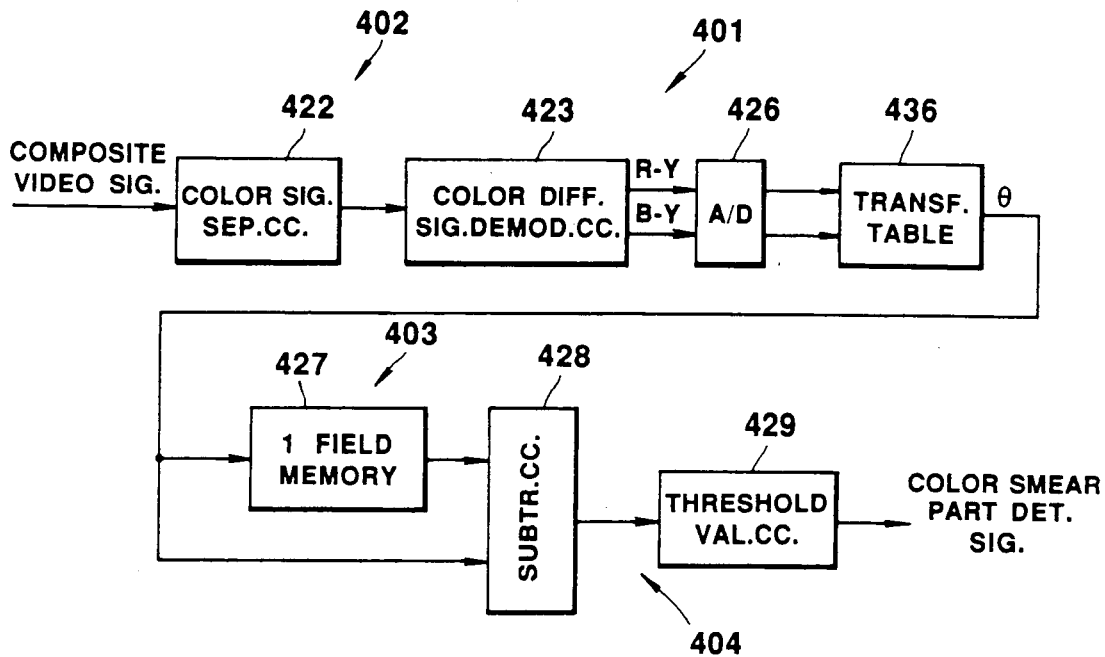

FIG. 49 shows the case where the input image is given by a composite video signal and the rotatable color filter 417 has a switching period of 60 Hz.

In FIG. 49, the input signal, i.e., the composite video signal, is introduced via a color signal separating circuit 422 to a color differential signal demodulating circuit 423 for producing color differential signals R-Y, B-Y which are then digitized by an A/D converter 426. The digitized color differential signals R-Y, B-Y are subjected to the following calculation in the conversion table 436, which comprises a calculator, ROM table or the like, for conversion to hue $\theta$:

$$\theta = \tan(r\text{-}Y/B\text{-}Y)$$

The hue $\theta$ determined by the conversion table 436 is output to both a one-field memory 427 and a subtraction circuit 428. The stage subsequent to the subtraction circuit is the same as that in the above twentieth embodiment.

Figure 50:
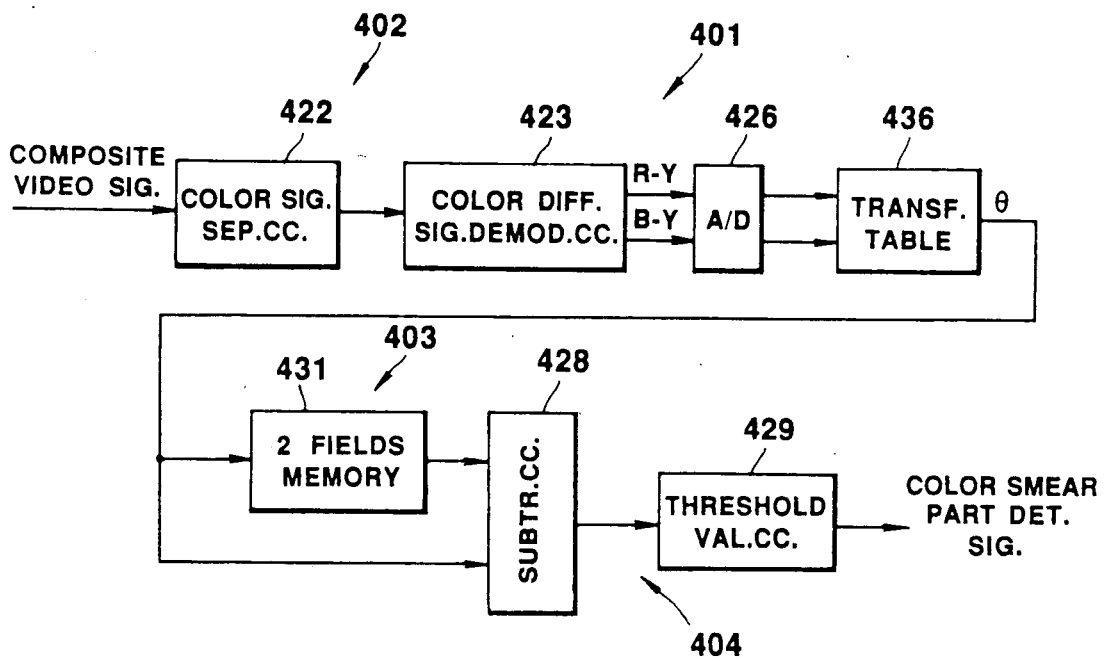

FIG. 50 shows the case where the rotatable color filter 417 has a switching period of 30 Hz. In this case, a conversion table 436 is provided in place of the subtraction circuit 424 in the color smear detecting circuit 401 of FIG. 41. The remaining part is constructed similarly to that in FIG. 41.

Figure 51:
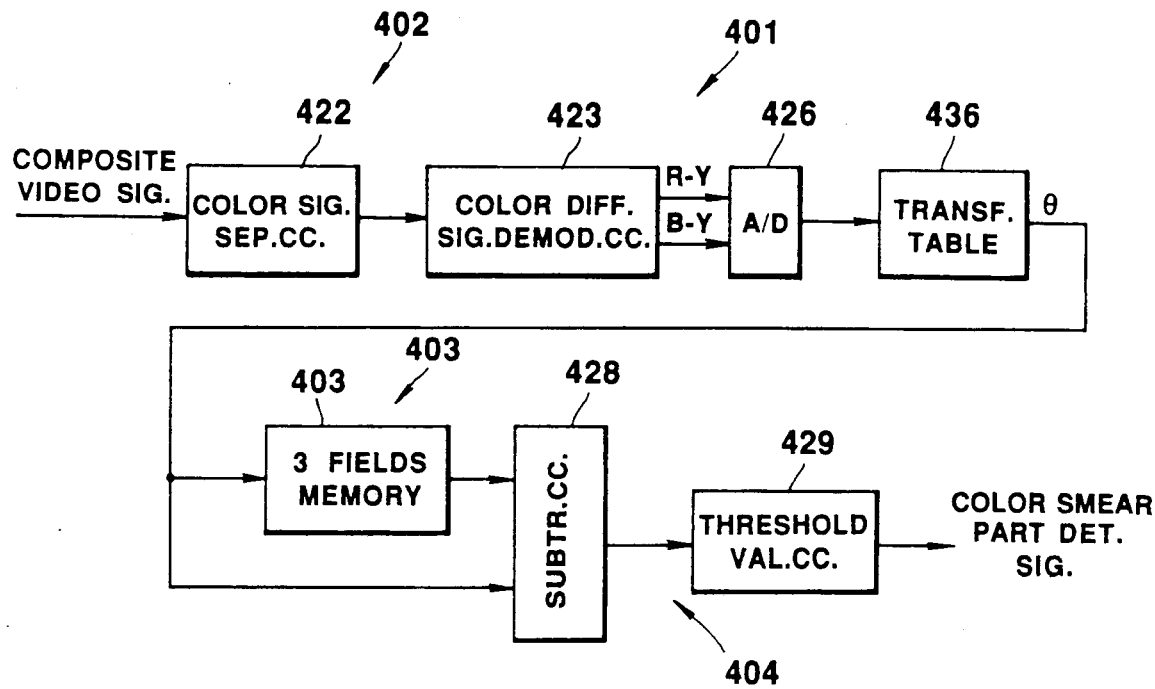

FIG. 51 shows the case where the rotatable color filter 417 has a switching period of 20 Hz. In this case, a conversion table 436 is provided in place of the subtraction circuit 424 in the color smear detecting circuit 401 of FIG. 42. The remaining part is constructed similarly to that in FIG. 42.

Figure 52:
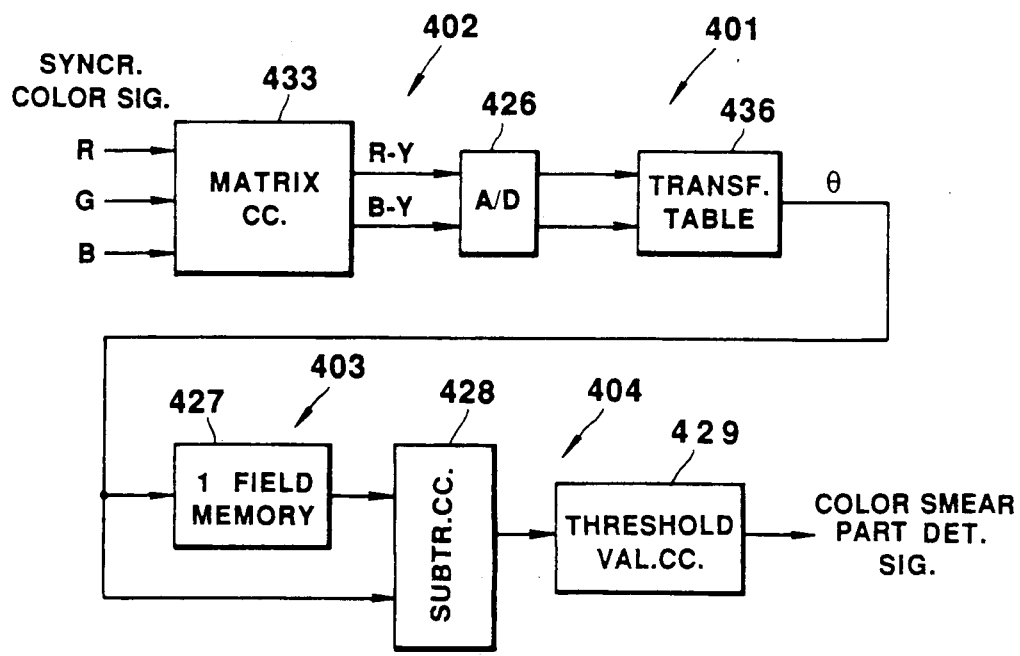
Figure 53:
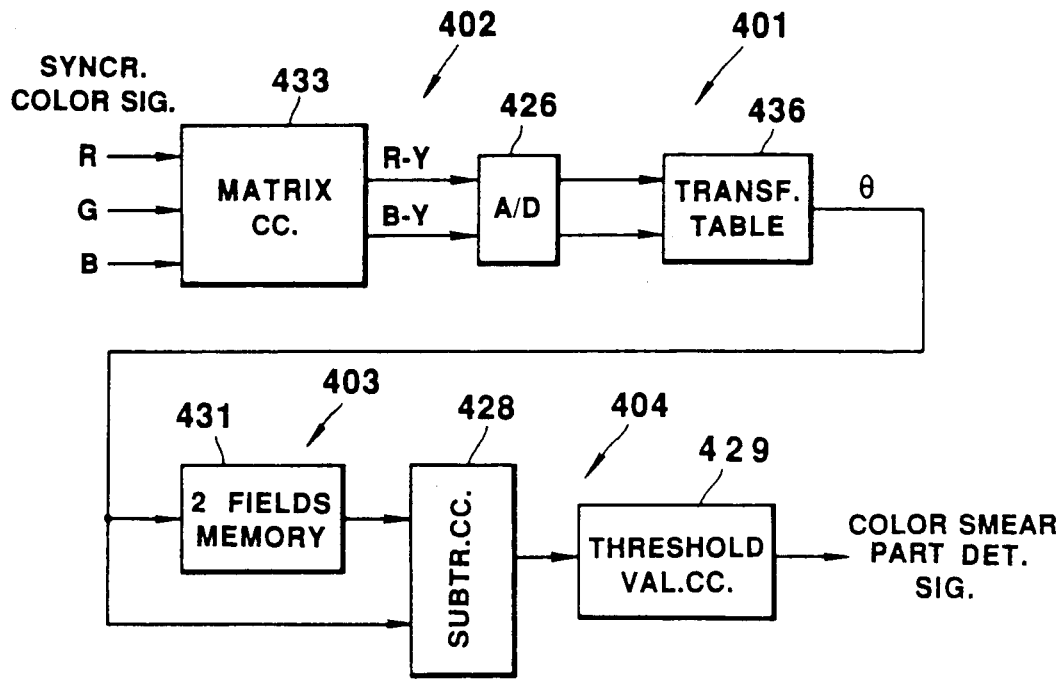
Figure 54:
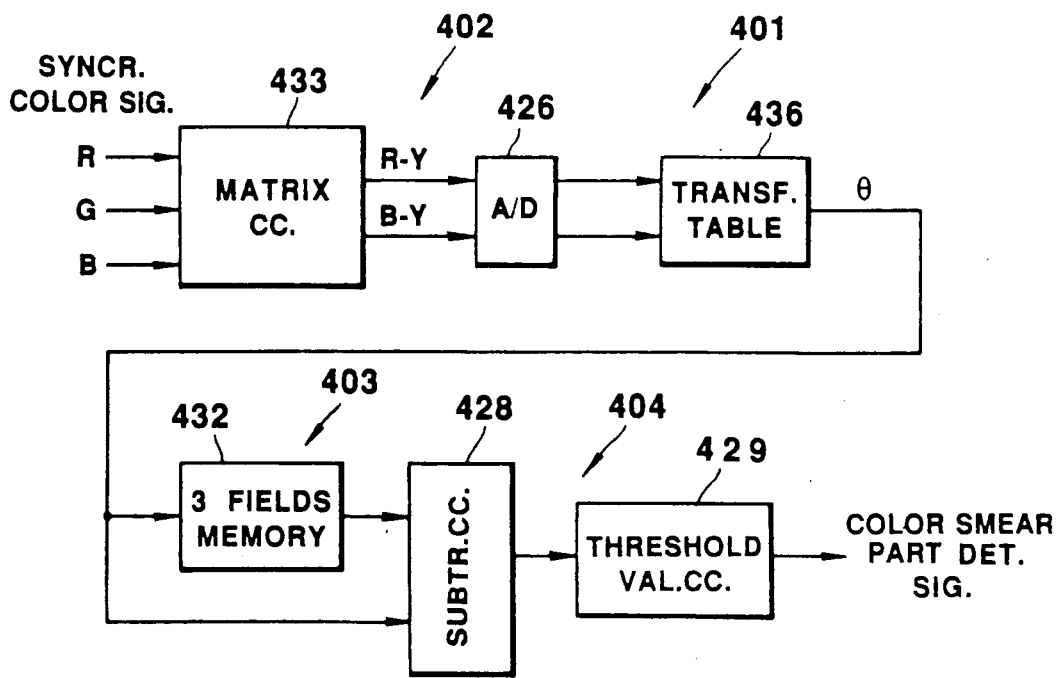

FIGS. 52 through 54 shows the cases in each of which the input video signal is given by color frame synchronized signals.

In the case of FIG. 52, a matrix circuit 433 is provided in place of the color signal separating circuit 422 and the color differential signal demodulating circuit 423 both in FIG. 49. In the case of FIG. 53, a matrix circuit 433 is provided in place of the color signal separating circuit 422 and the color differential signal demodulating circuit 423 in FIG. 50. Further, in the case of FIG. 54, a matrix circuit 433 is provided in place of the color signal separating circuit 422 and the color differential signal demodulating circuit 423 in FIG. 51.

The remaining part and operation of each case of the above cases are the same as those in the above twentieth embodiment.

In the twentieth embodiment, there is a likelihood that the hue $\theta$ can not be determined precisely when a denominator becomes near zero in the subtraction circuit 424, which may cause an error in detection of color smear. Such an error can be made smaller in this twenty-first embodiment by digitizing the color difference signals and determining the hue $\theta$ in a digital manner.

A twenty-second embodiment of the present invention will be described below.

FIG. 55 shows the case where the input image signal is given by color frame synchronized signals and the rotational color filter 417 has a switching period of 60 Hz.

In FIG. 55, input image signals RGB are digitized by an A/D converter 426 and then applied to a conversion table 438, which comprises a calculator or ROM table, for determining hue $\theta$ in accordance with the following equation:

$$\theta = (0.70R - 0.59G - 0.11B)/(0.89B - 0.59G - 0.30R)$$

The hue $\theta$ determined by the conversion table 438 is output to both a one-field memory 427 and a subtraction circuit 428. The stage subsequent to the subtraction circuit is the same as that in the above twentieth embodiment.

FIG. 56 shows the case where the rotatable color filter 417 has a switching period of 30 Hz. In this case, a two-field memory 431 is provided in place of the one-field memory 427 in FIG. 55. The remaining part is constructed similarly to that in FIG. 41.

FIG. 57 shows the case where the rotatable color filter 417 has a switching period of 20 Hz. In this case, a three-field memory 432 is provided in place of the one-field memory 427 in FIG. 55. The remaining part is constructed similarly to that in FIG. 42.

In this twenty-second embodiment, the matrix circuit 433 for converting the color frame synchronized signals to the color difference signals is omitted, while the RGB signals are directly digitized. This direct determination of the hue $\theta$ from the RGB signals makes it possible to improve accuracy and increase a degree of integration for a reduction in size of the circuit.

A twenty-third embodiment of the present invention will now be described by referring to FIGS. 58 through 60.

In this twenty-third embodiment, the input image signals for the color smear detecting circuit 401 of the above twenty-second embodiment are given by digital signals.

Figure 58:
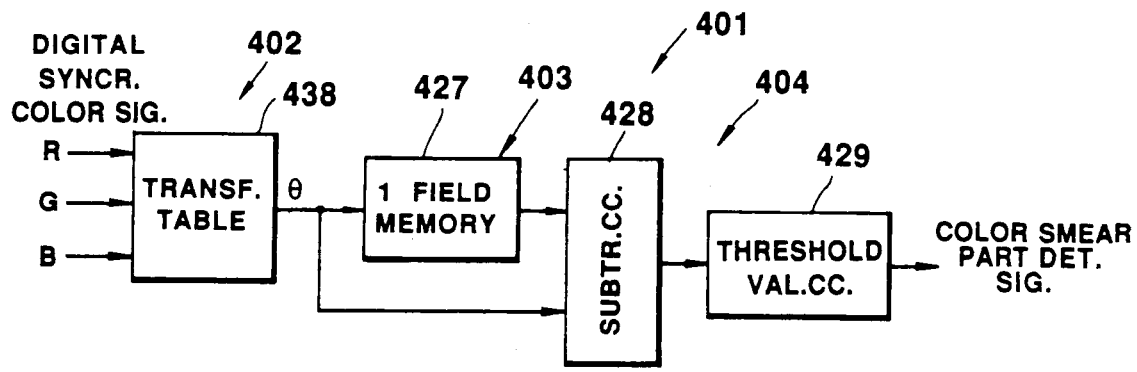

In FIG. 58, since the input image signals are digital signals, the A/D converter 26 used in the above twenty-second embodiment can be omitted. Accordingly, the input image signals are directly applied to a conversion table 438, which is the same as that referred in the twenty-second embodiment, for determining hue $\theta$. The remaining part is constructed similarly to that of the twenty-second embodiment shown in FIG. 55. Note that FIG. 58 shows the case where the rotatable color filter 417 has a switching period of 60 Hz.

Figure 59:
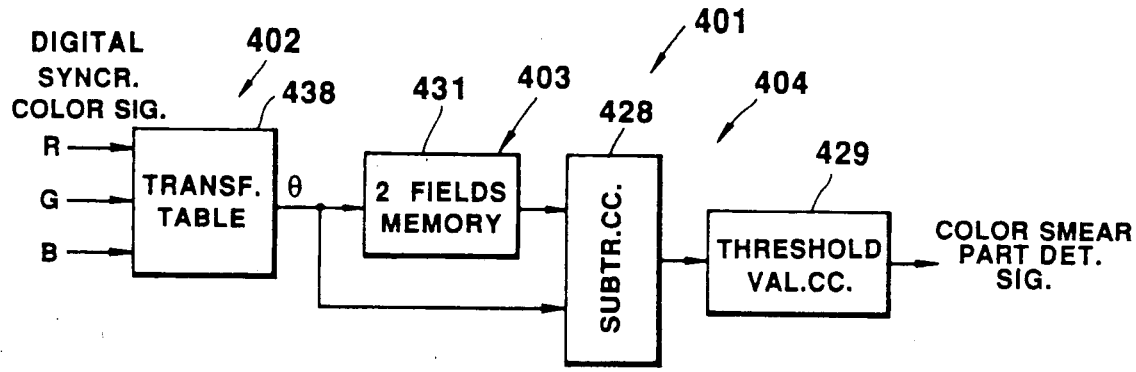

FIG. 59 shows the case where the rotatable color filter 417 has a switching period of 30 Hz. In this case, a two-field memory 431 is provided in place of the one-field memory 427 in FIG. 58. The remaining part is constructed similarly to that of the case shown in FIG. 41.

Figure 60:
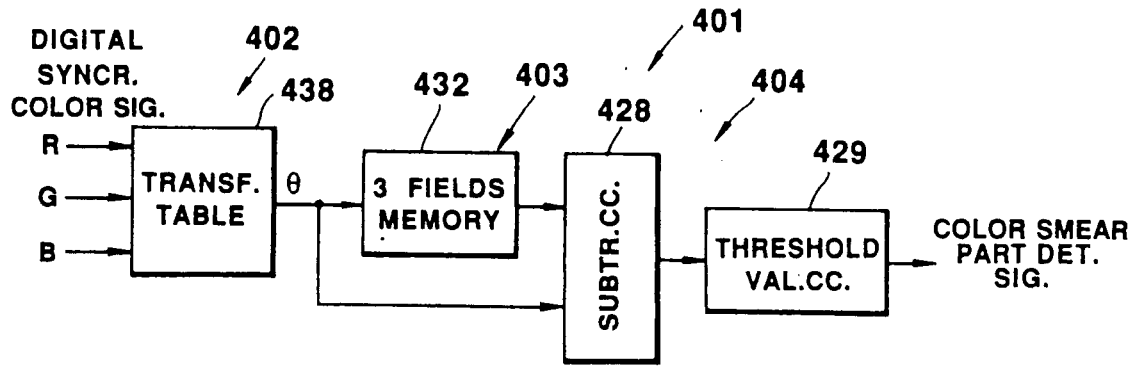

FIG. 60 shows the case where the rotatable color filter 417 has a switching period of 20 Hz. In this case, a three-field memory 432 is provided in place of the one-field memory 427 in FIG. 58. The remaining part is constructed similarly to that of the case shown in FIG. 42.

Figure 61:
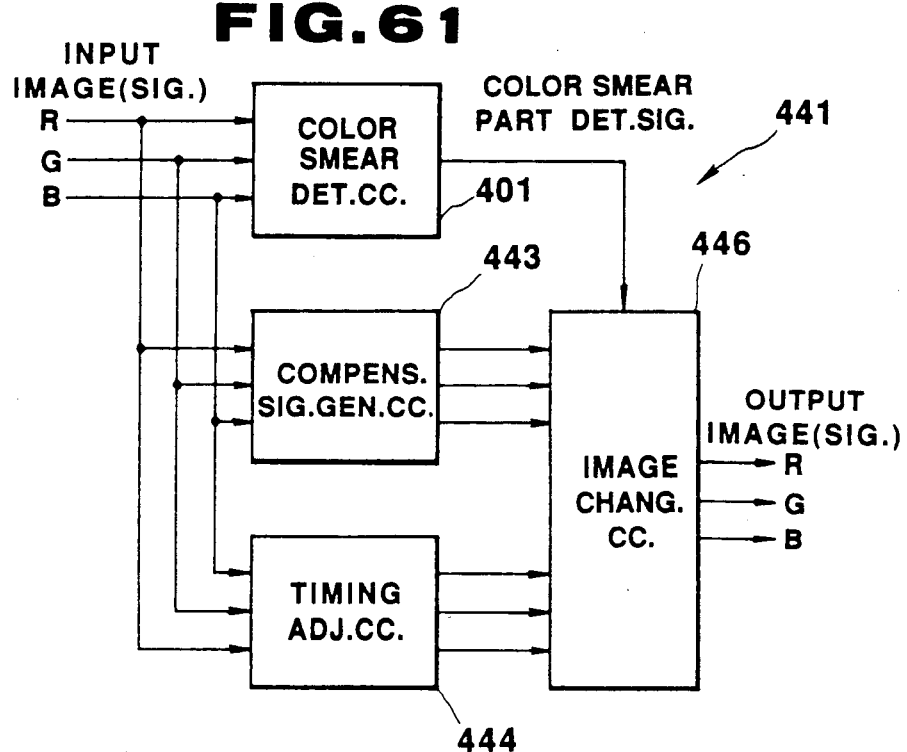
FIG. 61 is concerned with a twenty-fourth embodiment of the present invention and a block diagram of a color smear reducing device.

FIG. 61 is concerned with a twenty-fourth of the present invention and shows a block diagram of a color smear reducing device.

This embodiment is directed to employ any of the above-mentioned color smear detecting circuit 401 of the present invention.

In the color smear reducing device 441 of this embodiment, input image signals are applied to a color smear detecting circuit 401, a corrected color producing circuit 443, and a timing adjustment circuit 444. A color smear detection signal from the color smear detecting circuit 401 is output to image select circuit 446, while an output terminal of the corrected color producing circuit 443 and an output terminal of the timing adjustment circuit 444 are also connected to the image select circuit 446.

Specifically, in the above arrangement, the input image signals are introduced to the color smear detecting circuit 401, the corrected color producing circuit 443, and the timing adjustment circuit 444. The color smear detecting circuit 401 detects the color spear portions and outputs the color smear detection signal. The corrected signal producing circuit 443 produces and outputs an average value over the entire image by way of example. The timing adjustment circuit 444 adjusts the timing of the image signals so that the color smear detection signal and the actual color smear portion(s) of the input images become coincident with each other in timing, and then outputs the adjusted input images.

The output signals from the above three circuits are all applied to the image select circuit 446. In response to the color smear detection signal, the image select circuit 446 selectively outputs either one of the corrected color signals and the input images adjusted in timing such that the signals less affected with color smear are output when color smear is detected.

It is to be noted that other than producing an average value over the entire image, the corrected signal producing circuit 443 can also be comprised of a circuit for reducing color smear by lightening the color, creating an image restricted in the hue region, or mixing the average value with the original image. Also, the image select circuit 446 may be formed of a circuit for mixing the images with each other.

Figure 62:
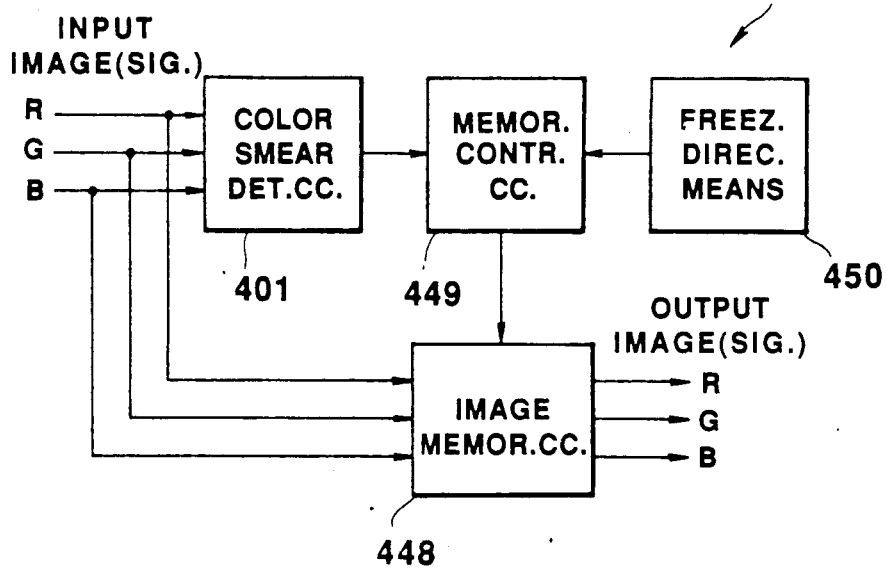
FIG. 62 is concerned with a twenty-fifth embodiment of the present invention, showing a block diagram of an image freezing device.

FIG. 62 is a block diagram of an image freezing device of a twenty-fifth embodiment.

This embodiment is directed to employ any one of the foregoing color smear detecting circuit 401.

In an image freezing device 447 of the twenty-fifth embodiment, input image signals are applied to both a color smear detecting circuit 401 and an image memory circuit 448. An output of the color smear detecting circuit 401 is applied to a memory control circuit 449. The memory control circuit 449 receives a freeze signal from a freeze direction means 450, and has its output terminal connected to the image memory circuit 448. The image memory circuit 448 outputs image signals not affected with color smear.

Specifically, in the above arrangement, the input image signals are applied to both the color smear detecting circuit 401 and the image memory circuit 448. In the presence of color smear, the color smear detecting circuit 401 outputs a color smear detection signal is applied to a memory control circuit 449.

On the other hand, when the freeze signal is input from the freeze directing means 450, the memory control circuit 449 checks whether or not the color smear detection signal is being input at the time of application of the freeze signal. In the absence of the color smear detection signal, the memory control circuit 449 outputs a control signal to the image memory circuit 448 for instructing it to store the image signals being input at the current time. In the presence of the color smear detection signal, the memory control circuit 449 does not output the control signal. Therefore, the image memory circuit 448 can store the images not affected with color smear for providing a still picture.

In the above-mentioned twentieth through twenty-fifth embodiments, the color components are extracted from the original images and color smear is discriminated based on the color components at different time points, by way of example. As an alternative, the color components may be extracted from the original images at different time points for discriminating color smear.

Although those embodiments have been illustrated as extracting the color components from the original images and then determining the presence of color smear, the original images or the extracted color components may be subjected to some processing (e.g., arithmetic operation such as differentiation, coding to binary notation, etc.), followed by determining the presence of color smear based on the processed signals at different time points.

With the twentieth through twenty-fifth embodiments, as explained above, it is possible in the imaging apparatus of the frame sequential type to detect color smear with the simpler and cheaper construction, by comparing the color components at different time points.

Next, there will be described an embodiment in which when color smear occurs, it is determined whether or not a degree of the color smear exceeds an allowable value, and if it exceeds the allowable value, a pseudo-image is displayed in place of the original image.

Figure 63:
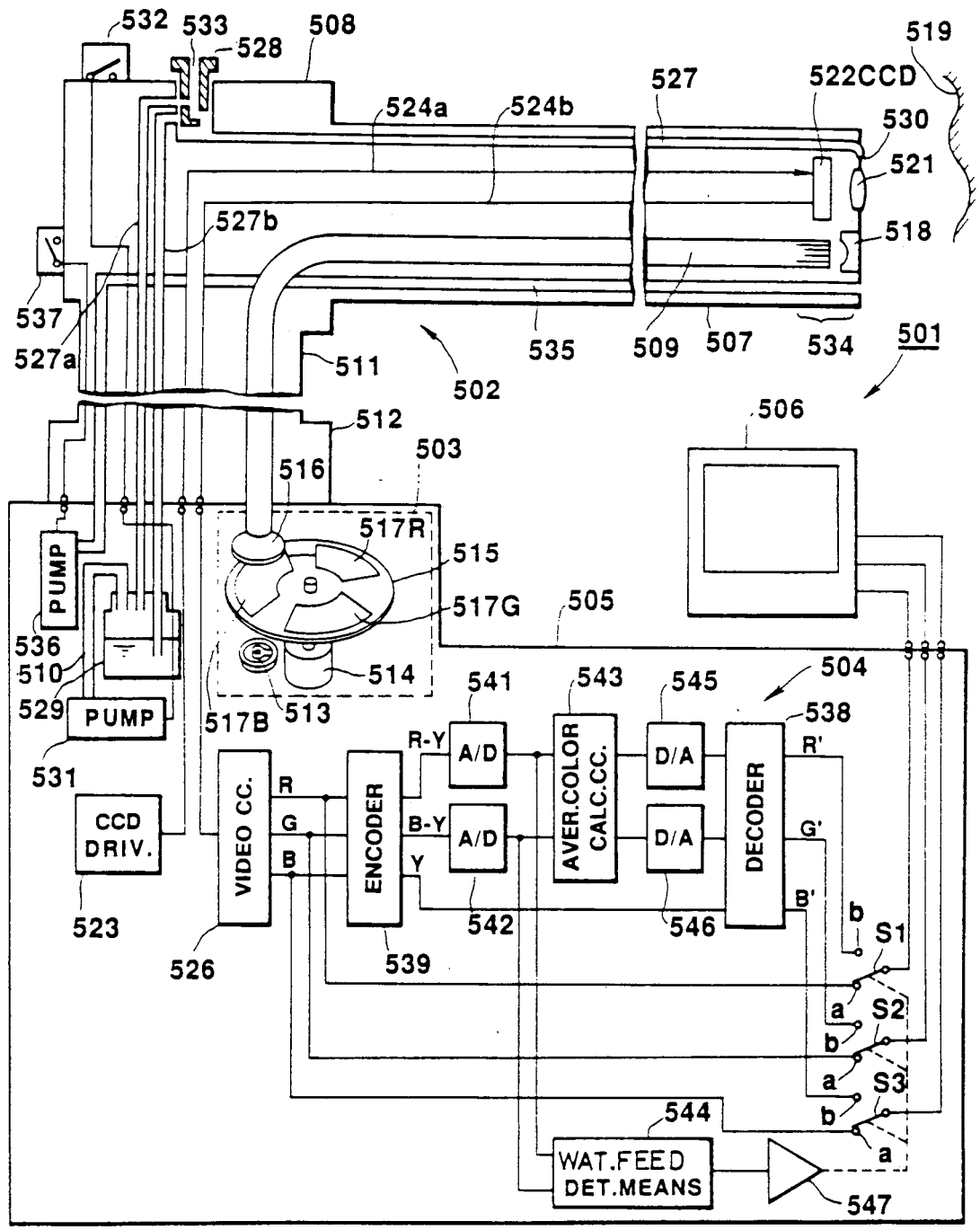

As shown in FIG. 63, an electronic endoscope apparatus 501 of a twenty-sixth embodiment comprises an electronic scope 502 of the frame sequential type, a video processor 505 incorporating both a light source 503 of the frame sequential type for supplying beams of frame sequentially illuminating light to the electronic scope 12 and an image processor (signal processor) 504, and a display 506 for displaying video signals issued from the video processor 505 in color.

The electronic scope 502 has a long and narrow insert portion 507 which is formed at its rear end with a fat and wide control portion 508.

A light guide 509 for transmitting the illumination light is provided to penetrate through the insert portion 507 and then a universal cord 511 extended from the control portion 508. A connector 512 at the end of the universal cord 511 can be fitted to the video processor 505.

Tight fitting of the connector 512 allows the illumination light from the light source 503 to be supplied to the incident end face of the light guide 509.

Specifically, a beam of white light from a lamp 513 passes through a rotatable color filter 515 rotated by a motor 514, and is then irradiated to the incident end face of the light guide 509 through a condenser lens 516.

The rotatable color filter 515 has three sector-like openings spaced from each other circumferentially and provided with color transmission filters 517R, 517G, 517B in red, green and blue, respectively. Accordingly, three beams of different wavelengths in red, green and blue, i.e., frame sequential beams of the illumination light, are supplied to the light guide 509 in turn. Then, the illumination light is transmitted through the light guide 509 and emitted from the emergent end face of the light guide 509 toward a front object 519 through an illumination lens 518 attached to the distal end of the insert portion 507. An image of the object 519 irradiated by the illumination light through the illumination lens 518 is formed on a CCD 522 by an object lens 521 attached to the distal end of the insert portion 507, the CCD 522 being disposed in the focal plane of the objective lens 521. The optical image is stored in the CCD 522 in the form of electric charges after photoelectric conversion.

A drive signal output from a CCD driver circuit 523 in the video processor 505 is applied to the CCD 522 via a signal line 524a for reading out the stored image. The read-out image is input via another signal line 524b to a video circuit 526 in the video processor 505, where it is subjected to signal processing to produce a standard video signal, e.g., three primary color signals R, G, B. The video circuit 36 issues the three primary color signals R, G, B from its output terminals.

An air-feed and water-feed tube 527 for feeding air and water is provided to penetrate through the insert portion 507 and branched to two tubes 527a, 527b at the position of an air-feed/water-feed switching button 528 in the control section 508, the two tubes 527a, 527b extending through the universal cord 511. Fitting of the connector 512 to the video processor 505 allows connection of the tubes with an air-feed and water-feed tank 529. This air-feed and water-feed tank 529 is connected to a pump 531 via a tube 510. By turning on a switch 532 through which the pump 531 is brought into an operative or inoperative state, the interior of the tank 529 is pressurized to carry out air-feed or water-feed.

In this connection, the aforesaid button 528 has an opening 533 formed to normally communicate the tube 527a with the exterior. In a normal state, therefore, even when the switch 532 is turned on, the air fed from the tank 529 via the tube 527a is discharged to the exterior through the opening 533. By closing the opening 533 with an operator's finger, the fed air is allowed to flow via the tube 527 into a nozzle 530 at the distal end 534 of the insert portion 507 for ejection toward the outer surface of the object lens 521 to which the nozzle 530 is directed.

Further, when the button 528 is depressed, the tube 527b is communicated with the tube 527 so that the water in the tank 529 under pressure is ejected from the nozzle 534 via the tubes 527b, 527 for washing out viscous liquid or the like deposited onto the outer surface of the object lens 421.

A suction tube 535 is also provided to penetrate through the insert portion 507 and the universal cord 511. The suction tube 535 is opened at the distal end 534 of the insert portion 507 on one side and is connected to a suction pump 536 within the video processor 505 via the connector 512 on the other side. Turning on the suction switch 537 permits to suck viscous liquid or the like through the suction tube 535.

The three primary color signals R, G, B output from the video circuit 526 are applied to one contacts a of switches S1, S2, S3 operated in interlock relation, while three primary color pseudo-signals R', G', B' output from a decoder 538 are applied to the other contacts b of the switches S1, S2, S3, respectively.

Note that, the switches S1, S2, S3 each comprise a semiconductor video switch or the like, for example.

The three primary color signals R, G, B are also input to an encoder 539 to produce a luminance signal Y and color difference signals R - Y, B - Y. The luminance signal Y is input to the decoder 538, and the color difference signals R - Y, B - Y are converted by A/D converters 541, 542 to digital color difference signals, respectively, which are then input to both an average color calculating means 543 for determining average colors and a water-feed detecting means 544.

The average color calculating means 543 integrates the input color difference signals R - Y, B - Y over a period of one field or one frame to determine average color difference signals <R - Y>, <B - Y> which are then input to the decoder 538 via D/A converters 545, 546, respectively. Thus, input to the decoder 538 are the signals <R - Y>, <B - Y> corresponding to the average hue and the luminance signal Y for specifying a luminance level of the former signals. Therefore, the three primary color pseudo-signals R', G', B' output from the decoder 538 become signals corresponding to the average color not affected with color smear.

Upon detecting the actuation of water-feed, the water-feed detecting means 544 changes over the switches S1, S2, S3 via a driver 547 to turn on their contacts b so that the three primary color pseudo-signals R', G', B' are output to a display 506 for displaying a color picture based on the average color not affected with color smear in place of a color picture affected with color smear due to the water-feed.

Figure 64:
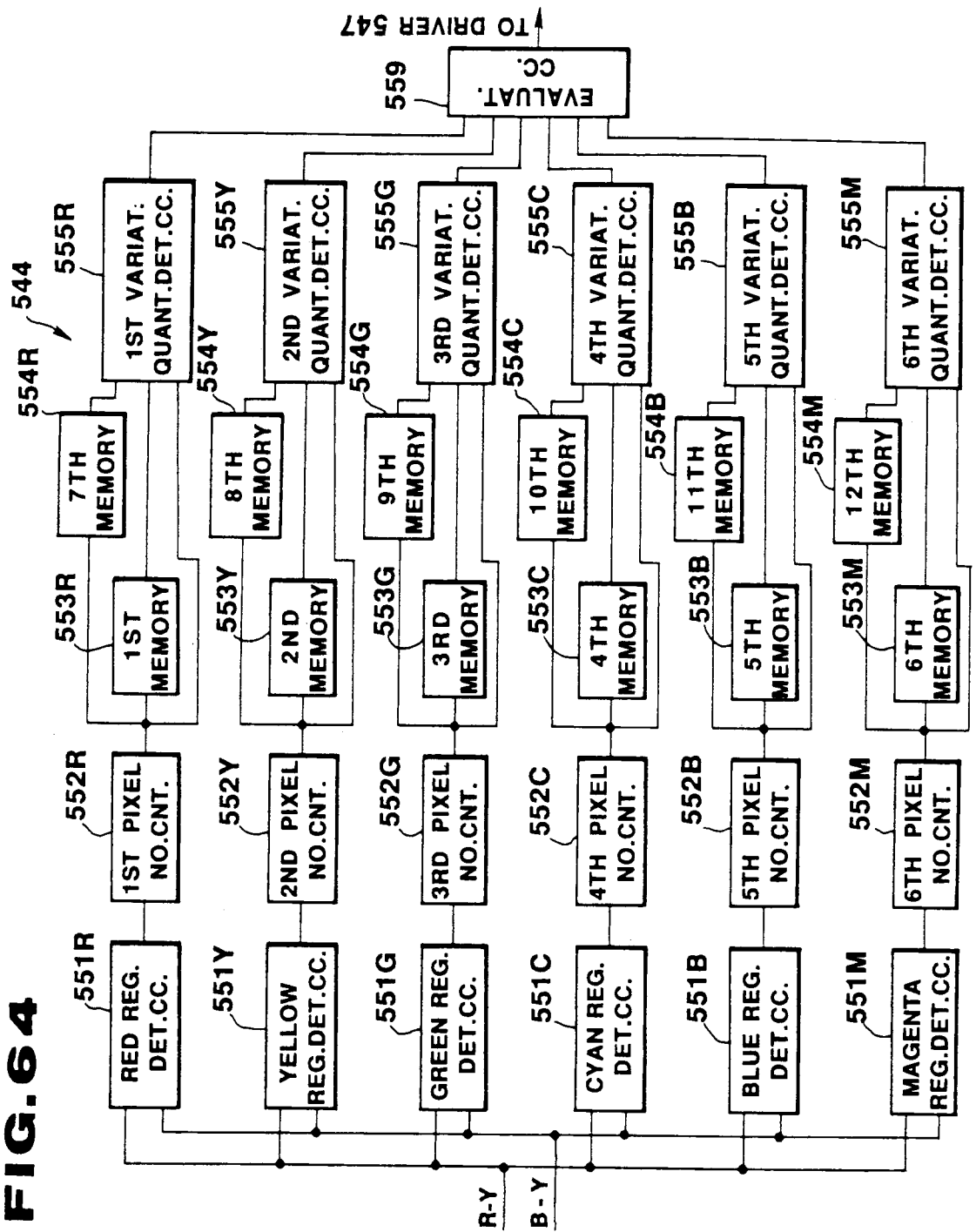

The configuration of the water-feed detecting means 544 is shown in FIG. 64.

The color difference signals B - Y, B - Y after A/D conversion are input to each of six color region detecting circuits; a red region detecting circuit 551R, a yellow region detecting circuit 551Y, a green region detecting circuit 551G, a cyan region detecting circuit 551R, a blue region detecting circuit 551B, and a magenta region detecting circuit 551M.

Upon receiving a signal which has the hue near one of red, yellow, green, cyan, blue and magenta, each color region detecting circuit 551I (I=R, Y, G, C, B, M) detect the signal and counts up an associated I-th number-of-pixels counter 552I. In order to avoid malfunction due to noise, only those pixels which have saturation not less than a certain level are allowed to enter the counter 552I through a saturation detector (not shown).

The count value counted by each number-of-pixels counter 552I is alternately stored in one of first through sixth memories 553I and one of seventh through twelfth memories 554I for each one field/frame (hereinafter represented by field). Accordingly, the first through sixth memories 553I and the seventh through twelfth memories 554I each store therein the count value one field or two fields before.

At the completion of each field, the count values of the I-th number-of-pixels counter 552I, the I-th memory 553I and the (6+I)-th memory 554I, i.e., the count values in the current field, in the field one field before the current one, and in the field two fields before the current one, are input to an I-th change rate detecting circuit 555I which in turn issues data corresponding to the input count values.

Figure 65:
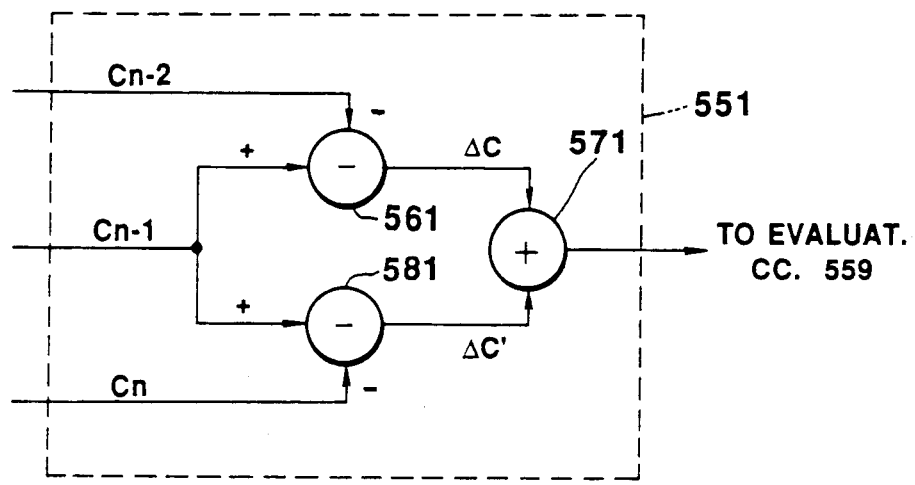

The configuration of the I-th change rate detecting circuit 555I is shown in FIG. 65 by way of example.

Count values Cn-2, Cn-1 in the (n−2)-th, (n−1)-th fields are subtracted by a subtracter 556I therebetween, and the resulting absolute value |Cn-2−Cn-1| (=ΔC) is input to an adder 557I. Further, count values Cn-1, Cn in the (n−1)-th, n-th fields are subtracted by a subtracter 558I therebetween, and the resulting absolute value |Cn-1−Cn| (=ΔC') is also input to the adder 557I. Those two absolute values |Cn-2−Cn-1|, |Cn-1−Cn| are added by the adder 557I to each other and then input to an evaluation circuit 59.

When the output value applied to the evaluation circuit 559 from the I-th change rate detecting circuit 555I reaches a certain level, the evaluation circuit 559 drives the switches S1–S3 via the driver 547.

A practical example of the evaluation circuit 559 is shown in FIG. 66.

Figure 66A:
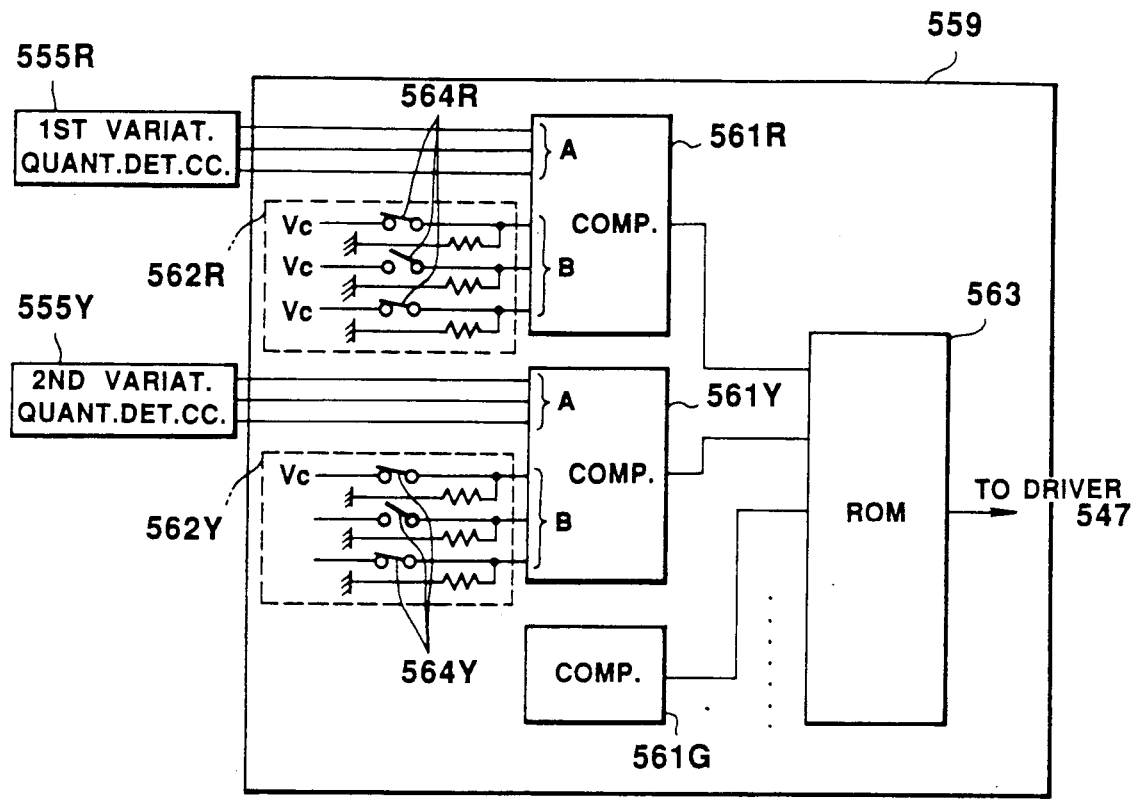
FIGS. 66a and 66b are circuit diagrams showing practical examples of an evaluation circuit.

In a practical example shown in FIG. 66a, an output of each I-th change rate detecting circuit 555I is applied to one input terminal A of an I-th comparator 561I, and a reference value from a reference value setting circuit 562I is applied to the other input terminal B of the I-th comparator 561I. When the value applied to the input terminal A is larger than the reference value, the comparator 561I issues an output signal of "H".

The output signal of each comparator 561I is applied to a ROM 563. Only when a plurality of comparators 561I issue the output signals of "H", for example, the switches S1–S3 are changed over via the driver 547 upon determining that there occurs color due to water-feed. In other words, the water-feed can be detected based on the distribution of the data from the respective change rate detecting circuits 555I.

The aforesaid reference value setting circuit 561I is arranged such that the reference value can variably be set using dip switches 564I, for example.

Figure 66B:
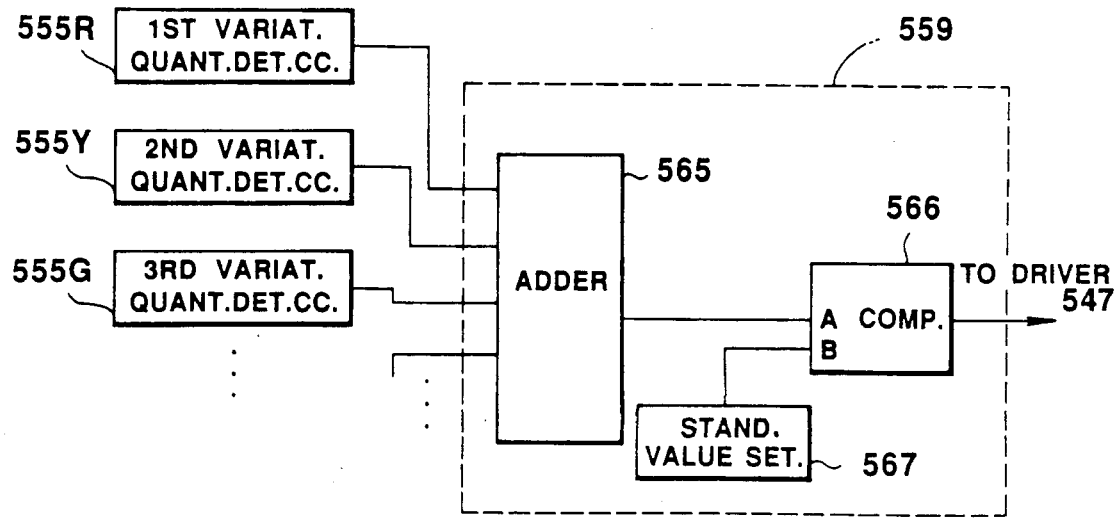

In a practical example shown in FIG. 66b, respective outputs of the I-th change rate detecting circuits 555I are applied to an adder 565 for addition. An output of the adder 565 is applied to one input terminal A of a comparator 66.

A reference value from a reference value setting circuit 567 is applied to the other input terminal B of the comparator 566 for comparison with a value applied to the input terminal A. Specifically, when the value applied to the input terminal A exceeds the reference value, the switches S1–S3 are changed over via the driver 547 upon determining that there occurs color due to water-feed.

As an alternative, the evaluation circuit 559 may be arranged so as to evaluate a time-dependent change in the output signal of each I-th change rate detecting circuit 555I.

At the time the evaluation circuit 559 has completed its evaluation process, the count value of the I-th number-of-pixels counter 552I, which has been issued to the I-th change rate detecting circuit 555I, is now stored in the I-th memory 553I or the (6+I)-th memory 554I to be readied for operation in the next field.

Operation of the twenty-sixth embodiment constructed as mentioned above will be described below.

Figure 67:
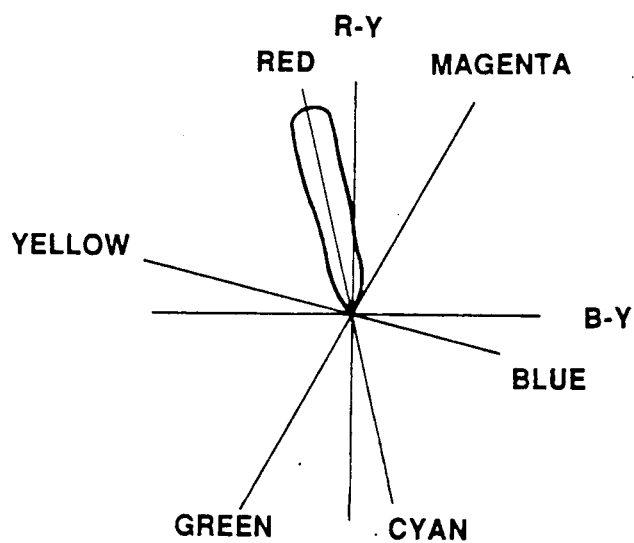
Figure 68:
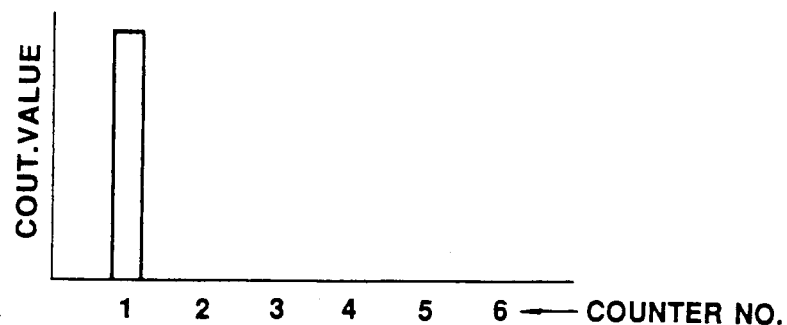

When the stomach walls of a living body and the like are observed under the absence of water-feed, hues of the image signals exist only near red on the color difference signal plane, as shown in FIG. 67. Accordingly, the number of pixels representing the hue near red are counted by the first number-of-pixels counter 552R via the red region detecting circuit 551R, and the first number-of-pixels counter 552R gives the output as shown in FIG. 68. The count value of the first number-of-pixels counter 552R will hardly be changed for each field.

Figure 69A:
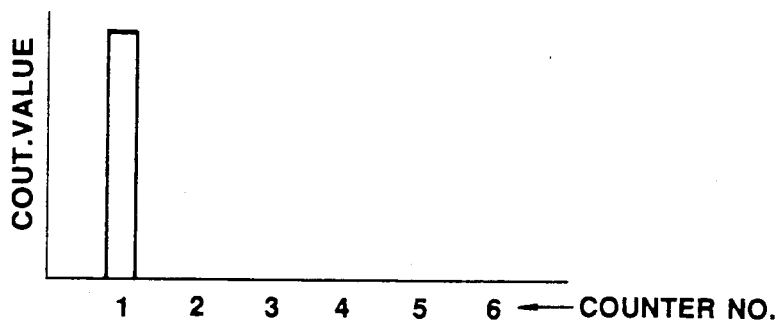
Figure 69B:
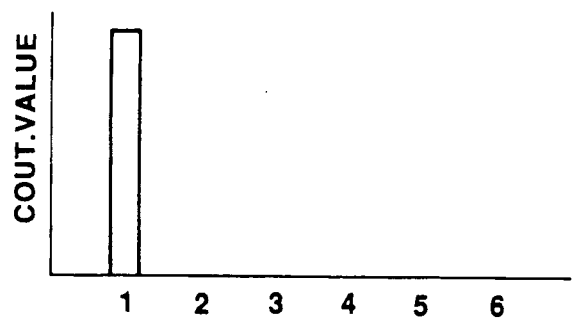
Figure 69C:
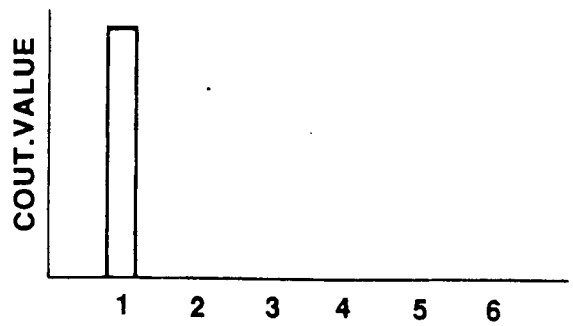

Specifically, during the absence of water-feed, the first number-of-pixels counter 552R gives the measured values of the number of pixels for three fields, as shown in FIGS. 69a, 69b and 69c, for example. Thus, the count values are not appreciably changed over three fields.

Therefore, the output of the I-th change rate detecting circuit 555R becomes substantially equal to zero. All of the other number-of-pixel counters 552Y–552M output small count values in each field, and the change rates of the count values are still smaller. For the reason, those count values are approximated by zero in FIGS. 68 and 69.

Figure 70A:
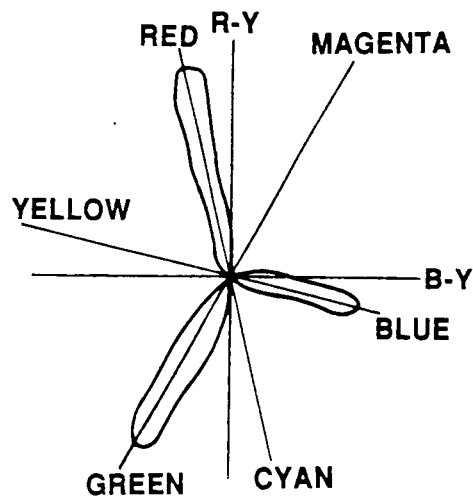
FIGS. 70a–70d are explanatory views showing the hue distribution of an image under feeding of water.
Figure 70B:
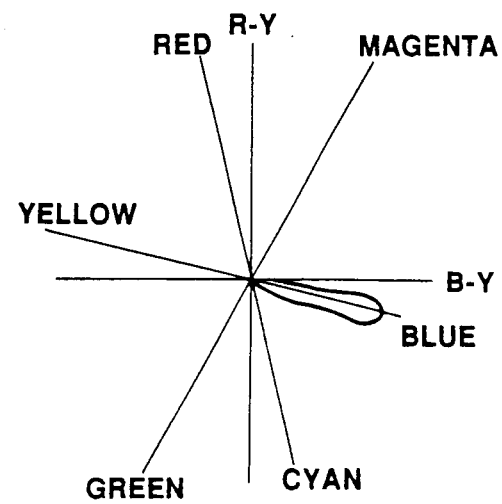

Meanwhile, when the water-feed is started by turning on the switch 532 and depressing the button 528, water droplets ejected from the nozzle 530 move across the field of the object lens 521 with the water-feed operation. On this occasion, if the timings of the water droplets moving across the lens field coincide with the timings at which the respective color transmission filters 517R, 517G, 517B of the rotatable color filter 515 are brought to traverse the optical path of the illumination light, the hue distribution of the displayed image is given by three primary colors as shown in FIG. 70a. Instead of this, if only the color transmission filter 517B is brought to traverse the optical path at the cross-timings of the water droplets, the hue distribution is given by blue alone in this case, as shown in FIG. 70b.

Figure 70C:
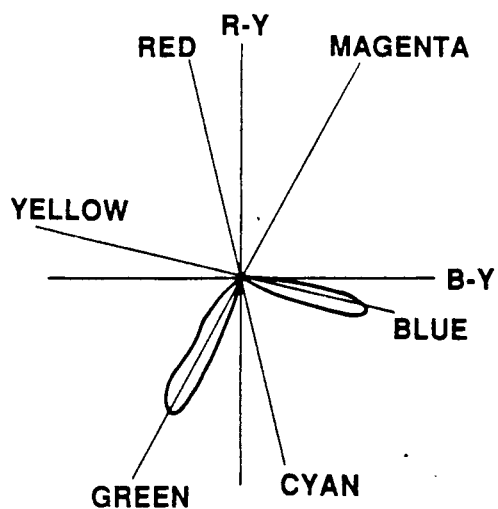
Figure 70D:
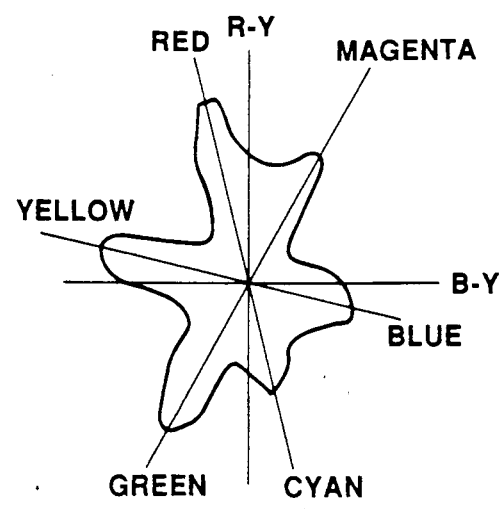

Alternatively, if the color transmission filter 517G, 517B traverse the optical path at that timings, the hue distribution is given by green and blue as shown in FIG. 70c. Furthermore, dependent on the timings of the water droplets being ejected, six colors including not only the three primary colors but also yellow, cyan and magenta, each expressed by a combination of the former, may occur in the hue distribution as shown in FIG. 70d. In addition, other intermediate hues than the above six colors may also occur in some cases.

When the water droplets are moved, the above hues determining the hue distribution are varied with overlaps of color component images of the water droplets dependent on a combination of the timing of the droplet movement and the timings of illumination periods of the respective color beams. Those hues are also varied dependent on shapes of the water droplets, the manner or condition of the illumination light impinging upon the water droplet, and so forth. In general, therefore, the hue distribution is abruptly or greatly changed for each field or frame of the image signals.

If changes in hue take place as shown in any of FIGS. 70a, 70b, 70c and 70d, the numbers of pixels in the corresponding image are counted for the respective hues by the I-th number-of-pixels counters 552I which constitute the water-feed detecting means 544.

Figure 71A:
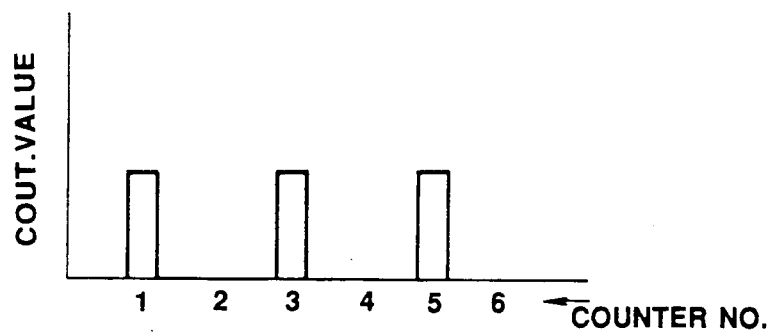
FIGS. 71a–71d are explanatory views showing counted values of the counters in the case of FIG. 70.
Figure 71B:
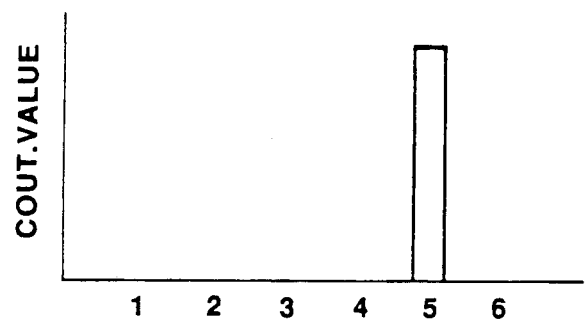
Figure 71C:
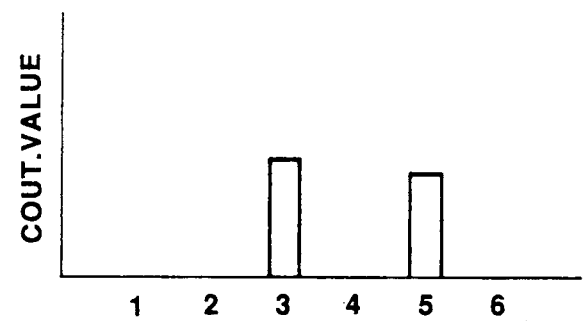
Figure 71D:
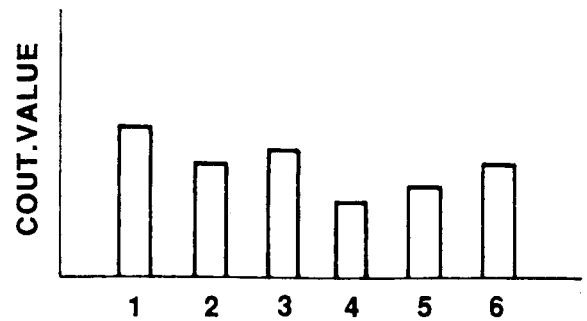
Figure 72:
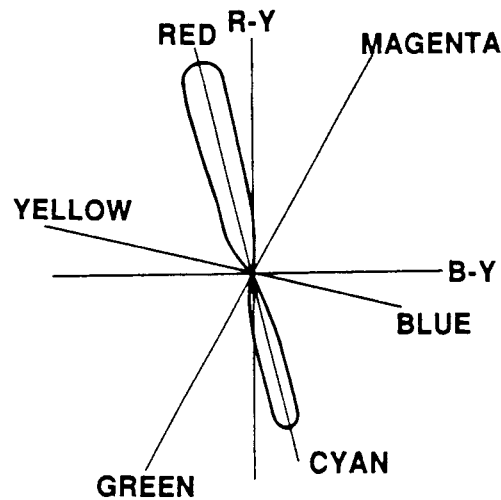

More specifically, in the cases of FIGS. 70a, 70b, 70c and 70d, the count values of the I-th number-of-pixels counters 552I are given by FIGS. 71a, 71b, 71c and 71d, respectively. For example, let it now be assumed that the field in the absence of water-feed (e.g., the first field) is represented by FIG. 68, the next field (e.g., the second field) is represented by FIG. 71a, and the subsequent field (e.g., the third field or the current field) is represented by FIG. 71b. Count values of the number of pixels in the first and second fields are written into the I-th memory 531I and the (6+I)-th memory 554I at the end of each field, respectively. Then, at the end of the third field, the count values in the I-th memory 531I, the (6+I)-th memory 554I and the I-th counter 552I (the current field) are input to the I-the change rate detecting circuit 555I for calculating the absolute values of differences in the count value between the different two fields. The sum of the calculated absolute values is input to the evaluation circuit 559.

The evaluation circuit 559 determines the occurrence of color smear due to water-feed upon judging that an output level of at least one change rate detecting circuit 555I other than the first change rate detecting circuit 555R is also equal to or larger than the reference value, for example, whereupon the switches S1–S3 are changed over via the driver 547 to turn on their contacts b.

With such changing-over of the switches S1–S3, the three primary color pseudo-signals R', G', B' based on the average color of the image signals in the field one before, i.e., in the preceding last field, are output to the display 506 so that the pseudo-color images not affected with color smear are displayed after being replaced with the original images.

With this twenty-sixth embodiment, when color smear occurs due to water-feed, the color smear is determined to be concomitant with water-feed if a degree of the color smear reaches or exceeds a certain preset value, whereupon the pseudo-color images not affected with color smear are displayed. Accordingly, even when actuating the water-feed operation, an operator is kept from observing awkward or uncomfortable images such as displayed in rainbow colors. In other words, it is possible to display the pseudo-color images when there occurs color smear exceeding an allowable limit degree, and the original images when the degree of color smear is smaller than an allowable value, thereby allowing the observer's eyes to feel less fatigued without causing no troubles in observation.

Further, since the pseudo-color is expressed based on the average value or color in one field/frame, there can be obtained a picture free of color smear and less blurred.

In the case the object is dyed by a cyan-based pigment such as methylene blue, the hue of pixels exists only near red and cyan, thus resulting in the hue distribution as shown in FIG. 27. In this case as well, color smear due to water-feed can be discriminated because the number of pixels belonging to the vicinity of each of those hues for each field is small in change rate.

Specifically, the count values input to both the first change rate detecting circuit 555R and the fourth change rate detecting circuit 555C have small changes between the successive fields. Accordingly, by employing the change rate detecting circuit shown in FIG. 65, for example, the hue distribution in a normal state can clearly be discriminated from that resulted in the case of producing color smear due to water-feed. As a consequence, the water-feed detecting means 544 is able to determine the water-feed operation.

Although the above explanation is directed to detection of color smear due to water-feed, this embodiment is also applicable to the case of ejecting a mixture from water-feed and air-feed, i.e., bubbles or mist, or the case where a water droplet, viscous liquid or the like is moved or shifted with the fed air.

Also, in the case where the suction switch 537 is turned on to suck viscous liquid or the like, even if color smear occurs due to a movement of the viscous liquid upon suction, the occurrence of color smear is determined by the water-feed detecting means 544 as with the case of water-feed. Thus, when a degree of the occurred color smear is equal to or larger than an allowable value, replacement of the original images with the pseudo-color images is performed to be displayed on the display 506.

Note that color smear of a large degree due to water-feed or the like can effectively be detected by setting the respective color region detecting circuits 555I shown in FIG. 64 in accordance with the frame sequential light. In other words, it is preferably to set the color detecting regions corresponding to the ranges of the frame sequential wavelengths, respectively. In such setting, it is also preferably to additionally set the detecting regions corresponding to the combined ranges of the above frame sequential wavelengths.

Figure 73:
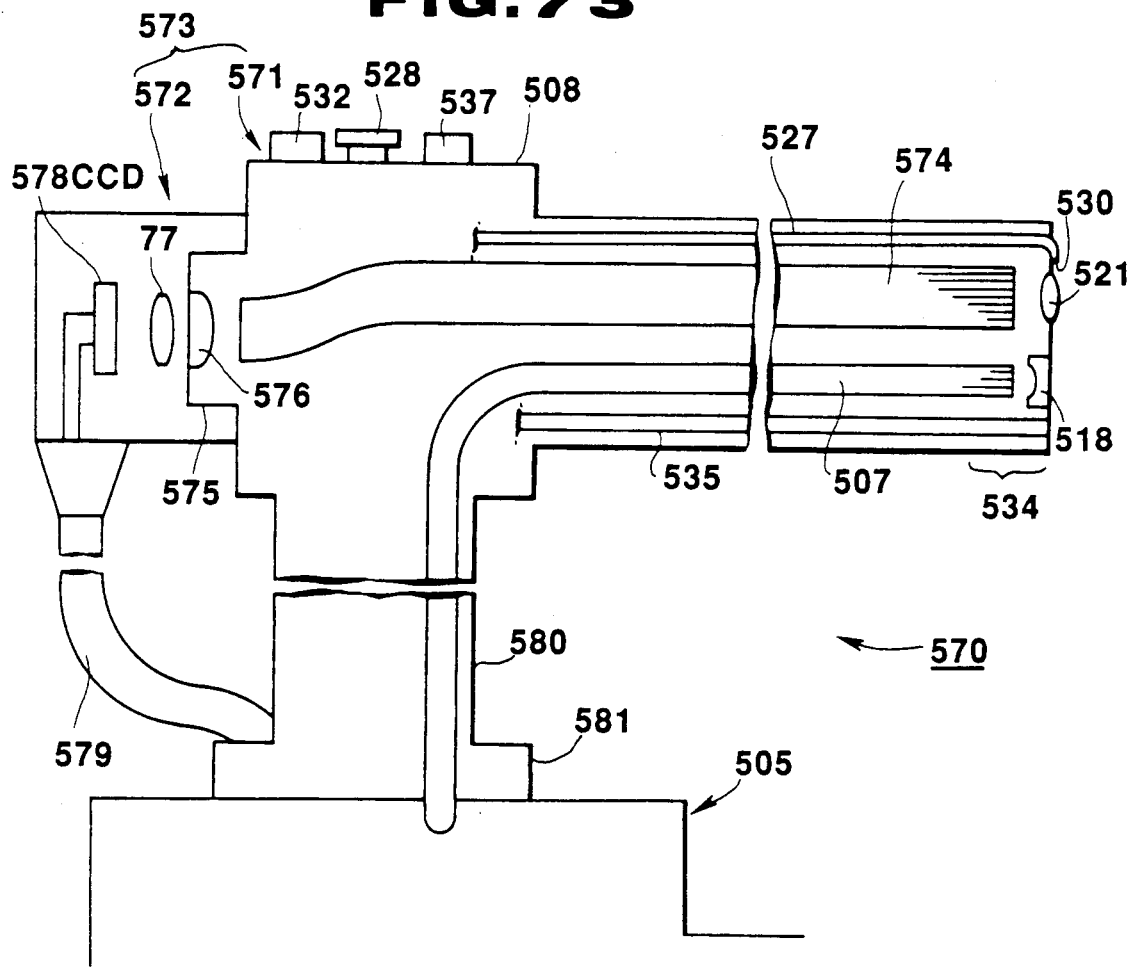
FIG. 73 is a diagrammatic view showing the configuration of a fiber scope and a TV camera in a twenty-seventh embodiment of the present invention.

The above twenty-sixth embodiment has been explained in connection with the endoscope apparatus 501 using the electronic scope 502. However, an electronic endoscope apparatus 570 of a twenty-seventh can be constructed using a scope 573 externally equipped with a TV camera, the scope 573 including a TV camera 572 fitted to a fiber scope 571 as shown in FIG. 73.

Comparing with the electronic scope 502 shown in FIG. 63, the fiber scope 571 is arranged such that an image guide 574 is disposed with its one end face positioned at the focus position of the object lens 521, and an optical image focused at that end face is transferred through the image guide 574 to the other end face thereof in an eyepiece portion 575 provided at the rear end of a control portion 508.

An eyepiece lens 576 is disposed in facing relation to the other end face of the image guide 574, allowing it to observe the transferred optical image in an enlarged scale through the eyepiece lens 576.

The TV camera 572 can be fitted to the eyepiece portion 575.

Since the fiber scope 571 incorporates no CCD 522, the universal cord 511 of the control portion 508 except for the signal lines 524a, 524b is provided to penetrate through a cable 580 extended from the control portion 508 (as indicated by only the light guide 507 in the drawing). A connector 581 can similarly be fitted to the video processor 505.

A focusing lens 577 is disposed in the TV camera 572 at a position facing the eyepiece 576 so that the optical image transmitted through the eyepiece lens 576 and the focusing lens 577 is formed on a CCD 578.

The CCD 578 can be connected to signal contacts (not shown) of the video processor 505 via signal lines extending through a cord 579.

As described above, since the scope 573 externally equipped with a TV camera has substantially the same function as the electronic scope 502, the endoscope apparatus operates in a like manner even when the scope 573 is used instead of the electronic scope 502.

The resulting advantageous effect is also similar to that in the case of using the electronic scope 502.

Figure 74:
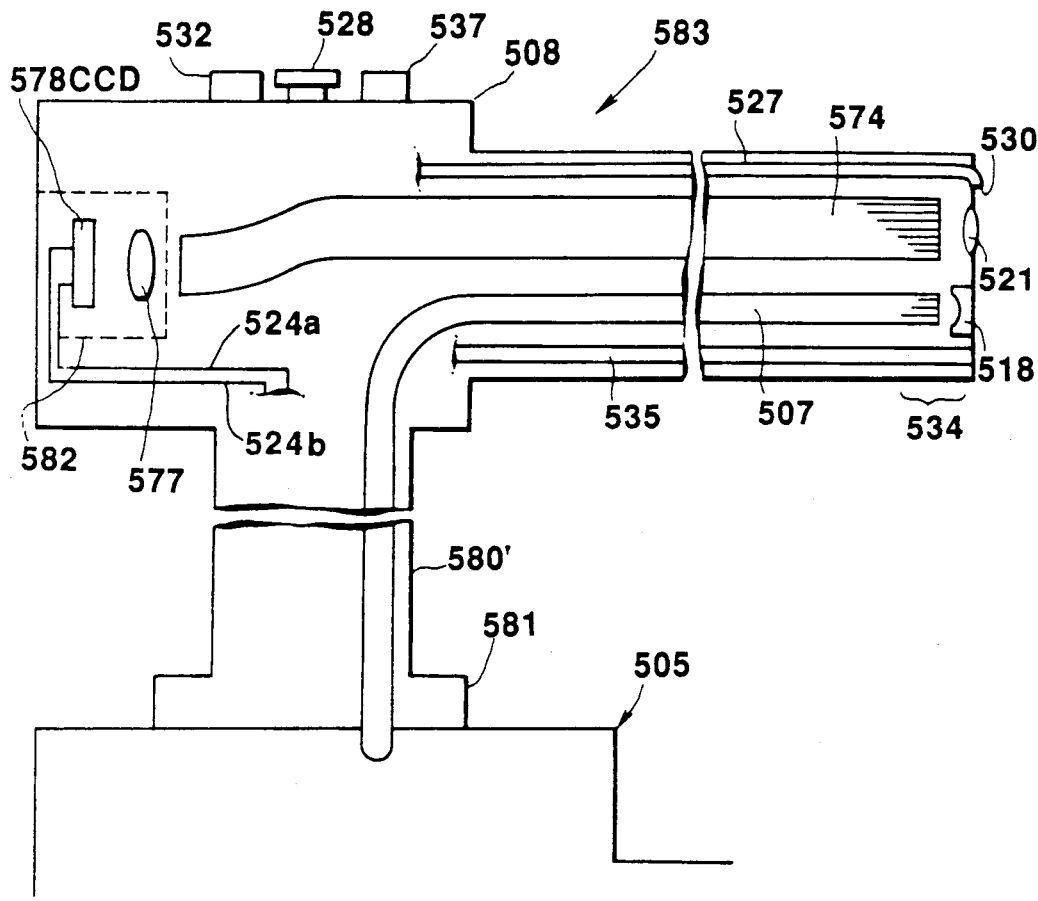
FIG. 74 is a diagrammatic view showing the configuration of a main part of a modification of the twenty-seventh embodiment.

It will be apparent that as a modification of the scope 573 externally equipped with a TV camera shown in FIG. 73, the endoscope apparatus can also be implemented using a scope 583 which has a TV camera portion 582 built in at the opposite end of an image guide 574 as shown in FIG. 74. In this scope 583, an optical image transmitted to the opposite end of the image guide 574 is formed by a focusing lens 577 on a CCD 578. Since the scope 583 has the CCD built therein, signal lines 524a, 524b are provided to penetrate through a cable 580'.

Figure 75:
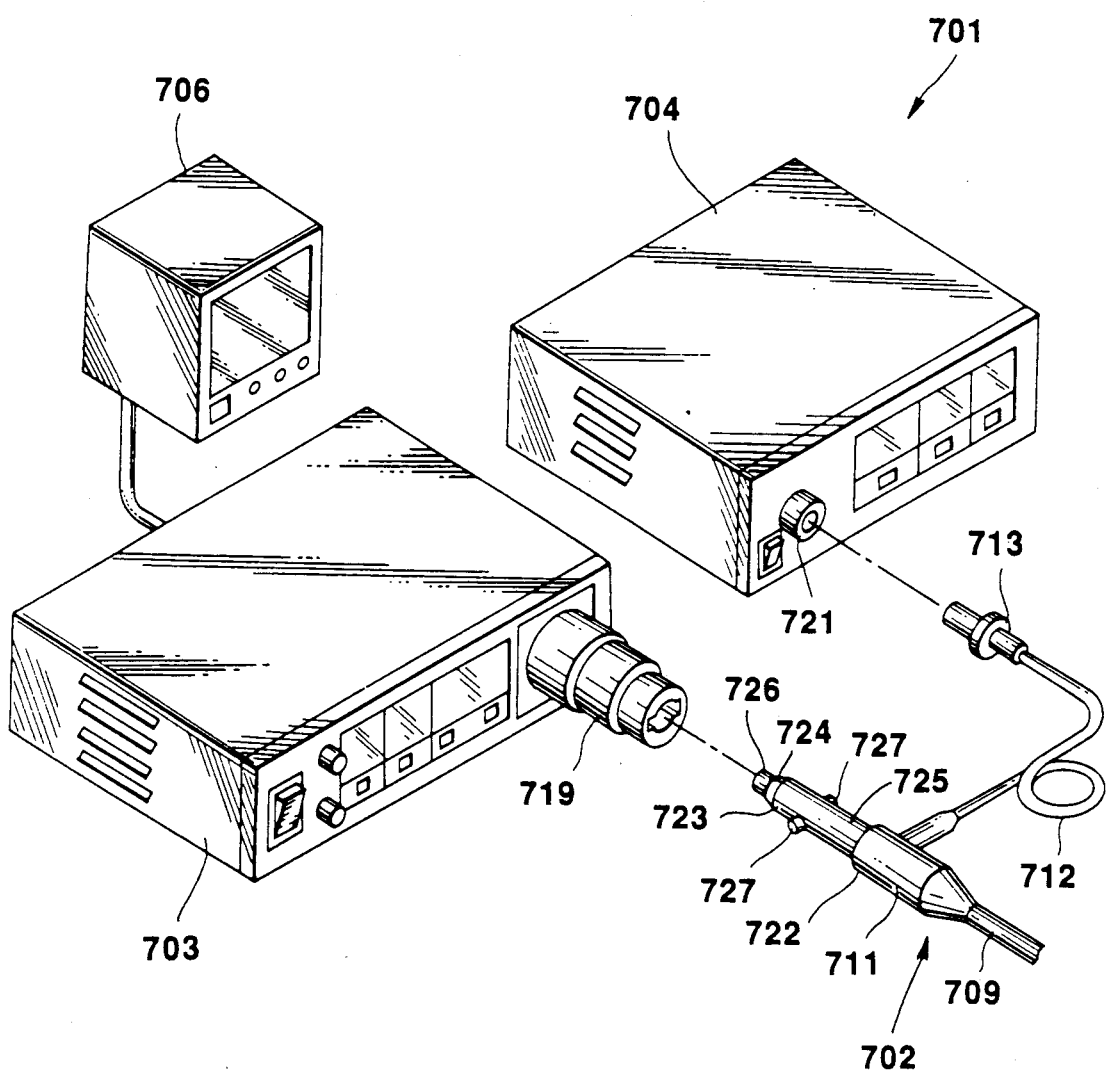
FIG. 75 is a perspective view showing an apparatus of a twenty-eighth embodiment of the present invention.

Further, an electronic endoscope apparatus 701 of a twenty-eighth embodiment shown in FIG. 75 can be constituted by employing an endoscope 702 for blood vessels. The blood vessel endoscope 702 has an insert portion 707 which is so thinned in diameter that it may be inserted into a blood vessel.

The electronic endoscope apparatus 701 comprises, as shown in FIG. 75, the blood vessel endoscope 702, a TV camera unit 703 to which is connected the blood vessel endoscope 702, a light source unit 704 for supplying beams of illumination light to the blood vessel endoscope 702, and a color monitor 706 for displaying an endoscope image obtained from the blood vessel endoscope 702.

Figure 76:
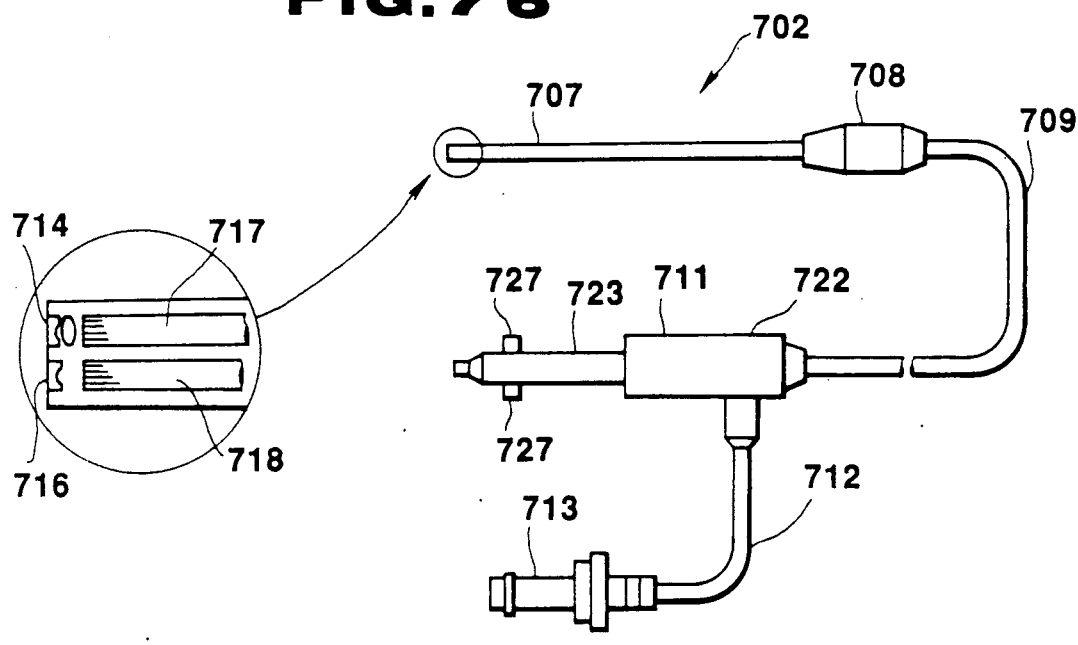
FIG. 76 is a plan view showing an external form of a vein endoscope used in the twenty-eighth embodiment.

As shown in FIG. 76, the blood vessel endoscope 702 comprises the flexible insert portion 707 which is long and narrow, and a grip portion 708 provided at the rear end of the insert portion 707. A universal cord 709 is extended from the rear end of the grip portion 708, and an image guide connector 711 is provided at the rear end portion of the universal cord 709. A light guide cord 712 is extended from the side portion of the image guide connector 711, and a light guide connector 713 is provided at the rear end portion of the light guide cord 712.

An object lens 714 and a light directing lens 716 are provided in the distal end face of the insert portion 707. An image guide fiber 717 for transmitting an object image has its incident end face disposed at a focused position of the object lens 714. The image guide fiber 717 is extended to reach the image guide connector 711 while passing through the insert portion 707, the grip portion 708 and the universal cord 709. On the other hand, a light guide fiber 718 for transmitting beams of the illumination light has its emergent end face disposed behind the light directing lens 716. The light guide fiber 718 is extended to reach the light guide connector 713 while passing through the insert portion 707, the grip portion 708, the universal cord 709, the image guide connector 111 and the light guide cord 712.

As seen from FIG. 75, the image guide connector 711 is detachably connected to a socket portion 719 of the aforesaid TV camera unit 703. In the state that the image guide connector 711 is connected to the socket portion 719, the light guide cord 712 is extended laterally so that the light guide connector 713 can easily be connected to a light source socket portion 721 of the light source unit 704 provided in side-by-side relation to the TV camera unit 703.

The light source unit 704 has a light source (not shown) for generating the illumination light, and supplies the illumination light generated from the light source to the incident end face of the light guide fiber 718 disposed in the light guide connector 713 in a connected state with the light source unit 704.

The TV camera unit 703 has a TV camera (not shown), and the object image transmitting through the image guide fiber 717 disposed in the image guide connector 711 is incident on the TV camera.

Further, the TV camera unit 703 converts the incident object image received through the image guide fiber 717 to an electric image and then performs predetermined steps of signal processing to display the endoscope image on the color monitor 706.

The image guide connector 711 comprises a body portion 722 which is grasped by an operator when connecting the image guide connector 711 to the socket portion 719, and a socket insert portion 723 which is formed to be thinner than the body portion 722 inserted into the socket portion 719 of the TV camera unit 703.

The body portion 722 and the socket insert portion 723 are formed to be tubular in shape, and the socket insert portion 723 is fixedly fitted in the body portion 722 via meshing of threads (not shown).

The socket insert portion 723 is formed in its distal end with a tapered region 724 shaped to be thinner toward the distal end and a small-diameter region 726 projected forwardly from the tapered region 724.

A pair of pins 727, 727 are radially protruded at an angle of 180° therebetween from a larger-diameter region 725 given by an outer peripheral wall of the socket insert portion 723 extending from the tapered region 724 to the body portion 722.

By inserting the small-diameter region 726 into the socket portion 719, the object image can be formed on the TV camera via a focusing optical system (not shown) disposed in the rear of the socket portion 719.

With the twenty-sixth and twenty-eighth embodiments, as described above, since the occurrence of color smear due to water-feed is determined from the image signals, it becomes possible to appropriately reduce the color smear only when there occurs color smear exceeding an allowable degree.

It should be understood that the foregoing embodiments can partially be combined with each other to constitute other different embodiments. These unillustrated embodiments also belong to a scope of the present invention.

What is claimed is:

1. An electronic endoscope system comprising:
   an electronic endoscope comprised of a long and narrow insert portion, emitting means of frame sequential light for sequentially emitting beams of illumination light in different wavelength ranges from the distal end side of said insert portion over time, an object optical system provided at the distal end side of said insert portion for focusing an image of an object being illuminated by the frame sequential light, and an imaging element for making photoelectric conversion of said image formed by said object optical system;
   drive signal producing means for producing a drive signal to output an image signal from said imaging element;
   signal processing means for processing said image signal to produce a standard video signal;
   color monitor means for receiving said standard video signal to display a motion picture on a monitor screen;
   movement detecting means for detecting a relative movement between said object and said imaging element based on said image signal; and
   color smear reducing means responsive to an output of said movement detecting means for reducing color smear in said motion picture displayed on said monitor screen.

2. An electronic endoscope system according to claim 1, wherein said electronic endoscope is an electronic scope in which said imaging element is arranged in the focal plane of said object optical system.

3. An electronic endoscope system according to claim 1, wherein said electronic endoscope is a scope externally equipped with a television camera, which comprises an optical scope having one end arranged in the focal plane of said object optical system and incorporating an image guide therein to transmit the image to the other end of said optical scope, and a television camera fitted to an eyepiece portion of said optical scope and incorporating said imaging element therein.

4. An electronic endoscope system according to claim 1, wherein said electronic endoscope is a scope which incorporates therein an image guide having one end arranged in the focal plane of said object optical system and transmitting the image to the other end of said image guide, and an imaging element for making photoelectric conversion of the image formed by a focusing lens positioned in facing relation to the other end of said image guide.

5. An electronic endoscope system according to claim 1, wherein said emitting means of frame sequential light is a light guide having one end to which is supplied the frame sequential illumination light from an external light source, and transmitting said illumination light for emission from the other end thereof arranged at the distal end side of said insert portion.

6. An electronic endoscope system according to claim 1, wherein said light source comprises a lamp for emitting a beam of white light, a color wheel disc arranged in facing relation to said lamp and provided with a plurality of color transmission filters arranged circumferentially to transmit respective beams in the different wavelength ranges, and a motor for driving said color wheel disc to rotate.

7. An electronic endoscope system according to claim 1, wherein said movement detecting means is color smear detecting means for detecting color smear in said motion picture.

8. An electronic endoscope system according to claim 1, wherein said movement detecting means has movement detection signal producing means for producing a movement detection signal dependent on said relative movement from at least two color signals produced by said signal processing means.

9. An electronic endoscope system according to claim 1, wherein said movement detecting means has movement detection signal producing means for producing a movement detection signal dependent on said relative movement from at least two among a luminance signal and two color difference signals all produced by said signal processing means.

10. An electronic endoscope system according to claim 1, wherein said movement detecting means outputs a movement detection signal dependent on said relative movement based on at least two signals produced by said signal processing means to said color smear reducing means for a period of each field/frame.

11. An electronic endoscope system according to claim 1, wherein said movement detecting means is able to output a movement detection signal dependent on said relative movement based on at least two signals produced by said signal processing means to said color smear reducing means in a period unit shorter than one horizontal period.

12. An electronic endoscope system according to claim 1, wherein said color smear reducing means has color smear preventing means for controlling a plurality of color signal components output from said signal processing means to be produced as one color signal component, in response to a movement detection signal issued when said movement detecting means determines that said relative movement is equal to or larger than a certain value.

13. An electronic endoscope system according to claim 1, wherein said color smear reducing means has control means for outputting a color killer signal to said signal processing means to provide display in black and white, in response to a movement detection signal issued when said movement detecting means determines that said relative movement is equal to or larger than a certain value.

14. An electronic endoscope system according to claim 1, wherein said color smear reducing means has pseudo-color signal producing means for producing pseudo-color signals corresponding to others color signal by the use of one color signal issued from said signal processing means and then outputting said pseudo-color signals in place of said other color signals, in response to a movement detection signal issued when said movement detecting means determines that said relative movement is equal to or larger than a certain value.

15. An electronic endoscope system according to claim 1, wherein said color smear reducing means has high-frequency suppressing means for suppressing the high-frequency component in a plurality of color signals issued from said signal processing means, in response to a movement detection signal issued when said movement detecting means determines that said relative movement is equal to or larger than a certain value.

16. An electronic endoscope system according to claim 1, wherein said color smear reducing means has high-frequency suppressing means for suppressing the high-frequency component in a luminance signal issued from said signal processing means, in response to a movement detection signal issued when said movement detecting means determines that said relative movement is equal to or larger than a certain value.

17. An electronic endoscope system according to claim 1, wherein said color smear reducing means has an oscillating element for oscillating one of said object optical system and said imaging element with respect to the other, in response to a movement detection signal issued when said movement detecting means determines that said relative movement is equal to or larger than a certain value.

18. An electronic endoscope system according to claim 1, wherein said color smear reducing means has freeze-picture producing means for outputting, as a freeze-picture, an image immediately before issuance of a movement detection signal, in response to the movement detection signal issued when said movement detecting means determines that said relative movement is equal to or larger than a certain value.

19. An electronic endoscope system according to claim 1, wherein said color smear reducing means has luminance suppressing means for making control such that at least a luminance level of a picture displayed on said monitor screen is lowered, in response to a movement detection signal issued when said movement detecting means determines that said relative movement is equal to or larger than a certain value.

20. An electronic endoscope system according to claim 1, wherein said color smear reducing means has saturation suppressing means for making control such that at least a saturation level of a picture displayed on said monitor screen is lowered, in response to a movement detection signal issued when said movement detecting means determines that said relative movement is equal to or larger than a certain value.

21. An electronic endoscope system according to claim 1, wherein said color smear reducing means has hue changing means for changing hues of two color difference signal components corresponding to image portions for which said movement detecting means determines that said relative movement is equal to or larger than a certain value.

22. An electronic endoscope system according to claim 1, wherein said color smear reducing means has hue region restricting means for restricting at least a hue region of the video signal issued from said signal processing means, in response to a movement detection signal issued when said movement detecting means determines that said relative movement is equal to or larger than a certain value.

23. An electronic endoscope system according to claim 22, wherein said color hue restricting means is a ROM which outputs two color difference signals restricted in their hue regions by using two color difference signals produced from said signal processing means as address signals.

24. An electronic endoscope system according to claim 1, wherein said color smear reducing means has an averaging circuit for replacing two color difference signals issued from said signal processing means with respective average color difference signals which are averaged for a preset period of time, in response to a movement detection signal issued when said movement detecting means determines that said relative movement is equal to or larger than a certain value.

25. An electronic endoscope system according to claim 24, wherein said system has a decoder circuit for decoding a green color signal produced by said signal processing means and said average color difference signals issued from said averaging circuit, and then outputting three primary color pseudo-signals thus decoded to said color monitor means.

26. An electronic endoscope system according to claim 25, wherein said system further has an averaging circuit for averaging the amplitude of said green color signal by the use of an average luminance signal over a period of one field/frame.

27. An electronic endoscope system according to claim 1, further comprising water feeding means which is able to wash said object optical system with water being fed.

28. An electronic endoscope system according to claim 27, wherein said movement detecting means comprises color component detecting means for detecting a plurality of color components of said illumination light in the respective wavelength ranges from said image signal, and evaluation means for evaluating color smear from output signals of said color component detecting means.

29. An electronic endoscope system according to claim 28, wherein said color component detecting means detects, in addition to the color components of said illumination light in the respective wavelength ranges, at least one other color component corresponding to the combined color component of the illumination light in the respective wavelength ranges, and said evaluation means evaluates color smear from the output signals of said color component detecting means.

30. An electronic endoscope system according to claim 28, wherein said color component detecting means detects hues as said color components.

31. An electronic endoscope system according to claim 28, wherein said evaluation means carries out operation to reduce color smear, only when the color smear is discriminated to be attributable to water-feed by said water feeding means.

32. An electronic endoscope system according to claim 1, further comprising air feeding means.

33. An electronic endoscope system according to claim 1, further comprising suction means to suck viscous liquid or the like.

34. An electronic endoscope system according to claim 33 or 32, wherein said movement detecting means comprises color component detecting means for detecting a plurality of color components of said illumination light in the respective wavelength ranges from said image signal, and evaluation means for evaluating color smear from output signals of said color component detecting means.

35. An electronic endoscope system according to claim 34, wherein when the output signals of said color components detecting means are determined to be equal to or larger than a certain level for the plural color components, said evaluation means discriminates that color smear is attributable to water-feed by said water feeding means, suction by said suction means, or air-feed by said air feeding means.

36. An electronic endoscope system according to claim 27, 33 or 32, wherein said evaluation means discriminates color smear due to any of water-feed, suction or air-feed from the detection signals of said color component detecting means.

37. An electronic endoscope system according to claim 36, wherein said evaluation means comprises addition means for adding the respective output signals of said color component detecting means, and comparison means for determining the presence of color smear due to water-feed or suction based on whether or not the sun value added by said addition means exceeds a reference value.

38. An electronic endoscope system according to claim 36, wherein said evaluation means comprises a plurality of comparators each having one input terminal to which is applied one output signal of said color component detecting means and the other input terminal to which is applied a reference value, and memory means for determining whether or not the color smear is due to washing water, based on a combination of output signals from said plurality of comparators.

39. An electronic endoscope system according to claim 38, wherein said memory means is capable of rewriting the memory contents.

40. An electronic endoscope system according to claim 1, wherein said movement detecting means detects color smear from said relative movement, and comprises first color component producing means for producing first color component signal corresponding to at least a first hue from said image signal, second color component producing means for producing second color component signal corresponding to a second hue for detection of color smear in said image signal due to said relative movement, and color smear discriminating means for detecting color smear in said image signal from said first color component signal and said second color component signal.

41. An electronic endoscope system according to claim 40, wherein said second color component producing means produces said second color component signal corresponding to said second hue from said image signal, said second hue being different from said first hue by an illumination cycle of said emitting means of frame sequential light.

42. An electronic endoscope system according to claim 40, wherein said first color component producing means has color difference signal producing means for producing two color difference signals.

43. An electronic endoscope system according to claim 40, wherein said first color component producing means further has division means for dividing one of said two color difference signals by the other to produce said first color component signal.

44. An electronic endoscope system according to claim 40, wherein said first color component producing means further has a conversion table for producing said first color component signal corresponding to the resultant hue from said two color difference signals.

45. An electronic endoscope system according to claim 40, wherein said first color component producing means has a conversion table for producing said first color component signal corresponding to the resultant hue from three primary color signals.

46. An electronic endoscope system according to claim 40, wherein said second color component producing means has delay means for giving a time delay through an illumination cycle of said emitting means of frame sequential light.

47. An electronic endoscope system according to claim 40, wherein said second color component producing means produces, as said second hue given by said second color component signal, a reference hue set corresponding to the presence region of said first hue.

48. An electronic endoscope system according to claim 40, wherein said color smear discriminating means comprises subtraction means for subtracting one of said first color component signal and said second color component signal from the other, and comparison means for determining whether or not an output signal of said subtraction means is within an allowable range.

49. An electronic endoscope system according to claim 40, wherein said color smear discriminating means has hue region comparing means for comparing a common hue region between said first color component signal and said second color component signal.

50. An electronic endoscope system according to claim 40, wherein said first color component producing means produces said first color component signal corresponding to not only said first hue but also first saturation, and said second color component producing means produces said second color component signal corresponding to not only said second hue but also second saturation.

51. An electronic endoscope system according to claim 50, wherein said color smear discriminating means has hue and saturation region comparing means for comparing common hue and saturation regions between said first color component signal and said second color component signal.

52. An electronic endoscope system comprising:
an electronic endoscope comprised of a long and narrow insert portion, emitting means of frame sequential light for sequentially emitting beams of illumination light in different wavelength ranges from the distal end side of said insert portion over time, an object optical system provided at the distal end side of said insert portion for focusing an image of an object being illuminated by the frame sequential light, and an imaging element for making photoelectric conversion of said image formed by said object optical system;
drive signal producing means for producing a drive signal to output an image signal from said imaging element;
signal processing means for processing said image signal to produce a standard video signal;
color monitor means for displaying a picture of said object on a monitor screen based on said standard video signal;
movement detecting means for detecting a relative movement between said object and said imaging element based on said image signal; and
color smear reducing means responsive to an output of said movement detecting means for reducing color smear in said picture displayed on said monitor screen in real time.

53. An electronic endoscope system according to claim 52, wherein said electronic endoscope is an electronic scope in which said imaging element is arranged in the focal plane of said object optical system.

54. An electronic endoscope system according to claim 52, wherein said electronic endoscope is a scope externally equipped with a television camera, which comprises an optical scope having one end arranged in the focal plane of said object optical system and incorporating an image guide therein to transmit the image to the other end of said optical scope, and a television camera fitted to an eyepiece portion of said optical scope and incorporating said imaging element therein.

55. An electronic endoscope system according to claim 52, wherein said electronic endoscope is a scope which incorporates therein an image guide having one end arranged in the focal plane of said object optical system and transmitting the image to the other end of said image guide, and an imaging element for making photoelectric conversion of the image formed by a focusing lens positioned in facing relation to the other end of said image guide.

56. An electronic endoscope system according to claim 52, wherein said emitting means of frame sequential light is a light guide having one end to which is supplied the frame sequential illumination light from an external light source, and transmitting said illumination light for emission from the other end thereof arranged at the distal end side of said insert portion.

57. An electronic endoscope system according to claim 52, wherein said light source comprises a lamp for emitting a beam of white light, a color wheel disc arranged in facing relation to said lamp and provided with a plurality of color transmission filters arranged circumferentially to transmit respective beams in the different wavelength ranges, and a motor for driving said color wheel disc to rotate.

58. An electronic endoscope system according to claim 52, wherein said movement detecting means is color smear detecting means for detecting color smear in said picture.

59. An electronic endoscope system according to claim 52, wherein said movement detecting means has movement detection signal producing means for producing a movement detection signal dependent on said relative movement from at least two color signals produced by said signal processing means.

60. An electronic endoscope system according to claim 52, wherein said movement detecting means has movement detection signal producing means for producing a movement detection signal dependent on said relative movement from at least two among a luminance signal and two color difference signals all produced by said signal processing means.

61. An electronic endoscope system according to claim 52, wherein said movement detecting means outputs a movement detection signal dependent on said relative movement based on at least two signals produced by said signal processing means to said color smear reducing means for a period of each field/-frame.

62. An electronic endoscope system according to claim 52, wherein said movement detecting means is able to output a movement detection signal dependent on said relative movement based on at least two signals produced by said signal processing means to said color smear reducing means in a period unit shorter than one horizontal period.

63. An electronic endoscope system according to claim 52, wherein said color smear reducing means has color smear preventing means for controlling a plurality of color signal components output from said signal processing means to be produced as one color signal component, in response to a movement detection signal issued when said movement detecting means determines that said relative movement is equal to or larger than a certain value.

64. An electronic endoscope system according to claim 52, wherein said color smear reducing means has control means for outputting a color killer signal to said signal processing means to provide display in black and white, in response to a movement detection signal issued when said movement detecting means determines that said relative movement is equal to or larger than a certain value.

65. An electronic endoscope system according to claim 52, wherein said color smear reducing means has pseudo-color signal producing means for producing pseudo-color signals corresponding to other color signals by the use of one color signal issued from said signal processing means and the outputting said pseudo-color signals in place of said other color signals, in response to a movement detection signal issued when said movement detecting means determines that said relative movement is equal to or larger than a certain value.

66. An electronic endoscope system according to claim 52, wherein said color smear reducing means has high-frequency suppressing means for suppressing the high-frequency component in a plurality of color signals issued from said signal processing means, in response to a movement detection signal issued when said movement detecting means determines that said relative movement is equal to or larger than a certain value.

67. An electronic endoscope system according to claim 52, wherein said color smear reducing means has high-frequency suppressing means for suppressing the high-frequency component in a luminance signal issued from said signal processing means, in response to a movement detection signal issued when said movement detecting means determines that said relative movement is equal to or larger than a certain value.

68. An electronic endoscope system according to claim 52, wherein said color smear reducing means has an oscillating element for oscillating one of said object optical system and said imaging element with respect to the other, in response to a movement detection signal issued when said movement detecting means determines that said relative movement is equal to or larger than a certain value.

69. An electronic endoscope system according to claim 52, wherein said color smear reducing means has freeze-picture producing means for outputting, as a freeze-picture, an image immediately before issuance of a movement detection signal, in response to the movement detection signal issued when said movement detecting means determines that said relative movement is equal to or larger than a certain value.

70. An electronic endoscope system according to claim 52, wherein said color smear reducing means has luminance suppressing means for making control such that at least a luminance level of a picture displayed on said monitor screen is lowered, in response to a movement detection signal issued when said movement detecting means determines that said relative movement is equal to or larger than a certain value.

71. An electronic endoscope system according to claim 52, wherein said color smear reducing means has saturation suppressing means for making control such that at least a saturation level of a picture displayed on said monitor screen is lowered, in response to a movement detection signal issued when said movement detecting means determines that said relative movement is equal to or larger than a certain value.

72. An electronic endoscope system according to claim 52, wherein said color smear reducing means has hue changing means for changing hues of two color difference signal components corresponding to image portions for which said movement detecting means determines that said relative movement is equal to or larger than a certain value.

73. An electronic endoscope system according to claim 52, wherein said color smear reducing means has hue region restricting means for restricting at least a hue region of the video signal issued from said signal processing means, in response to a movement detection signal issued when said movement detecting means determines that said relative movement is equal to or larger than a certain value.

74. An electronic endoscope system according to claim 73, wherein said color hue restricting means is a ROM which outputs two color difference signals restricted in their hue regions by using two color difference signals produced from said signal processing means as address signals.

75. An electronic endoscope system according to claim 52, wherein said color smear reducing means has an averaging circuit for replacing two color difference signals issued from said signal processing means with respective average color difference signals which are averaged for a preset period of time, in response to a movement detection signal issued when said movement detecting means determines that said relative movement is equal to or larger than a certain value.

76. An electronic endoscope system according to claim 75, wherein said system has a decoder circuit for decoding a green color signal produced by said signal processing means and said average color difference signals issued from said averaging circuit, and then outputting three primary color pseudo-signals thus decoded to said color monitor means.

77. An electronic endoscope system according to claim 76, wherein said system further has an averaging circuit for averaging the amplitude of said green color signal by the use of an average luminance signal over a period of one field/frame.

78. An electronic endoscope system according to claim 52, further comprising water feeding means which is able to wash said object optical system with water being fed.

79. An electronic endoscope system according to claim 78, wherein said movement detecting means comprises color component detecting means for detecting a plurality of color components of said illumination light in the respective wavelength ranges from said image signal, and evaluation means for evaluating color smear from output signals of said color component detecting means.

80. An electronic endoscope system according to claim 79, wherein said color component detecting means detects, in addition to the color components of said illumination light in the respective wavelength ranges, at least one other color component corresponding to the combined color component of the illumination light in the respective wavelength ranges, and said evaluation means evaluates color smear from the output signals of said color component detecting means.

81. An electronic endoscope system according to claim 79, wherein said color component detecting means detects hues as said color components.

82. An electronic endoscope system according to claim 79, wherein said evaluation means carries out operation to reduce color smear, only when the color smear is discriminated to be attributable to water-feed by said water feeding means.

83. An electronic endoscope system according to claim 52, further comprising air feeding means.

84. An electronic endoscope system according to claim 52, further comprising suction means to suck viscous liquid or the like 85. An electronic endoscope system according to claim 84, or 83, wherein said movement detecting means comprises color component detecting means for detecting a plurality of color components of said illumination light in the respective wavelength ranges from said image signal, and evaluation means for evaluating color smear from output signals of said color component detecting means.

86. An electronic endoscope system according to claim 85, wherein when the output signals of said color component detecting means are determined to be equal to or larger than a certain level for the plural color components, said evaluation means discriminates that the color smear is attributable to water-feed by said water feeding means, suction by said suction means, or air-feed by said air feeding means.

87. An electronic endoscope system according to claim 78, 84 or 83, wherein said evaluation means discriminates color smear due to any of water-feed, suction or air-feed from the detection signals of said color component detecting means.

88. An electronic endoscope system according to claim 87, wherein said evaluation means comprises addition means for adding the respective output signals of said color component detecting means, and comparison means for determining the presence of color smear due to water-feed or suction based on whether or not the sum value added by said addition means exceeds a reference valve.

89. An electronic endoscope system according to claim 87, wherein said evaluation means comprises a plurality of comparators each having one input terminal to which is applied one output signal of said color component detecting means and the other input terminal to which is applied a reference value, and memory means for determining whether or not the color smear is due to washing water, based on a combination of output signals from said plurality of comparators.

90. An electronic endoscope system according to claim 89, wherein said memory means is capable of rewriting the memory contents.

91. An electronic endoscope system according to claim 52, wherein said movement detecting means detects color smear from said relative movement, and comprises first color component producing means for producing first color component signal corresponding to at least a first hue from said image signal, second color component producing means for producing second color component signal corresponding to a second hue for detection of color smear in said image signal due to said relative movement, and color smear discriminating means for detecting color smear in said image signal from said first color component signal and said second color component signal.

92. An electronic endoscope system according to claim 91, wherein said second color component producing means produces said second color component signal corresponding to said second hue from said image signal, said second hue being different from said first hue by an illumination cycle of said emitting means of frame sequential light.

93. An electronic endoscope system according to claim 91, wherein said first color component producing means has color difference signal producing means for producing two color difference signals.

94. An electronic endoscope system according to claim 91, wherein said first color component producing means further has division means for dividing one of said two color difference signals by the other to produce said first color component signal.

95. An electronic endoscope system according to claim 91, wherein said first color component producing means further has a conversion table for producing said first color component signal corresponding to the resultant hue from said two color difference signals.

96. An electronic endoscope system according to claim 91, wherein said first color component producing means has a conversion table for producing said first color component signal corresponding to the resultant hue from three primary color signals.

97. An electronic endoscope system according to claim 91, wherein said second color component producing means has delay means for giving a time delay through an illumination cycle of said emitting means of frame sequential light.

98. An electronic endoscope system according to claim 91, wherein said second color component producing means produces, as said second hue given by said second color component signal, a reference hue set corresponding to the presence region of said first hue.

99. An electronic endoscope system according to claim 91, wherein said color smear discriminating means comprises subtraction means for subtracting one of said first color component signal and said second color component signal from the other, and comparison means for determining whether or not an output signal of said subtraction means is within an allowable range.

100. An electronic endoscope system according to claim 91, wherein said color smear discriminating means has hue region comparing means for comparing a common hue region between said first color component signal and said second color component signal.

101. An electronic endoscope system according to claim 91, wherein said first color component producing means produces said first color component signal corresponding to not only said first hue but also first saturation, and said second color component producing means produces said second color component signal corresponding to not only said second hue but also second saturation.

102. An electronic endoscope system according to claim 101, wherein said color smear discriminating means has hue and saturation region comparing means for comparing common hue and saturation regions between said first color component signal and said second color component signal.

103. A color smear reducing apparatus comprising:
movement detecting means for receiving a time-serial image signal issued from imaging means of the frame sequential type which sequentially images an object being illuminated by beams of frame sequential light in different wavelength ranges over time, and for detecting a relative movement between said object and said imaging means based on said image signal; and
color smear reducing means responsive to an output of said movement detecting means for reducing color smear in a motion picture displayed on a monitor screen.

104. A color smear reducing apparatus according to claim 103, wherein said imaging means is provided in an electronic endoscope including an imaging element which makes photoelectric conversion of an image of an object formed by an object optical system disposed at the distal end side of a long and narrow insert portion for focusing the image of said object.

105. A color smear reducing apparatus according to claim 103, wherein said apparatus has emitting means of frame sequential light for illuminating said object by the frame sequential light in different wavelength ranges over time.

106. A color smear reducing apparatus according to claim 103, wherein said movement detecting means is color smear detecting means for detecting color smear in said motion picture.

107. A color smear reducing apparatus according to claim 103, further comprising water feeding means which is able to wash said object optical system with water being fed.

108. A color smear reducing apparatus according to claim 103, wherein said color smear reducing means has an oscillating element for oscillating one of said object optical system and said imaging element with respect to the other, in response to a movement detection signal issued when said movement detecting means determines that said relative movement is equal to or larger than a certain value.

109. A color smear reducing apparatus according to claim 103, wherein said color smear reducing means has freeze-picture producing means for outputting, as a freeze-picture, an image immediately before issuance of a movement detection signal, in response to the movement detection signal issued when said movement detecting means determines that said relative movement is equal to or larger than a certain value.

110. A color smear reducing apparatus according to claim 103, wherein said color smear reducing means has luminance suppressing means for making control such that at least a luminance level of a picture displayed on said monitor screen is lowered, in response to a movement detection signal issued when said movement detecting means determines that said relative movement is equal to or larger than a certain value.

111. A color smear reducing apparatus according to claim 103, wherein said color smear reducing means has hue changing means for changing hues of two color difference signal components corresponding to image portions for which said movement detecting means determines that said relative movement is equal to or larger than a certain value.

112. A color smear reducing apparatus according to claim 103, further comprising suction means to suck viscous liquid or the like.

113. A color smear reducing apparatus according to claim 112, wherein said movement detecting means comprises color component detecting means for detecting a plurality of color components of said illumination light in respective wavelength ranges from said image signal, and evaluation means for evaluating color smear from output signals of said color component detecting means.

114. A color smear reducing apparatus according to claim 113, wherein said color component detecting means detects hues as said color components.

115. A color smear reducing apparatus according to claim 113, wherein said evaluation means discriminates color smear due to water-feed by said water feeding means or suction by said suction means from the detection signals of said color component detecting means.

116. A color smear reducing apparatus according to claim 103, wherein said movement detecting means detects color smear form said relative movement, and comprises first color component producing means for producing first color component signal corresponding to at least a first hue form said image signal, second color component producing means for producing second color component signal corresponding to a second hue for detection of color smear in said image signal due to said relative movement, and color smear discriminating means for detecting color smear in said image signal form said first color component signal and second color component signal.

117. A color smear reducing apparatus according to claim 116, wherein said second color component producing means produces said second color component signal corresponding to said second hue from said image signal, said second hue being different from said first hue by an illumination cycle of said emitting means of frame sequential light.

118. A color smear reducing apparatus according to claim 116, wherein said first color component producing means has color difference signal producing means for producing two color difference signals.

119. A color smear reducing apparatus according to claim 116, wherein said first color component producing means further has division means for dividing one of said two color difference signals by the other to produce said first color component signal.

120. A color smear reducing apparatus according to claim 116, wherein said first color component producing means further has a conversion table for producing said first color component signal corresponding to the resultant hue from said two color difference signals.

121. A color smear reducing apparatus according to claim 116, wherein said first color component producing means has a conversion table for producing said first color component signal corresponding to the resultant hue from three primary color signals.

122. A color smear reducing apparatus according to claim 116, wherein said second color component producing means has delay means for giving a time delay through an illumination cycle of said emitting means of frame sequential light.

123. A color smear reducing apparatus according to claim 116, wherein said second color component producing means produces, as said second hue given by said second color component signal, a reference hue set corresponding to the presence region of said first hue.

124. A color smear reducing apparatus according to claim 116, wherein said color smear discriminating means comprises subtraction means for subtracting one of said first color component signal and said second color component signal from the other, and comparison means for determining whether or not an output signal of said subtraction means is within an allowable range.

125. A color smear reducing apparatus according to claim 116, wherein said color smear discriminating means has hue region comparing means for comparing a common hue region between said first color component signal and said second color component signal.

126. A color smear reducing apparatus according to claim 116, wherein said first color component producing means produces said first color component signal corresponding to not only said first hue but also first saturation, and said second color component producing means produces said second color component signal corresponding to not only said second hue but also second saturation.

127. A color smear reducing apparatus according to claim 124, wherein said color smear discriminating means has hue and saturation region comparing means for comparing common hue and saturation regions between said first color component signal and said second color component signal.

128. A color smear reducing apparatus according to claim 103, further comprising signal processing means which produces a standard video signal corresponding to the motion picture of said object based on said time-serial image signal issued from said imaging means.

129. A color smear reducing apparatus according to claim 128, wherein said movement detecting means outputs a movement detection signal dependent on said relative movement based on at least two signals produced by said signal processing means to said color smear reducing means for a period of each field/frame.

130. A color smear reducing apparatus according to claim 128, wherein said movement detecting means is able to output a movement detection signal dependent on said relative movement based on at least two signals produced by said signal processing means to said color smear reducing means in a period unit shorter than one horizontal period.

131. A color smear reducing apparatus according to claim 128, wherein said color smear reducing means has color smear preventing means for controlling a plurality of color signal components output from the said signal processing means to be produced as one color signal component, in response to a movement detection signal issued when said movement detecting means determines that said relative movement is equal to or larger than a certain value.

132. A color smear reducing apparatus according to claim 128, wherein said color smear reducing means has control means for outputting a color killer signal to said signal processing means to provide display in black and white, ion response to a movement detection signal issued when said movement detecting means determines that said relative movement is equal to or larger than a certain value.

133. A color smear reducing apparatus according to claim 128, wherein said color smear reducing means has pseudo-color signal producing means for producing pseudo-color signals corresponding to other color signals by the use of one color signal issued from said signal processing means and then outputting said pseudo-color signals in place of said other color signals, in response to a movement detection signal issued when said movement detecting means determines that said relative movement is equal to or larger than a certain value.

134. A color smear reducing apparatus according to claim 128, wherein said color smear reducing means has high-frequency suppressing means for suppressing the high-frequency component in a plurality of color signals issued from said signal processing means, in response to a movement detection signal issued when said movement detecting means determines that said relative movement is equal to or larger than a certain value.

135. A color smear reducing apparatus according to claim 128, wherein said color smear reducing means has high-frequency suppressing means for suppressing the high-frequency component in a luminance signal issued from said signal processing means, in response to a movement detection signal issued when said movement detecting means determines that said relative movement is equal to or larger than a certain value.

136. A color smear reducing apparatus according to claim 128, wherein said color smear reducing means has saturation suppressing means for making control such that at least a saturation level of a picture displayed on said monitor screen is lowered, in response to a movement detection signal issued when said movement detecting means determines that said relative movement is equal to or larger than a certain value.

137. A color smear reducing apparatus according to claim 128, wherein said color smear reducing means has hue region restricting means for restricting at least a hue region of the video signal issued from said signal processing means, in response to a movement detection signal issued when said movement detecting means determines that said relative movement is equal to or larger than a certain value.

138. A color smear reducing apparatus according to claim 137, wherein said color hue restricting means is a RON which outputs two color difference signals restricted in their hue regions by using two color difference signals produced from said signal processing means as address signals.

139. A color smear reducing apparatus according to claim 128, wherein said color smear reducing means has an averaging circuit for replacing two color difference signals issued from said signal processing means with respective average color difference signals which are averaged for a preset period of time, in response to a movement detection signal issued when said movement detecting means determines that said relative movement is equal to or larger than a certain value.

140. A color smear reducing apparatus according to claim 139, wherein said system has a decoder circuit for decoding a green color signal produced by said signal processing means and said average color difference signals issued from said averaging circuit, and then outputting three primary color pseudo-signals thus decoded to said color monitor means.

141. A color smear reducing apparatus according to claim 138, wherein said system further has an averaging circuit for averaging the amplitude of said green color signal by the use of an average luminance signal over a period of one field/frame.

142. A color smear reducing apparatus comprising:
first color component producing means for receiving a time-serial image signal issued from imaging means of the frame sequential type which sequentially images an object being illuminated by beams of frame sequential light in different wavelength ranges over time, and for producing first color component signal corresponding to at least a first hue from said time-serial image signal;
second color component producing means for producing second color component signal corresponding to a second hue for detection of color smear in said time-serial image signal;
color smear discriminating means for detecting color smear in said time-serial image signal from said first color component signal and said second color component signal; and
color smear reducing means for reducing color smear in a color picture of said object displayed on a monitor screen, when said color smear discriminating means determines the presence of color smear.

143. A color smear reducing apparatus according to claim 142, wherein said second color component producing means produced said second color component signal corresponding to said second hue from said time-serial image signal, said second hut being different from said first hue by an illumination cycle of said frame sequential light.

144. A color smear reducing apparatus according to claim 142, wherein said first color component producing means has color difference signal producing means for producing two color difference signals.

145. A color smear reducing apparatus according to claim 142, wherein said first color component producing means further has division means for dividing one of said two color difference signals by the other to produce said first color component signal.

146. A color smear reducing apparatus according to claim 142, wherein said first color component producing means further has a conversion table for producing said first color component signal corresponding to the resultant hue from said two color difference signals.

147. A color smear reducing apparatus according to claim 142, wherein said first color component producing means has a conversion table for producing said first color component signal corresponding to the resultant hue from three primary color signals.

148. A color smear reducing apparatus according to claim 142, wherein said second color component producing means has delay means for giving a time delay through an illumination cycle of said frame sequential light.

149. A color smear reducing apparatus according to claim 142, wherein said second color component producing means produces, as said second hue given by said second color component signal, a reference hue set corresponding to the presence region of said first hue.

150. A color smear reducing apparatus according to claim 142, wherein said color smear discriminating means comprises subtraction means for subtracting one of said first color component signal and said second color component signal from the other, and comparison means for determining whether or not an output signal of said subtraction means is within an allowable range.

151. A color smear reducing apparatus according to claim 142, wherein said color smear reducing means has pseudo-color signal producing means for producing pseudo-color signals corresponding to other color signals by the use of one color signal issued from said signal processing means and then outputting said pseudo-color signals in place of said other color signals, in response to detection signal issued when said color smear discriminating means determines the presence of color smear.

152. A color smear reducing apparatus according to claim 142, wherein said color smear reducing means has freeze-picture producing means for outputting, as a freeze-picture, an image immediately before issuance of said output signal, in response to said output signal issued when said color smear discriminating means determines the presence of color smear in a degree equal to or larger than a certain value.

153. A color smear reducing apparatus comprising:
movement detecting means for receiving a time-serial image signal issued from imaging means of the frame sequential type which sequentially images an object being illuminated by beams of frame sequential light in different wavelength ranges over time, and for detecting a relative movement between said object and said imaging means based on said image signal; and
color smear reducing means responsive to an output of said movement detecting means for reducing color smear in an image of said object displayed on a monitor screen.

154. A color smear reducing apparatus according to claim 153, wherein said movement detecting means comprises first color component producing means for producing first color component signal corresponding to at least a first hue based on said time-serial image signal; and
conversion table means in which is written information corresponding to a second hut region for detecting color smear in said time-serial image signal, and which outputs a color smear detection signal dependent on whether or not said first hue is present within said second hue region, to said color smear reducing means upon receipt of said first color component signal.

155. A color smear reducing apparatus according to claim 154, wherein said conversion table means has a second conversion table in which is stored information corresponding to another hue region different from said second hue region.

* * * * *